United States Patent
Mystetskyi et al.

(10) Patent No.: US 12,524,499 B2
(45) Date of Patent: Jan. 13, 2026

(54) METHODS FOR IMPLEMENTING ARTIFICIAL INTELLIGENCE CAPABILITIES IN SOFTWARE APPLICATIONS

(71) Applicant: monday.com Ltd., Tel Aviv (IL)

(72) Inventors: Vlad Mystetskyi, Ashdod (IL); Or Fridman, Tel Aviv (IL); Tzvika Besor, Tel Aviv (IL); Danielle Vertman, Tel Aviv (IL); Oded Ben Yeoshoa, Tel Aviv (IL); Amir Bardugo, Lapid (IL); Daniel Hai, Ramat HaSharon (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 19/179,061

(22) Filed: Apr. 15, 2025

(65) Prior Publication Data
US 2025/0244964 A1     Jul. 31, 2025

Related U.S. Application Data

(63) Continuation of application No. PCT/IL2024/050820, filed on Aug. 14, 2024.
(Continued)

(51) Int. Cl.
*G06F 8/33* (2018.01)
*G06F 3/04842* (2022.01)
(Continued)

(52) U.S. Cl.
CPC ........ *G06F 18/217* (2023.01); *G06F 3/04842* (2013.01); *G06F 8/34* (2013.01);
(Continued)

(58) Field of Classification Search
CPC ...... H04N 7/157; G06F 18/217; G06N 3/042; G06N 20/00; G06Q 50/01
See application file for complete search history.

(56) References Cited

U.S. PATENT DOCUMENTS 11,962,546 B1    4/2024  Hattangady et al.
2017/0336940 A1  11/2017 Townsend et al.
(Continued)

FOREIGN PATENT DOCUMENTS

| WO | WO 2025/037311 | 2/2025 |
| WO | WO 2025/037312 | 2/2025 |
| WO | WO 2025/037313 | 2/2025 |

OTHER PUBLICATIONS

International Search Report and the Written Opinion Dated Dec. 18, 2024 From the International Searching Authority Re. Application No. PCT/IL2024/050820. (11 Pages).
(Continued)

*Primary Examiner* — Tuan A Vu

(57) ABSTRACT

The invention relates to methods and systems for integrating generative artificial intelligence (AI) capabilities into Software as a Service (SaaS) platforms. It comprises maintaining AI agents with varying credentials, enabling their interaction with alphanumeric data in table structures, and implementing a hierarchical access control scheme. The system displays table structures, provides interfaces for user inputs, and allows AI agents to be added as platform users. The generative AI agents can analyze data, identify actions, and perform tasks autonomously. The invention also includes methods for proactive information gathering, interactive analysis of AI outputs, and management of AI resources as limited assets. This approach enhances SaaS functionality by enabling AI-driven task completion, data analysis, and decision-making while maintaining data security and user-specific access controls.

31 Claims, 21 Drawing Sheets

Related U.S. Application Data

(60) Provisional application No. 63/519,519, filed on Aug. 14, 2023, provisional application No. 63/548,339, filed on Nov. 13, 2023, provisional application No. 63/645,998, filed on May 13, 2024.

(51) Int. Cl.
  *G06F 8/34* (2018.01)
  *G06F 9/451* (2018.01)
  *G06F 18/21* (2023.01)
  *G06N 3/042* (2023.01)
  *G06Q 50/00* (2012.01)
  *H04N 7/15* (2006.01)

(52) U.S. Cl.
  CPC .............. *G06F 9/453* (2018.02); *G06N 3/042* (2023.01); *G06Q 50/01* (2013.01); *H04N 7/157* (2013.01)

(56) References Cited

U.S. PATENT DOCUMENTS

| | | |
|---|---|---|
| 2017/0337287 A1 | 11/2017 | Gill |
| 2019/0108417 A1* | 4/2019 | Talagala ............... G06F 18/217 |
| 2019/0155577 A1 | 5/2019 | Prabha et al. |
| 2021/0042662 A1* | 2/2021 | Pu ........................ G06Q 50/01 |
| 2022/0036153 A1* | 2/2022 | O'Malia ............... G06N 3/042 |
| 2022/0269957 A1 | 8/2022 | Rangan |
| 2023/0067222 A1 | 3/2023 | Filji et al. |
| 2023/0121307 A1* | 4/2023 | Benchetrit ............ H04N 7/157 705/319 |
| 2023/0186203 A1 | 6/2023 | Kulkarni et al. |
| 2023/0195885 A1 | 6/2023 | Khurana et al. |
| 2023/0214461 A1 | 7/2023 | Brooks |
| 2023/0245651 A1 | 8/2023 | Wang |
| 2023/0252224 A1 | 8/2023 | Tran |
| 2023/0259705 A1 | 8/2023 | Tunstall-Pedoe et al. |
| 2023/0297889 A1* | 9/2023 | Lopez, Jr. ............ G06N 20/00 706/12 |
| 2024/0070439 A1 | 2/2024 | Segars et al. |
| 2024/0193418 A1* | 6/2024 | Guillame-Bert ....... G06N 20/00 |
| 2024/0256588 A1 | 8/2024 | Biscof et al. |
| 2024/0354567 A1 | 10/2024 | Duggal et al. |
| 2024/0370479 A1 | 11/2024 | Iludetz et al. |
| 2024/0378515 A1 | 11/2024 | Nakamura et al. |
| 2025/0016128 A1* | 1/2025 | Wheeler ................ G06N 20/00 |

OTHER PUBLICATIONS

International Search Report and the Written Opinion Dated Dec. 19, 2024 From the International Searching Authority Re. Application No. PCT/IL2024/050821. (16 Pages).

International Search Report and the Written Opinion Dated Dec. 30, 2024 From the International Searching Authority Re. Application No. PCT/IL2024/050822 (9 Pages).

Invitation to Pay Additional Fees Dated Oct. 7, 2024 From the International Searching Authority Re. Application No. PCT/IL2024/050820. (3 Pages).

Invitation to Pay Additional Fees Dated Oct. 7, 2024 From the International Searching Authority Re. Application No. PCT/IL2024/050821. (2 Pages).

Invitation to Pay Additional Fees Dated Oct. 17, 2024 From the International Searching Authority Rc. Application No. PCT/IL2024/050822. (3 Pages).

Notice of Allowance Dated Jun. 30, 2025 from the US Patent and Trademark Office Re. U.S. Appl. No. 19/179,092. (9 pages).

\* cited by examiner

FIG. 1B

METHODS FOR IMPLEMENTING ARTIFICIAL INTELLIGENCE CAPABILITIES IN SOFTWARE APPLICATIONS

RELATED APPLICATIONS

This application is a Continuation of PCT Patent Application No. PCT/IL2024/050820 having International filing date of Aug. 14, 2024, which claims the benefit of priority under 35 USC § 119 (e) of U.S. Provisional Patent Application Nos. 63/519,519 filed on Aug. 14, 2023, 63/548,339 filed on Nov. 13, 2023, and 63/645,998 filed on May 13, 2024. The contents of the above applications are all incorporated by reference as if fully set forth herein in their entirety.

FIELD AND BACKGROUND OF THE INVENTION

The present invention, in some embodiments thereof, relates to methods for implementing artificial intelligence capabilities in software applications and, more particularly, but not exclusively, to systems and methods for integrating generative artificial intelligence within Software as a Service (SaaS) platforms.

In recent years, the software industry has seen a significant shift towards cloud-based solutions, with SaaS emerging as a dominant model for delivering applications to users. SaaS platforms offer numerous advantages, including accessibility, scalability, and cost-effectiveness. These platforms typically provide a wide range of applications and services to meet various business needs such as customer relationship management (CRM), human resources management (HRM), project management, accounting, and marketing automation.

Concurrently, the field of artificial intelligence (AI) has experienced rapid advancements, particularly in the area of generative AI. Generative AI models, such as large language models (LLMs), have demonstrated remarkable capabilities in natural language processing (NLP), content generation, and complex problem-solving. These AI models can learn patterns and structures from input data and generate new content with similar characteristics.

SUMMARY OF THE INVENTION

The present invention, in some embodiments thereof, relates to methods for implementing artificial intelligence capabilities in software applications and, more particularly, but not exclusively, to systems and methods for integrating generative artificial intelligence within Software as a Service (SaaS) platforms.

The present invention relates to methods and systems for implementing artificial intelligence capabilities in software applications and, more particularly, to systems and methods for integrating generative artificial intelligence within Software as a Service (SaaS) platforms.

In one aspect, embodiments of the present invention provide a method and a system for using generative artificial intelligence in a SaaS platform. The system comprises one or more processors configured to cause a display of a table structure including multiple items, each with multiple item characteristics, associated with a common table objective. The system further displays at least one input interface for receiving user inputs to interact with items in the table structure. A generative AI agent is added as a SaaS platform user with credentials to read and write data in certain items. The system prompts the generative AI agent with data type of item characteristics and/or structural relations between items, generates instructions for performing an action by interacting with item characteristics, and executes the generated instructions.

In one aspect, embodiments of the present invention provide a method and a system for using generative artificial intelligence for intent-based interaction within a SaaS platform. The method involves maintaining a generative AI agent configured to interact with sets of alphanumeric data stored in table structures, each with a plurality of items comprising the alphanumeric data. The generative AI agent is associated with a profile defining its role in a team assigned to a project. The role refers to a set of rules according to which the generative AI agent is guided to interact with data in a predetermined manner, although these rules can be changed, corrected, or amended later as needed. The method further maintains a credentials management process for defining user credentials, displays the items in a table structure with an input interface, and allows adding the generative AI agent to interact with the alphanumeric data under control of the credentials management process, all for example as described below.

The method further maintains a credentials management process for defining user credentials, displays the items in a table structure with an input interface, and allows adding the generative AI agent to interact with the alphanumeric data under control of the credentials management process.

Embodiments of the present invention also encompass a system for interactive analysis of artificial intelligence outputs. This system maintains a generative AI agent capable of autonomously performing project-related tasks and generating outputs. It stores these outputs along with metadata, provides a user interface for initiating natural language interaction sessions regarding the outputs, and generates explanatory responses based on user queries.

Furthermore, embodiments of the present invention include a method and a system for managing artificial intelligence resources in a SaaS platform. This method involves maintaining an AI center interface displaying multiple generative AI agents, enabling deployment of multiple instances of each generative AI agent as limited resources, and managing their deployment to ensure they do not exceed assigned resource limits.

Additionally, embodiments of the present invention provide a method and a system for contextual data analysis in a structured environment. This method involves accessing a data structure containing multiple items associated with columns, analyzing each column's properties, and utilizing an AI model to perform contextual analysis of given items.

These aspects of the invention, individually and in combination, represent significant advancements in the integration of AI capabilities within SaaS environments. They address critical challenges in data management, task automation, and decision support, while maintaining essential controls for data privacy and security. The invention has the potential to transform how businesses interact with their SaaS platforms, leading to enhanced productivity, more informed decision-making, and improved operational efficiency across various industries and use cases.

In some embodiments of the present invention, a system for using generative artificial intelligence in a software as a service (SaaS) platform is provided, comprising one or more processors configured to: cause a display a table structure including multiple items, each with multiple item characteristics, associated with a common table objective; cause a display at least one input interface for receiving user inputs to interact with items in the table structure; add a generative AI agent as a SaaS platform user with credentials to read and write data in certain items; prompt the generative AI agent with data type of item characteristics and/or structural relations between items; generate instructions for performing an action by interacting with some or all of the multiple item characteristics based on the data type and structural relations; and execute the generated instructions.

Optionally, the generative AI agent is added as the SaaS platform user based on the user inputs.

Optionally, the user inputs are indicative of adding a graphical representation of the generative AI agent to at least one cell of the table structure.

Optionally, the items are arranged in rows and item characteristics in columns of the table structure.

Optionally, the one or more processors are configured to: analyze patterns in the table structure; identify missing or inconsistent data, autonomously update item characteristics based on the analysis, and generate reports summarizing changes made to the table structure.

Optionally, the prompt includes deducing the common table objective from data type and/or structural relations between item characteristics, and generating instructions based on the deduced objective.

Optionally, the action is calculated to promote the common table objective; wherein the common table objective is achieved through completing a series of activities defined by the table structure; and the action is part of this series of activities.

Optionally, the common table objective can be deduced using log history.

Optionally, actions include: generating data for an empty first cell of a first data characteristic of an item. Processing this data based on a value in a second cell of a second data characteristic.

Optionally, the generative AI agent reports to its assigning user when no further actions are required for an item.

Optionally, the system is further configured to: notify a human user of missing data; and await receipt of missing data before proceeding with further actions.

Optionally, the system is further configured to send reminders for missing data.

Optionally, adding a generative AI agent is done by selecting from a reservoir of available users in a data characteristic containing user identities.

Optionally, selection is made via a drop-down menu with user avatars and the generative AI agent is selected by choosing its avatar.

In some embodiments of the present invention, a system for using generative artificial intelligence for intent-based interaction within a SaaS platform is provided, comprising one or more processors configured to: maintain an artificial intelligence (AI) agent configured to interact with sets of alphanumeric data of the SaaS platform stored in one or more table structures, each with a plurality of items comprising the alphanumeric data, and with a profile defining a role of the generative AI agent in a team assigned to the project; maintain a credentials management process for defining for a plurality of users credentials for interacting with the alphanumeric data; cause a display of the plurality of items in a table structure and at least one input interface configured to receive user inputs for: interacting with the plurality of items and adding the generative AI agent to interact with the alphanumeric data under a control of the credentials management process; prompt a generative AI model with the profile and at least one or more indications of the plurality of items or the table structure to identify editing instructions to be executed by the generative AI agent on one or more of the plurality of items; perform the editing instructions using the user credentials.

In some embodiments of the present invention, a system for using generative artificial intelligence for intent-based interaction within a SaaS platform is provided, comprising one or more processors configured to: maintain an artificial intelligence (AI) agent configured to interact with alphanumeric data of a SaaS platform stored in a plurality of items arranged in a table structure, wherein the table structure is one of a plurality of tables associated with one of a plurality of different departments within an account; maintain a hierarchical access control scheme mapping the plurality of table structures of the SaaS platform to a plurality of privilege classes defining inheritable edit privileges; identify a user input indicative of adding the generative AI agent as a user to one or more of the plurality of table structures associated with one of the plurality of different departments; grant the generative AI agent edit privileges inherited based on the hierarchical access control scheme of that department.

Optionally, granting the generative AI agent edit privileges is made by an onboarding process that provides the generative AI agent with information specifying how to adapt its output based on either the role of the user adding it or the context of the place to which it is added within the hierarchical structure.

Optionally, multiple instances of the generative AI agent can be added to different levels of the hierarchical structure, each instance inheriting different edit privileges based on its location in the structure.

Optionally, the system comprises: a first AI agent associated with a first level of the hierarchical structure and having a first set of edit privileges; and a second AI agent associated with a second level of the hierarchical structure and having a second set of edit privileges, wherein the second set of edit privileges includes the first set of edit privileges and at least one additional edit privilege.

Optionally, the one or more processors are further configured to: perform an onboarding process for the generative AI agent, wherein the onboarding process includes providing the generative AI agent with context-specific information related to the project.

Optionally, the context-specific information includes know-how specific to the role of the generative AI agent in the team assigned to the project.

Optionally, the profile defining the role of the generative AI agent is customizable based on the specific context of the project.

Optionally, the one or more processors are further configured to: adapt the output of the generative AI agent based on the role of a user interacting with the generative AI agent.

Optionally, the one or more processors are further configured to: adapt the output of the generative AI agent based on a location in which the generative AI agent is engaged within the SaaS platform.

Optionally, the generative AI agent is configured to respond differently to similar queries based on a role of a user making a query.

Optionally, the one or more processors are further configured to: maintain multiple AI agents with different profiles, each profile corresponding to a different role within the team assigned to the project; wherein each AI agent is configured to provide different responses to the same query based on its specific role defined by its profile.

Optionally, the generative AI agent is configured to: maintain a personalized knowledge base for each department; update its responses and actions based on department-specific terminologies and workflows; adapt its communication style based on the hierarchical level of the user it's interacting with.

Optionally, the one or more processors are configured to perform editing instructions without requiring specific instructions on how to perform the one or more actions from a team member.

Optionally, the one or more processors are configured to analyze user interactions with the generative AI agent, identify patterns in user preferences and behaviors, and dynamically adjust the generative AI agent's responses and recommendations based on the identified patterns; wherein the generative AI agent is trained based on a plurality of datasets documenting interactions with other alphanumeric data stored in a plurality of other items.

Optionally, the generative AI agent is granted limited access permissions to interact only with the alphanumeric data related to a specific task.

Optionally, the generative AI agent is embodied as an avatar, and introducing the avatar to a task grants the generative AI agent permission to access log history and context of items associated with the task.

Optionally, the generative AI agent is personalized based on the context of the request and adapts its output depending on the requester and the location in which the generative AI agent is engaged.

Optionally, the personalization is a result of an onboarding process the generative AI agent undergoes after inclusion in a task or account, during which it gains access to know-how specific to the context of the task in the account.

Optionally, the mapping is of the plurality of items.

In some embodiments of the present invention, a system for using generative artificial intelligence as an autonomous team member within a project management platform is provided, comprising one or more processors configured to: maintain an artificial intelligence (AI) agent configured to interact with alphanumeric data stored in a plurality of items in a table structure comprising the alphanumeric data; cause a display of the plurality of items in the table structure and at least one input interface configured to receive user inputs for assigning tasks to the generative AI agent; analyze assigned tasks and assess whether sufficient information is found in the plurality of items in the table structure and identify missing information necessary for task completion; autonomously identify relevant team members based on context derived from the table structure and past user interactions therewith; proactively reach out to the identified team members to obtain the missing information; complete the assigned task using the obtained information without requiring further user intervention.

Optionally, the user inputs are indicative of adding a graphical representation of the generative AI agent to at least one cell of the table structure.

In some embodiments of the present invention, a system for interactive analysis of artificial intelligence outputs is provided, comprising one or more processors configured to: maintain an artificial intelligence (AI) agent configured to autonomously perform tasks related to a project and generate outputs based on project data; store the outputs generated by the generative AI agent along with metadata identifying platform elements used in generating each output; provide a user interface for initiating a natural language interaction session regarding the outputs generated by the generative AI agent; receive, via the user interface, a user query about a specific output generated by the generative AI agent; analyze the user query to identify the specific output being discussed; retrieve the metadata associated with the identified output; generate a natural language response explaining the reasoning behind the output, including references to the platform elements identified in the metadata; present the natural language response to the user via the user interface; engage in an interactive dialogue with the user to provide further clarification about the output and its underlying reasoning based on the platform elements.

In some embodiments of the present invention, a method for using generative artificial intelligence for intent-based interactions within a SaaS platform is provided, comprising: maintaining alphanumeric data stored in a plurality of items representing the alphanumeric data within the SaaS platform; maintaining a first artificial intelligence agent with a first set of credentials and a second artificial intelligence agent with a second set of credentials different from the first set, the first and second artificial intelligence agents being maintained in a common account of the SaaS platform; causing a display of at least one input interface configured to receive user inputs for: a) interacting with the plurality of items, b) selecting the first AI agent to interact with the alphanumeric data to perform an analysis of at least some of the user inputs accessed using the first set of credentials, and c) selecting the second AI agent to interact with the alphanumeric data to perform an analysis of at least some of the user inputs accessed using the second set of credentials; identifying one or more actions for interacting with the alphanumeric data according to the analysis only using information obtained through the corresponding set of credentials; automatically performing at least one of the one or more actions on the alphanumeric data accessible thereto using the corresponding credentials.

Optionally, the first and second agents are initialized as processes of a common agent code.

Optionally, the first and second agents differ only by their set of credentials.

Optionally, the method further comprises: requesting permission to perform an action in another element to which the generative AI agent does not have credentials.

Optionally, the method further comprises: maintaining a third AI agent with a set of credentials partially overlapping with the credentials of the first and second AI agents.

Optionally, the method further comprises: displaying a GUI element showing all different variations of the same AI agent and details for each of their credentials.

Optionally, the first and second AI agents are selected from a marketplace of agents with different credentials.

Optionally, the method further comprises: updating the credentials of at least one of the generative AI agents based on user input or system-determined requirements.

Optionally, identifying one or more actions comprises: analyzing the user inputs to determine user intent; matching the determined user intent with potential actions within the scope of the generative AI agent's credentials.

Optionally, the method further comprises: logging all actions performed by the generative AI agents for auditing purposes.

Optionally, automatically performing at least one of the one or more actions comprises: executing the action without further user intervention if the action falls within a predefined set of low-risk operations; requesting user confirmation before executing the action if the action falls outside the predefined set of low-risk operations.

Optionally, the method further comprises: providing a natural language interface for users to interact with and instruct the generative AI agents.

In some embodiments of the present invention, a computerized method for managing artificial intelligence resources in a SaaS platform is provided, comprising: maintaining, by one or more processors, an AI center interface displaying a plurality of AI agents for incorporation within an account of the SaaS platform, each AI agent representing different AI functionalities and configured to interact with alphanumeric data stored or associated with platform elements of the SaaS platform; enabling, by the one or more processors, deployment of multiple instances of each AI agent as limited resources; causing, by the one or more processors, a display of a plurality of items in a table structure and at least one input interface configured to receive user inputs for assigning AI agent instances to one or more items or platform elements; tracking and managing, by the one or more processors, the deployment of AI agent instances to ensure they do not exceed their assigned resource limits; executing, by the one or more processors, actions using the deployed AI agent instances within their assigned scope in the SaaS platform and their resource limits.

Optionally, the method further comprises: displaying, via a GUI element within the SaaS platform, information about all AI functionalities available in an account, with each functionality represented by a different AI agent.

Optionally, the method further comprises: displaying, via the GUI element, utilization information for each AI agent resource.

Optionally, executing actions comprises: consuming multiple instances of a generative AI agent for certain actions and a single instance for other actions.

Optionally, the method further comprises: treating the plurality of AI agents as limited resources, with multiple instances of the same AI agent available for purchase and assignment to a limited number of items concurrently, further comprising: notifying a user when an attempt to assign a generative AI agent instance exceeds the resource limit; providing an option to purchase additional resources.

Optionally, the computerized method further comprises: implementing a dynamic pricing model for AI agent instances based on demand and availability; providing a resource forecasting tool to predict future AI resource needs based on historical usage and project plans; automatically scaling AI resources up or down based on predefined thresholds and usage patterns; implementing a queuing system for managing requests to AI agents when demand exceeds available resources.

Optionally, tracking and managing the deployment of AI agent instances comprises: maintaining a count of assigned instances for each AI agent; comparing the count to a predefined limit for each AI agent.

Optionally, the method further comprises: receiving a request to assign a generative AI agent instance to an item or platform element; determining whether the assignment would exceed the resource limit for the generative AI agent; allowing or denying the assignment based on the determination.

Optionally, the method further comprises: providing an interface for purchasing additional instances of a generative AI agent.

Optionally, each AI agent instance is configured to be assigned to up to a predetermined number of items concurrently.

In some embodiments of the present invention, a method for contextual data analysis in a structured environment is provided, comprising: accessing, by one or more processors, a data structure containing multiple items, each item associated with a plurality of columns; for each column: a) analyzing the column header to determine its descriptive label; b) determining the data type of the column; c) assessing the values contained within the column across multiple items; for a given item in the data structure: a) extracting values from each of its associated columns; b) utilizing an AI model to perform a contextual analysis of the given item, including one or more of: i) interpreting respective values based on its column context; ii) identifying patterns or trends from previous items in the same data structure that are similar to the given item; iii) inferring relationships between different columns and their values; providing an interface for users to query the AI model about the contextual analysis.

Optionally, the method further comprises: presenting, via the interface, explanations on how different column types influence data interpretation.

Optionally, determining the data type of the column includes categorizing the column as one of: status, text, numeric, or date.

Optionally, the method further comprises: inferring a workflow or utilization process represented by the data structure based on interpreting the structure of the data.

Optionally, utilizing the AI model to perform contextual analysis includes: differentiating between the usage and interpretation of data stored in a status column versus the same data stored in a text column.

Optionally, the method further comprises: training the AI model to understand different uses for each column type and the implications of using one column type instead of another.

Optionally, assessing the values contained within the column across multiple items includes: analyzing how values change in other items of the same type over time or across different contexts.

Optionally, providing the interface includes: enabling natural language queries about the contextual relationships and patterns identified by the AI model.

Optionally, the method further comprises: updating the AI model based on user feedback regarding the accuracy and relevance of the contextual analysis.

Optionally, the method further comprises: implementing a machine learning model to: identify correlations between columns across multiple items; predict future values for specific columns based on historical trends; detect anomalies in data patterns and flag them for user review; providing a visual representation of the identified correlations and predictions; enabling users to interactively explore the contextual relationships through a graphical interface.

In some embodiments of the present invention, a system for using generative artificial intelligence in a software as a service (SaaS) platform is provided, comprising one or more processors configured to: display a table structure including multiple items, each with multiple item characteristics, associated with a common table objective; display at least one input interface for receiving user inputs to interact with items in the table structure; add a generative AI agent as a SaaS platform user with credentials to read and write data in certain items; prompt the generative AI agent with data type of item characteristics and/or structural relations between items; generate instructions for performing an action by interacting with item characteristics; execute the generated instructions; wherein the items are arranged in rows and item characteristics in columns of the table structure.

Optionally, the action is calculated to promote the common table objective.

Optionally, the prompt includes deducing the common table objective from data type and/or structural relations between item characteristics, and generating instructions based on the deduced objective.

Optionally, the common table objective is achieved through completing a series of activities defined by the table structure and the action is part of this series of activities.

Optionally, the common table objective can be deduced using log history.

Optionally, actions include: generating data for an empty first cell of a first data characteristic of an item; and processing this data based on a value in a second cell of a second data characteristic.

Optionally, the generative AI agent reports to its assigning user when no further actions are required for an item.

Optionally, the system is further configured to: notify a human user of missing data; and await receipt of missing data before proceeding with further actions.

Optionally, the system is further configured to send reminders for missing data.

Optionally, adding a generative AI agent is done by selecting from a reservoir of available users in a data characteristic containing user identities.

Optionally, a selection is made via a drop-down menu with user avatars and a generative AI agent is selected by choosing its avatar.

In some embodiments of the present invention, a method for managing a generative AI agent marketplace in a SaaS platform is provided, comprising: displaying a catalog of generative AI agents, each with defined capabilities and credential sets; providing a user interface for filtering and comparing generative AI agents based on specific criteria; enabling users to test generative AI agents in a sandbox environment before deployment; implementing a rating and review system for generative AI agents based on user feedback; and automatically recommending generative AI agents to users based on their usage patterns and business needs Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1B illustrates an example of a table that includes multiple columns and rows, consistent with some embodiments of the present disclosure.

Figure 11A:
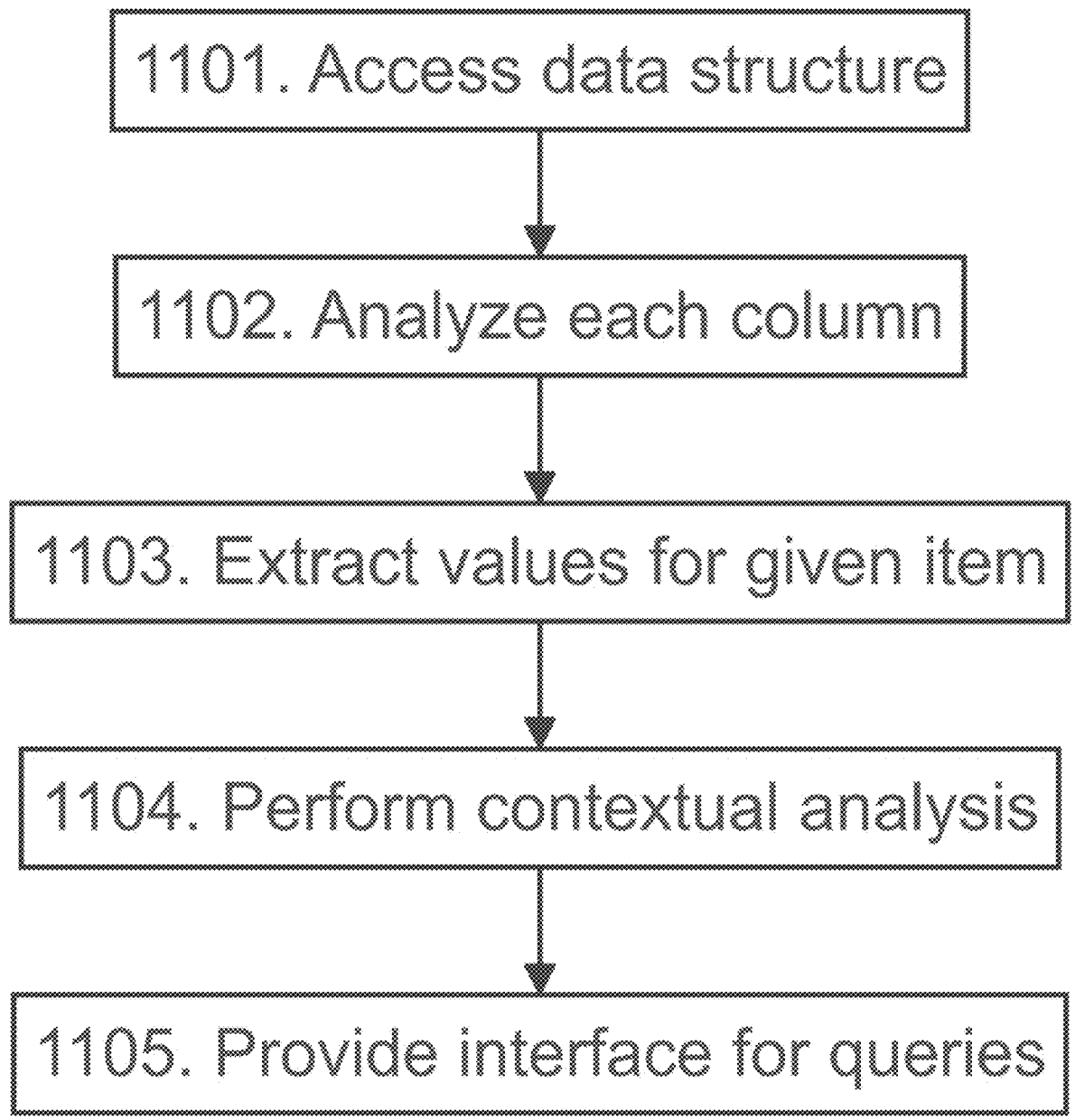
FIG. 11A is a flowchart of a process for contextual data analysis in a structured environment, particularly within a SaaS platform, consistent with some embodiments of the present disclosure.
Figure 11B:
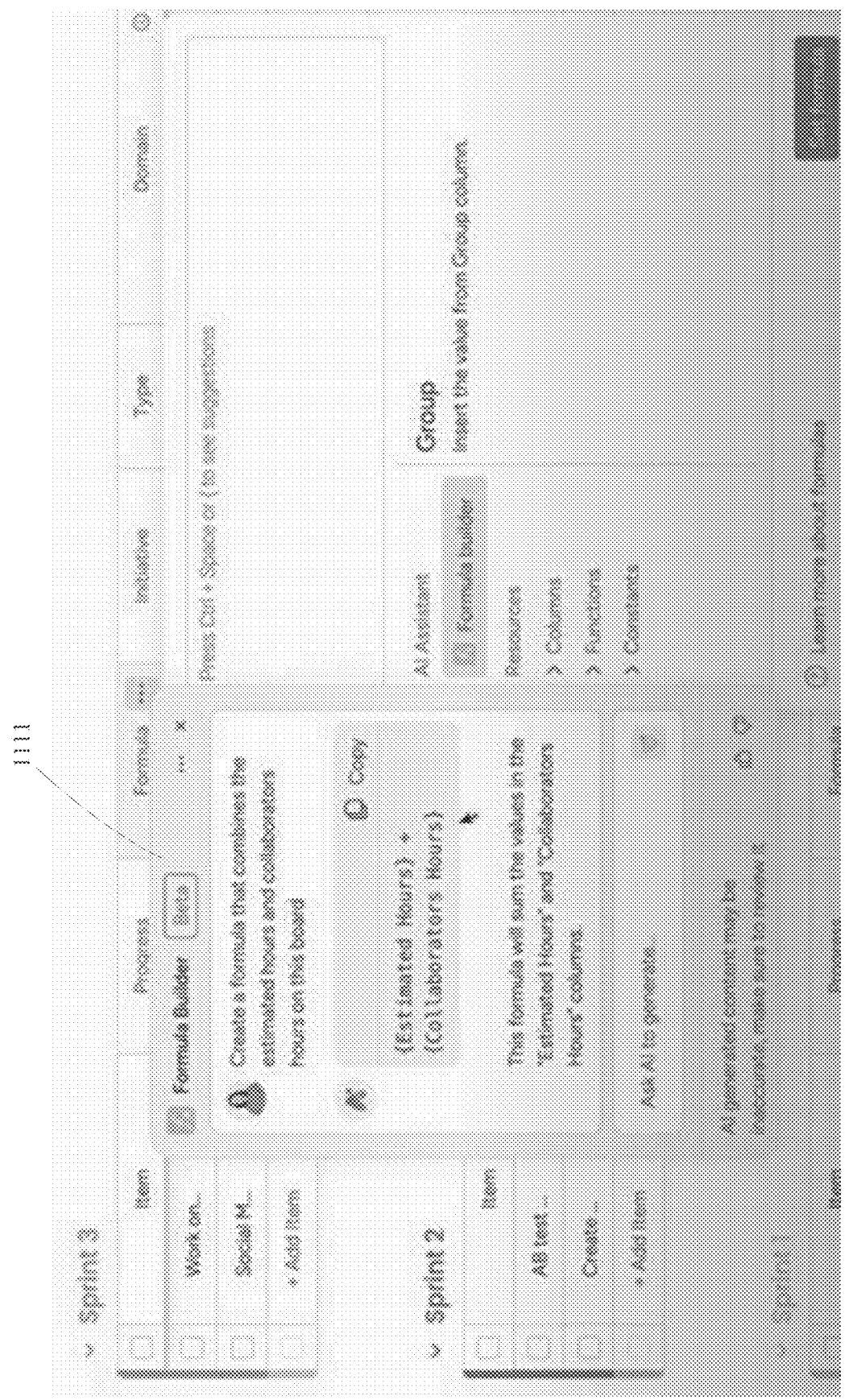

FIG. 11B which is a screenshot of a board generated by the platform overlayed with a window facilitating a user to correspond with a generative AI agent that suggests a formula based on a request and also presents an explanation therefore, consistent with some embodiments of the present disclosure.

DESCRIPTION OF SPECIFIC EMBODIMENTS OF THE INVENTION

The present invention, in some embodiments thereof, relates to methods for implementing artificial intelligence capabilities in software applications and, more particularly, but not exclusively, to systems and methods for integrating generative artificial intelligence within SaaS platforms.

Despite these parallel developments, the integration of advanced AI capabilities, particularly generative AI, into SaaS platforms has been limited. Traditional SaaS applications often lack the ability to autonomously perform complex tasks, adapt to user contexts, or provide intelligent insights based on the vast amounts of data they manage. This gap presents an opportunity to enhance SaaS platforms with AI-driven functionalities that could significantly improve user productivity, decision-making processes, and overall business outcomes.

Moreover, the implementation of AI in SaaS environments raises important considerations regarding data privacy, security, and the ethical use of AI. As generative AI agents interact with sensitive business data, there is a need for robust systems to manage access controls, ensure data protection, and maintain transparency in AI-driven decision-making processes.

Embodiments of the present invention addresses these challenges by providing novel methods and systems for seamlessly integrating generative AI capabilities into SaaS platforms. These innovations aim to enhance the functionality, efficiency, and intelligence of SaaS applications while maintaining necessary safeguards for data security and ethical AI use.

Disclosed embodiments provide new and improved techniques for implementing generative AI solutions enabling enhanced data representation and management, for instance solutions involving deep learning algorithms, such as Generative AI models, for example large language models (LLM) based algorithms that can perform a variety of NLP tasks. The used generative AI models may learn the patterns and structure of input training data from systems such as described in FIG. 1A and then generate new data that has similar characteristics.

Disclosed embodiments relate to methods and systems for integrating generative AI capabilities into SaaS platforms. The disclosed innovations address the growing need for intelligent, adaptive, and efficient software solutions in cloud-based environments.

Central to at least some of the disclosed embodiments is a system for utilizing generative AI within a SaaS platform. This system displays a table structure containing items and their characteristics, incorporates a generative AI agent as a platform user, and provides it with contextual information about data types and structural relationships. The generative AI agent then generates and executes actions based on this information, enhancing the platform's functionality and user experience.

At least some of the disclosed embodiments introduce a method for intent-based interactions using generative AI agents with varying credentials within a SaaS platform. This approach allows for selective access and actions based on specific credential sets, ensuring appropriate use of AI capabilities across different aspects of the platform.

Furthermore, the at least some of the disclosed embodiments present a system for implementing hierarchical access control for generative AI agents within a SaaS platform. This system grants inherited edit privileges based on departmental structures, allowing for fine-grained control over generative AI agent activities while maintaining organizational hierarchies.

A key feature of at least some of the disclosed embodiments is a method for proactive information gathering by generative AI agents. This method involves analyzing tasks, identifying missing information, and autonomously reaching out to team members to collect necessary data, thereby streamlining workflows and reducing manual interventions.

At least some of the disclosed embodiments encompass a system for interactive analysis of AI outputs. This system enables users to query and receive detailed explanations about AI-generated results within a project management context, fostering transparency and trust in AI-driven decision-making processes.

Additionally, at least some of the disclosed embodiments provide a method for managing AI resources as limited assets within a SaaS platform. This includes the deployment, tracking, and execution of generative AI agent instances within defined resource limits, ensuring efficient utilization of AI capabilities.

Lastly, at least some of the disclosed embodiments introduce a method for contextual data analysis in structured environments. This method utilizes AI to interpret data based on column types, patterns, and relationships within a data structure, providing deeper insights and more accurate analysis of complex datasets.

For clarity, teaching of any method described herein, provides teaching for a system implementing this method and the teaching of any system described herein, provides teaching for a method implemented using this system.

The integration of generative AI capabilities into SaaS platforms, as described in herein, offers numerous significant benefits to users and organizations alike. One primary advantage is the substantial increase in productivity and efficiency. By automating complex tasks and providing intelligent assistance, generative AI agents can significantly reduce the time and effort required for data analysis, decision-making, and routine operations. This allows human users to focus on higher-value activities that require creativity and strategic thinking. The proactive information gathering capability of the generative AI agents addresses a common challenge in project management and team collaboration. By autonomously identifying and collecting missing information, the system minimizes delays and reduces the likelihood of oversights, leading to smoother project execution and improved outcomes. The hierarchical access control system for generative AI agents ensures that organizations can maintain their existing security protocols and data governance policies while benefiting from AI capabilities. This feature allows for the seamless integration of AI into established workflows without compromising sensitive information or disrupting existing organizational structures. The interactive analysis of AI outputs provides a layer of transparency that is crucial for building trust in AI-driven systems. By allowing users to query and understand the reasoning behind AI-generated results, the invention promotes informed decision-making and helps mitigate concerns about the "black box" nature of AI algorithms. The management of AI resources as limited assets enables organizations to optimize their use of AI capabilities. This approach ensures that AI resources are allocated efficiently, preventing overuse or underutilization, and potentially reducing costs associated with AI implementation. The contextual data analysis feature significantly enhances the depth and accuracy of insights that can be derived from structured data. By understanding the nuances of different data types and their relationships, the generative AI agent or generative AI model can provide more meaningful and actionable insights, leading to better-informed business strategies. Furthermore, the intent-based interaction system, which uses generative AI agents with different credential sets, allows for a more personalized and secure user experience. Users can interact with generative AI agents that are appropriately scoped to their needs and permissions, enhancing both the relevance of AI assistance and the overall security of the platform.

As used herein a generative AI model is a function trained using machine learning technical to receive inputs such as text, image, audio, video, and code and generate new content into any of defined modalities. For example, it can turn text inputs into an image, turn an image into a song, or turn video into text. One example of a language-based generative model is a large language model (LLM). Another example is a model adapted for creation of 3D images, avatars, videos, graphs, and other illustrations. Generative AI models can create graphs, realistic images, produce 3D models, logos, enhance or edit existing images, and the like. Another example is a model adapted for generating synthetic data to train AI models when data doesn't exist.

As used herein a generative AI agent is a software application or an interface that is designed to mimic human conversation through text or voice interactions based on usage of generative AI models. For example, the generative AI agent is capable of maintaining a conversation with a user in natural language and simulating the way a human would behave as a conversational user of the described SaaS platform. Such agents may use deep learning and natural language processing.

Optionally, the generative AI agent model and/or the AI model is pre-trained on a large corpus of general text data. The model may be fine-tuned on SaaS-specific datasets, including anonymized interaction logs from one or more SaaS platforms, including SaaS platform depicted in FIG. 1A. The synthetic datasets may be generated to cover rare or sensitive scenarios and documentation and knowledge base articles related to SaaS operations. Optionally, the model is updated periodically using federated learning techniques to incorporate new patterns and knowledge without compromising data privacy.

All aspects of the entertainment industry, from video games to film, animation, world building, and virtual reality, are able to leverage generative AI models to help streamline their content creation process. Creators are using generative models as a tool to help supplement their creativity and work.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or table structure as used herein, refers to data presented in horizontal and vertical rows, (e.g., horizontal rows and vertical columns) defining cells in which data is presented. A table structure may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the table structure defined by the structure of the table. For example, a cell may be defined as an intersection between a horizontal row with a vertical column in a table structure having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, table structure may include any type of information, depending on intended use. As an example, when used in conjunction with a project/task management application, the table structure may include any information associated with one or more tasks, such as one or more status values, projects, time-frames/deadlines, countries, persons, teams, progress statuses, a combination thereof, or any other information related to a task. In some cases, a hierarchy may be established between different items/cells in the same row. For example, a unique identifier (UID) may be assigned to an item and the other cell of the same row may then be associated with the item or the assigned UID.

While a table view may be one way to present and manage the data contained on a board, a table or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include table structure. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, NLP algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:
  Accessibility: Users may conveniently and securely access software and data from any device with an internet connection.
  Scalability: SaaS platforms may easily scale up or down to accommodate changing business requirements, providing flexibility and cost-effectiveness.
  Cost-effectiveness: By eliminating upfront investments in hardware and software, SaaS may reduce initial costs. Customers may pay subscription fees based on their usage.
  Maintenance and Updates: Service providers handle software maintenance, updates, and security patches, relieving customers of these responsibilities.
  Collaboration: SaaS platforms often offer collaboration features, enabling multiple users to work together, share data, and communicate within the platform.
  Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or management tools.

Figure 1A:
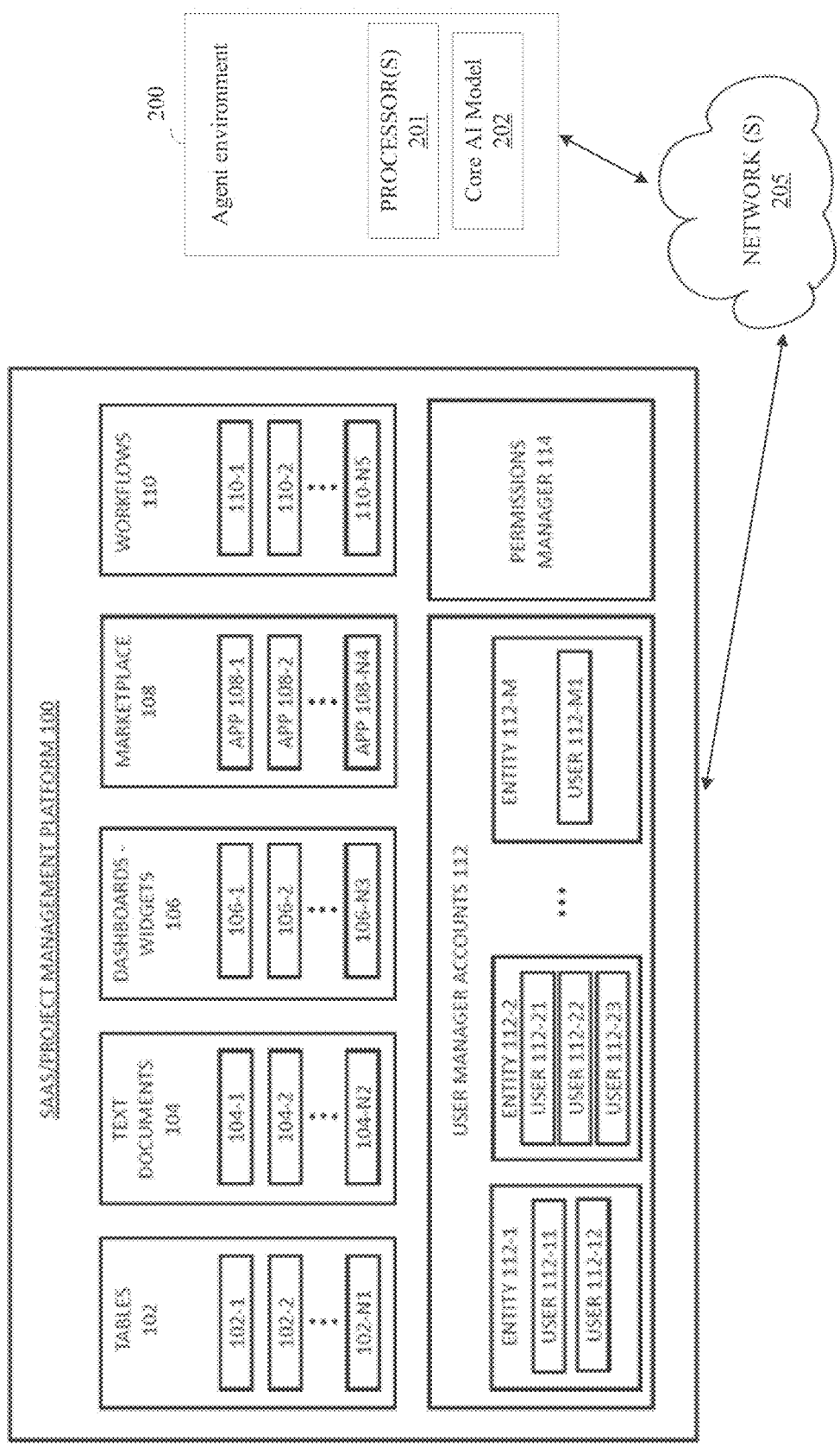
FIG. 1A is a block diagram of an exemplary SaaS platform and agent environment, consistent with some embodiments of the present disclosure.

Having outlined the general structure of SaaS platforms, we now turn to a detailed description of its components. FIG. 1A is a block diagram of an exemplary SaaS platform 100 and agent environment 200, consistent with some embodiments of the present disclosure. Although the agent environment 200 is depicted as a separate environment it can be part of the SaaS platform 100 itself. The agent environment 200 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) or management tools (not shown in FIG. 1A) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

As used herein a user account may be associated with a human or a generative AI agent. The generative AI agent may be implemented in a computerized agent environment 200 using a Core AI Model 202 that incorporates Natural Language Understanding (NLU) and Natural Language Generation (NLG) capabilities. This Core AI Model can be a transformer-based model (e.g., GPT-3.5, GPT-4, or open-source alternatives like BERT or T5) executed in a framework such as PyTorch or TensorFlow and deployed on the environment 200 (e.g., part of platform 100 or a separate system communicating with the platform 100) such as an NVIDIA Triton Inference Server or TensorFlow Serving.

When the computerized agent environment 200 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core AI Model and updates Context Management. The NLG receives raw output from the Core AI Model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core AI Model, refine it based on context from Context Management, and produce human-readable responses.

Optionally, the generative AI agent can be executed as in the agent environment 200 or as part of the platform 100 by one or more processors 201. When executed in a separate environment, an API Integration Layer may be implemented to facilitate communication between the generative AI agent or generative AI model and the SaaS platform. This layer may include a RESTful API client (e.g., Python requests library), GraphQL client (e.g., gql for Python), and/or OAuth 2.0 for authentication (e.g., authlib library). It sends platform responses to the Core AI Model and Context Management and receives actions to execute from a decision engine. The decision engine processes information from the Core AI Model, consults a memory and knowledge base, and determines actions. It then either initiates tasks via the Task Planning Module or generates responses through NLG.

Optionally, the agent environment includes a context management module, task planning module, and a decision engine to provide contextual information to the Core AI Model. The task planning module receives high-level objectives from the decision engine, breaks them down into steps, and coordinates with the API integration layer for execution. The Memory and Knowledge Base component interacts with the Core AI Model, Decision Engine, and Context Management, providing long-term storage and retrieval of information. It's queried by the Core AI Model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and scalability.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 1A, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to a one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales pipelines.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal.

This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

Based on the system overview, we now examine the specific processes that enable AI integration within the SaaS platform using the agent environment 200.

Figure 1B:
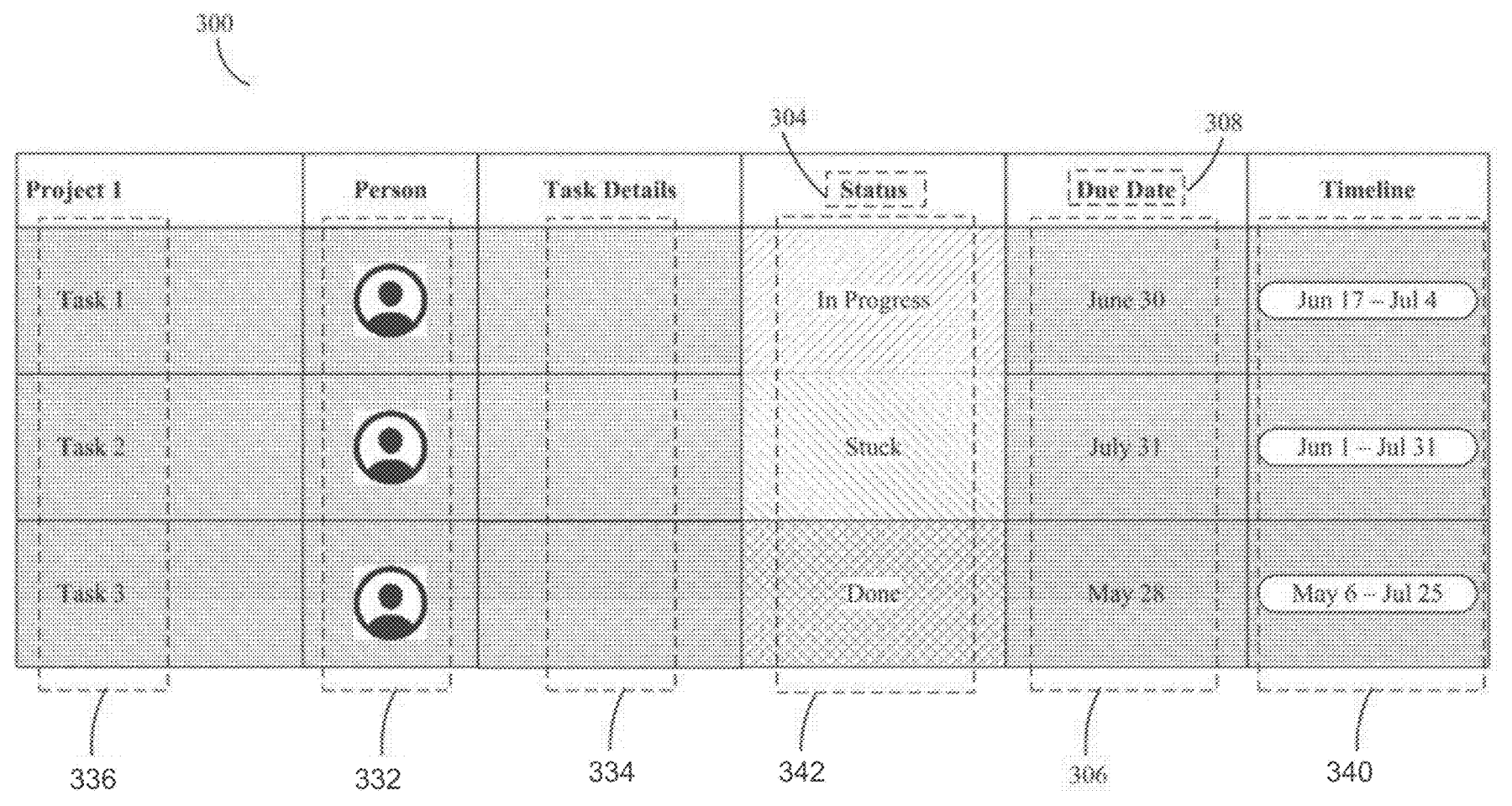

By way of example with reference to FIG. 1A, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user triggers the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline. This automatic assignment may extend to any sub-tables or linked data sources associated with that task. Furthermore, the system may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 200 automatically creates a role for that agent based on the context of its assignment. This role definition process is dynamic and contextual, taking into account the specific characteristics of the table, the task, and/or the project as a whole. For example, when an AI agent is assigned to a row having a marketing campaign task indicated in the "Task Details" column (334), the system might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the AI could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process.

Figure 2A:
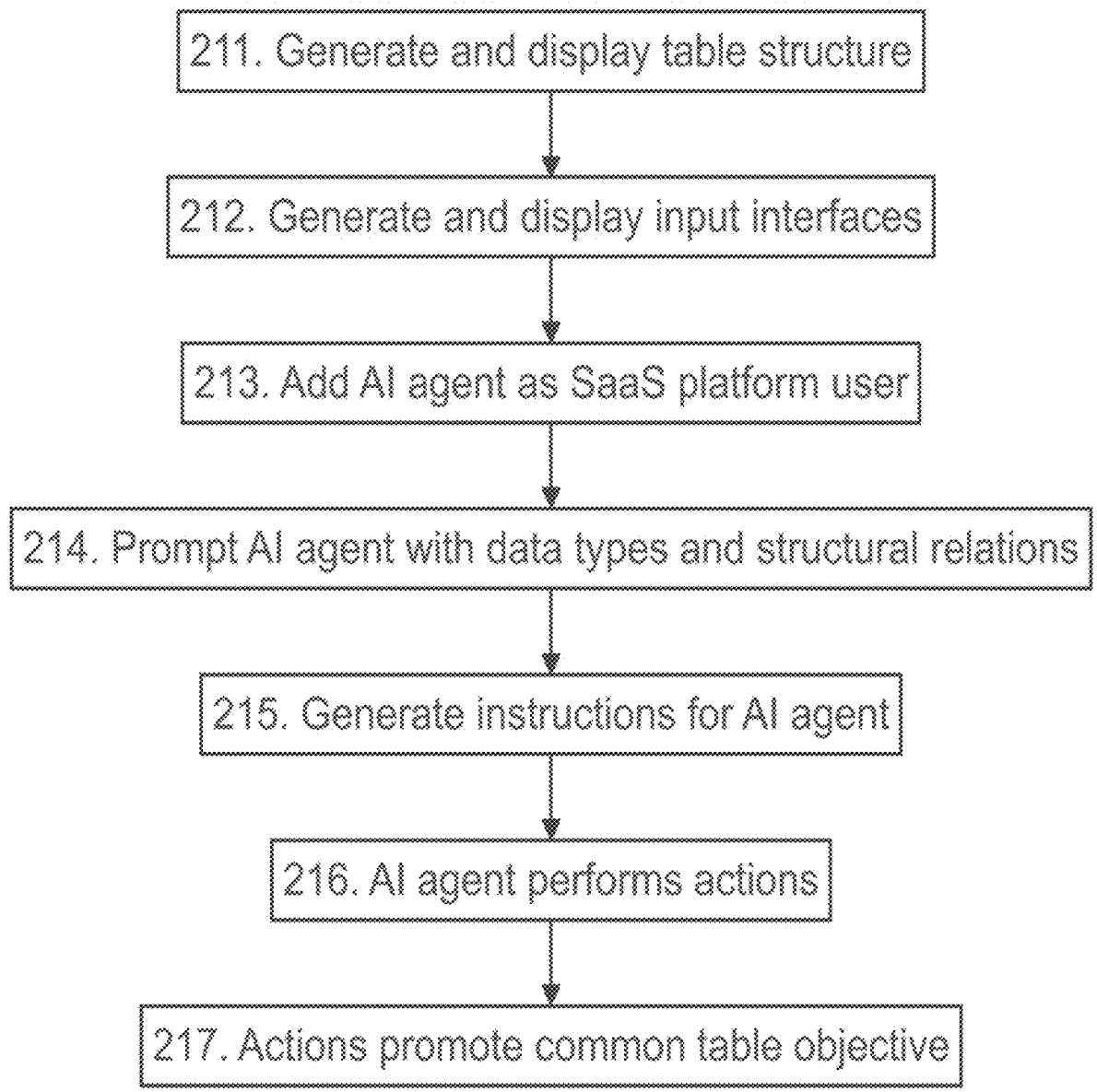
FIG. 2A is a flowchart of an exemplary process for integrating generative artificial intelligence into a SaaS platform, consistent with some embodiments of the present disclosure.

Reference is now also made to FIG. 2A is a flowchart of an exemplary process implemented by one or more processors (201) of the agent environment 200 for integrating generative AI into a SaaS platform consistent with some embodiments of the present disclosure. The flowchart is implemented using a SaaS platform, such as the system depicted in FIG. 1A, consistent with some embodiments of the present disclosure, for instance using the agent environment.

As shown at 211, a table structure is generated and displayed within the SaaS platform. This structure organizes multiple items, each associated with multiple item characteristics, all oriented towards a common table objective. The table structure may have multiple items (rows) each having multiple item characteristics (columns), associated with a common table objective. The table structure may be a board as described above.

For example, in a customer relationship management (CRM) SaaS platform, the processor(s) may induce a display of a table where each row represents a customer account (item), and columns represent characteristics such as contact information, purchase history, and engagement metrics. The common objective might be to increase customer retention. In another example, the processor(s) if the SaaS platform may induce a display of a table where each row represents a user account (item), and columns represent characteristics such as contact information, task to perform, and a state of the task to perform.

As shown at 212, input interface(S) are generated and displayed, enabling users to interact with and modify items in the table structure. For instance, the processor(s) may display an interactive tubular version of the table structure or a portion thereof, allowing users to update customer or user information, log interactions, or change the status of an account.

As shown at 213, a generative AI agent may now be added as a SaaS platform user, granting it specific credentials to read and write data for certain items within the table structure. As an example, the processor(s) of the agent environment 200 may integrate an AI customer service assistant, giving it permissions to update customer interaction logs and suggest next actions based on historical data patterns. The process of adding a generative AI agent as a SaaS platform user, as described in step 213, is exemplified in the hierarchical access control scheme detailed in FIG. 4A. This integration ensures that the generative AI agent's credentials are properly managed within the organizational structure.

Optionally, the generative AI agents are trained with data indicative of functionalities of the platform 100, components of the platform 100, actions of the platform 100, and/or interrelations of data accessible using the platform 100. This enables the generative AI agent to analyze user inputs and determine users' intent, even when specific instructions are not provided.

Optionally, the generative AI agent is added as a user, for instance in a new row of users, for example as depicted in FIG. 2A. Optionally, the generative AI agent is assigned to specific items in a table structure, granted with access privileges limited to access data associated with these items only.

As shown at 214, after 213, the generative AI agent is now prompted with information about the data types of item characteristics and/or the structural relations between items in the table. For instance, the generative AI agent is prompted with that information indicative that "purchase frequency" is a numerical field, "customer satisfaction" is a percentage, and "account status" is a categorical field with predefined options like "Active", "At Risk", and "Churned". This information can be extracted from metadata of data types or using a generative model deducing the information about the data types of item characteristics and/or the structural relations from an input indicative of a respective data structure.

This allows, as shown at 215, to generate instructions which are fed into the SaaS platform 100. Based on the provided information and the table structure, the processor(s) generate instructions for the generative AI agent to perform specific actions by interacting with item characteristics. As an example, the processor(s) may generate instructions for the generative AI agent to analyze historical data and update the status for accounts showing signs of undesired behavior such as disengagement.

To further illustrate the generative AI agent's capabilities, we now consider its autonomous actions within the system. Optionally, as shown at 216, the generative AI agent can perform its designated actions within the table structure. For instance, the processor(s) may execute instructions that cause the generative AI agent or generative AI model to automatically update the status of customer accounts based on its analysis, flagging those at risk of churning, for example as detailed below.

Optionally, as shown at 217, actions performed by the generative AI agent are calculated to promote the common table objective. For example, the processor(s) may direct the generative AI agent or generative AI model to prioritize engagement actions for high-value customers showing early signs of disengagement, in line with the objective of increasing customer retention. The common table objective may be deduced from data types and structural relations between item characteristics, then generate instructions based on this deduced objective. For instance, by analyzing the table structure and data types, the processor(s) may deduce that the objective is to maximize the product of (customer lifetime value*retention probability) across all accounts to which the AI was assigned to, and generate instructions for the generative AI agent or generative AI model to act accordingly.

Optionally, the platform 100 manages a series of activities defined by the table structure to achieve the common table objective. As an example, the processor(s) may guide the generative AI agent through a customer retention process involving steps like regular check-ins, personalized offers, and escalation to human intervention when necessary.

Optionally, the generative AI agent is trained with a log history to deduce or refine understanding of the common table objective. This log history is not limited to the system itself but may also include data from third-party applications that are associated with the item the AI agent was assigned to, provided the user has granted the AI agent access to these external sources. For instance, by processing user activity logs either within the platform or from connected third-party apps (such as CRM systems, marketing tools, or project management software), and analyzing outcomes over time, the processor(s) may learn that actions leading to higher customer satisfaction scores correlate strongly with retention. This comprehensive analysis across multiple data sources allows the AI to adjust its priorities accordingly, taking into account a more holistic view of the project or task at hand. The AI agent's ability to access and interpret data from various sources, both internal and external to the primary system, enhances its capability to provide more accurate and context-aware insights and recommendations. This multi-source data integration enables the AI to identify patterns and correlations that might not be apparent when looking at data from a single system in isolation, thereby improving the overall effectiveness of the AI's decision-making and predictive capabilities.

Optionally, the generative AI agent is guided by prompts to generate data for empty cells and process this data based on values in other cells, for instance based on analysis of history log documenting interactions between users of the platform. For example, the processor(s) may instruct the generative AI agent or generative AI model to generate an initial engagement score for a new customer based on their industry and company size, then adjust it based on their initial product usage patterns. Optionally, the generative AI agent executes a reporting function, ensuring it notifies, for example its assigning user, when no further actions are required for an item. As an illustration, the processor(s) may trigger a notification to the customer success manager when all accounts have been reviewed and updated by the AI. The reporting function may be executed to emulate a human behavior, based on training data.

Optionally, missing data is identified and team members assigned to a common data structure are notified. Optionally, further actions are suspended until the data is provided from the notified users. For example, if a customer's contact information is outdated, the processor(s) may notify the account manager and pause automated outreach until the information is updated.

Optionally, the generative AI agent manages the sending of reminders for missing data according to a learned pattern. For instance, if the missing contact information isn't provided within 48 hours, the processor(s) may trigger a reminder email to the account manager. Optionally, the generative AI agent facilitate the addition of AI agents by managing selection from available users in the agent environment 200 based on learned pattern. As an example, when assigning an AI assistant to a customer success team, the processor(s) may present a list of available AI agents with different specializations for the team leader to choose from.

Optionally, the processor(s) generate and manage a user-friendly interface with visual representations for AI agent selection. For instance, the processor(s) may display AI agents as avatars in a drop-down menu, allowing users to easily distinguish and select the appropriate AI assistant for their team.

In addition to these capabilities, the generative AI agent in some embodiments is equipped with interaction and task management features that further enhance its ability to function as an intelligent user within the SaaS platform. The generative AI agent may be configured with advanced interaction capabilities to enhance its functionality within the SaaS platform. For example, the generative AI agent may dynamically change the number of components and their interconnections in response to user input. Specifically, the generative AI agent may create new components to be associated with a user, remove existing components from being associated with a user and/or create, delete, and change interconnections between components associated with a user. This functionality allows users to perform actions by providing instructions to the generative AI agent (via language-based interactions, UI interactions, or similar methods) instead of performing the actions themselves.

Optionally, when analyzing user input, if the generative AI agent determines that the input lacks sufficient details for performing desired actions, it initiates an iterative information gathering process. The generative AI agent may output a request for the user to provide further information. It may provide general suggestions on the type of missing information or specific suggestions based on calculated predictions. Optionally, the predictions are calculated using the user's information, information on associated components, general application information, and past usage information by other users. The generative AI agent may continue this process, refining its understanding with each user response, until it has sufficient information to perform the requested action.

In some embodiments, the agent environment 200 includes an adaptive component management module configured to modify the number of components and their interconnections in response to user input. This module enables users to perform actions by providing instructions to the generative AI agent, rather than directly executing the actions themselves. The module can create new components, remove existing ones, and alter connections between components associated with a user.

When analyzing user input, if the generative AI agent determines that the input lacks sufficient details for performing desired actions, it initiates an iterative information gathering process. The agent outputs a request for the user to provide further information. It may provide general suggestions on the type of missing information or specific suggestions based on calculated predictions. These predictions are calculated using the user's information, information on associated components, general application information, and past usage information by other users.

Upon receiving a second input from the user, the generative AI agent re-analyzes the initial input in light of the new information. If the analysis is now sufficient, the agent proceeds with the required actions. If further information is still needed, a second output is sent to the user requesting more details.

The generative AI agent is designed to recognize and address various types of information gaps, including lack of context for certain terminology in the input, absence of one or more concise actions to be performed, and inability to understand the desired component from those associated with the user or available in the software application.

This iterative process continues until all necessary information is gathered. If a user's response doesn't change the results of the initial analysis, the generative AI agent provides a further elaboration of its original output. When partial information is provided, the generative AI agent narrows the scope of its inquiry but continues to seek missing information. When new information creates additional gaps, the generative AI agent identifies these and continues the information-gathering process.

After gathering necessary information, the generative AI agent may actively seek out and fill necessary information for each task, produce initial outcomes for the user to review, and prepare groundwork for tasks that can't be fully automated, easing the user's decision-making process.

For example, when a user requests to reschedule a meeting, the generative AI agent demonstrates its contextual understanding by: a) Not assuming which meeting is being referred to or which platform it's scheduled on. b) Prompting the user with specific, clarifying questions about the meeting title, date, and preferred new time. c) Confirming its understanding before proceeding with the rescheduling action.

In another example, when assisting in creating a table for planning an event, the generative AI agent showcases its ability to: a) Inquire about the type of event (e.g., corporate training workshop). b) Request details such as the number of sessions, attendee tracking requirements, and additional planning aspects (logistics, budget tracking). c) Create a table to track the desired information based on user responses. d) Actively seek out and fill necessary information for each task, producing initial outcomes for user review.

This adaptive component management capability enables a more intuitive and efficient user experience, allowing users to accomplish complex tasks through natural language interactions with the generative AI agent.

In some embodiments, the agent environment 200 includes a data enrichment module configured to analyze newly introduced data and identify opportunities to enhance existing information within the application. When a user introduces new data, the generative AI agent scans this information to determine whether it can enrich other stored data or initiate actions for other application components.

The data enrichment process is triggered by a signal indicating the introduction of new data. The generative AI agent first assesses the type of information to determine if it is suitable for the data enriching capability. This assessment is based on predefined data type criteria or by analyzing the new data's relevance to the user's existing information in the application. Users may also explicitly instruct the application to scan newly received information for enhancement purposes. In some instances, information received by one user in an account may be used to enrich data for other users within the same account.

Upon activation, the generative AI agent analyses the newly received information to determine its type and content. It then examines all components associated with the receiving component, as well as those associated with the user or the entire account, to identify potential relevance.

When the agent environment 200 determines that the new information is relevant to existing data or components, the generative AI agent performs a benefit analysis. This analysis determines how the new information can improve current data and components, and how existing data should be amended. Options may include incorporating the new information (fully or in summary), replacing old data, or populating empty components.

For example, when a user uploads a file to a cell in a table row, the generative AI agent analyses the document's content and scans associated components, such as other cells in the row. If it identifies empty cells where the column types match information found in the document (e.g., project deadlines or cost estimates), the AI agent suggests populating these cells with the relevant information. Upon user approval, the cells are automatically filled with high accuracy.

Furthermore, if the generative AI agent identifies important information in the document that doesn't correspond to existing column types, it may recommend creating new columns to capture this data. This decision is based on an analysis of existing columns and user information (as well as examples of similar table structures used in the SaaS platform) to determine the potential importance of the new data type.

This intelligent data enrichment capability enables more efficient data management and utilization, reducing manual data entry and ensuring comprehensive capture of relevant information across the application.

In some embodiments, the agent environment 200 includes a cross-structure data integration module configured to analyze and transfer information between components with different structures. This module can process information received in a first component with one structure (e.g., an unstructured component like a post-it note) and identify its relevance to a second component with a different structure (e.g., a structured component like a table). In some cases, the first and the second components can be associated with two different components of the same SaaS platform. In other cases, the first component can be associated with a third-party application and the second component can be associated with the SaaS platform.

When new information is received in the first component, the generative AI agent analyzes the content to determine the types of information present. It then examines other components associated with the user, including those not directly linked to the first component, to assess the relevance of the new information to existing data and structure compatibility.

The module employs a matching algorithm that assigns scores to potential target components based on the correlation between portions of information in the first structure and components in the second structure. The agent environment 200 notifies the user about highly relevant matches, offering to enrich the data in the second component. This notification can be automatic or triggered by an assessment of the information's importance, based on predetermined thresholds or user-defined settings.

For example, when a user adds a bullet point to a to-do list component, the generative AI agent analyzes the information and evaluates it against the user's array of components, such as project tables. If the information best corresponds to a new row in a specific table or as an addition to existing columns, the agent environment 200 suggests and, with user permission, automatically integrates the information into the appropriate location.

The cross-structure data integration module can also handle complex scenarios, such as processing instructions to import and analyze data from third-party applications. For instance, if a user requests a meeting summary and deal status update in an unstructured to-do list, the generative AI agent can reduce the need to import data from a third-party meeting application, transcribe the conversation, summarize key points, and update the relevant structured components accordingly.

Furthermore, the agent environment 200 includes a context recognition model that provides the generative AI agent with information about components relevant to ongoing processes and their graphic representations. This enables the generative AI agent to incorporate visual elements in its outputs when beneficial, enhancing the clarity of instructions or explanations.

When responding to queries about components, the generative AI agent analyzes whether the query pertains to general component functionality or specific user-associated instances. It can then generate appropriate graphical representations, such as screenshots, icons, or animations, to supplement textual information in its responses.

This capability allows the agent environment 200 to create visually enriched, customized guides for component usage tailored to a user's specific field of work. For example, when asked how to configure a component for a particular industry, the generative AI agent can generate a step-by-step guide with relevant images of the component as it would appear at each stage of the process. Alternatively, or in addition, this capability allows the agent environment to incorporate graphical representations from the SaaS platform in textual correspondences to enhance clarity of a response, or to emphasize a portion of a SaaS platform component in a correspondence.

These advanced data integration and visual enhancement capabilities significantly improve the agent environment 200 ability to provide clear, context-specific guidance and streamline information flow across diverse component structures within the application.

Optionally, the generative AI agent is designed to recognize and address various types of information gaps, including lack of context for certain terminology in the input, absence of one or more concise actions to be performed, and/or inability to understand the desired component from those associated with the user or available in the software application.

Optionally, after gathering necessary information, the generative AI agent may actively seek out and fill necessary information for each task and/or produce initial outcomes for the user to review and/or prepare groundwork for tasks that can't be fully automated, easing the user's decision-making process.

Optionally, the generative AI agent adapts its queries and responses based on the user's inputs. When a user's response doesn't change the results of the initial analysis, the generative AI agent may provide a further elaboration of its original output. When partial information is provided, the generative AI agent may narrow the scope of its inquiry but continues to seek missing information. When new information creates additional gaps, the generative AI agent may identify these and continues the information-gathering process.

For example, a user interacts with the generative AI agent to reschedule a meeting. The generative AI agent demonstrates its contextual understanding by:
 a) Deducing which meeting is being referred to or which platform it's scheduled on, for instance from an analysis of text indicative of user identifiers or meeting subject.
 b) Prompting the user with specific, clarifying questions about the meeting title, date, and preferred new time.
 c) Confirming its understanding before proceeding with the rescheduling action.

In another example, the generative AI agent may be configured to assist in creating one or more tables for planning an event, showcasing its ability to:
 a) Inquire about the type of event (e.g., corporate training workshop).
 b) Request details such as the number of sessions, attendee tracking requirements, and additional planning aspects (logistics, budget tracking).
 c) Create a table, using SaaS platform components chosen to fit a structure that would benefit the common objective of planning the task, based on . . . , to track the desired information based on user responses
 d) Actively seek out and fill necessary information for each task, producing initial outcomes for user review.

These enhanced capabilities allow the generative AI agent to function as a more intelligent and proactive user within the SaaS platform, capable of understanding complex requests, gathering necessary information, choosing a specific permutation of components from a plurality of components with similar functionalities, and performing actions with minimal direct user intervention.

In some embodiments, the generative AI agent is designed to streamline post-meeting processes and deal management within the SaaS platform. This functionality addresses the often-tedious tasks of updating meeting notes, providing activity reports, and keeping the platform current with the latest information.

Figure 2B:
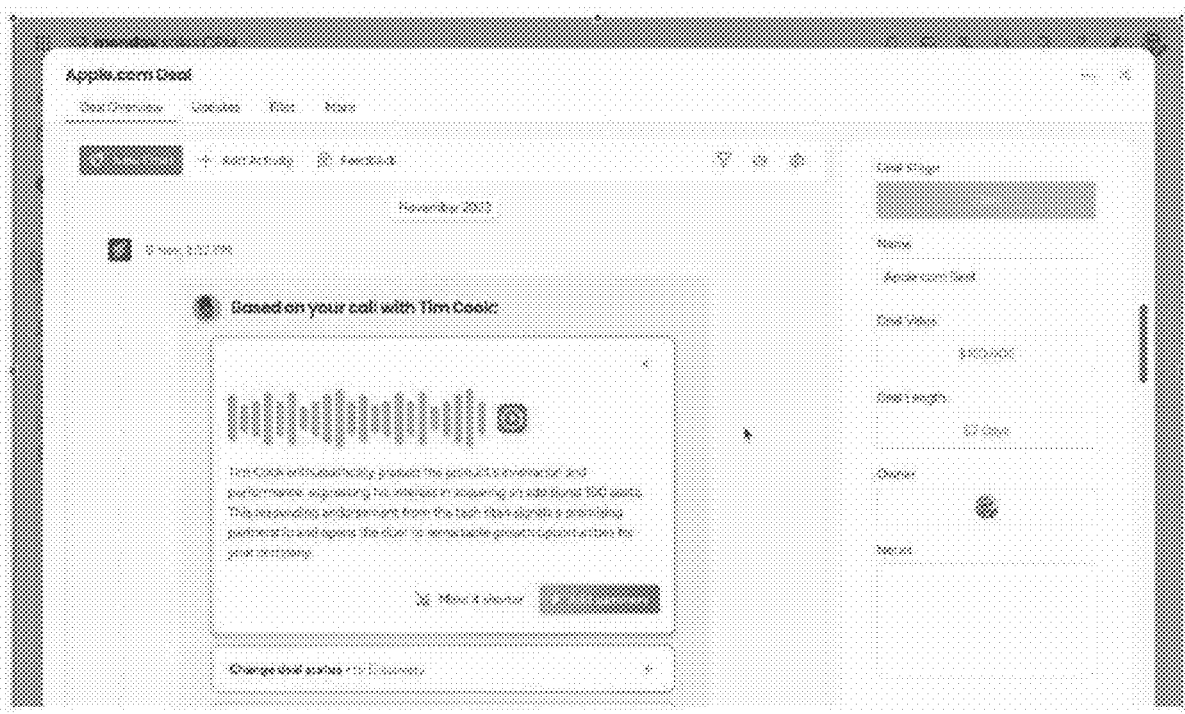
FIGS. 2B-2F are exemplary user interfaces allowing a user to interact with a generative AI agent, consistent with some embodiments of the present disclosure.
Figure 2C:
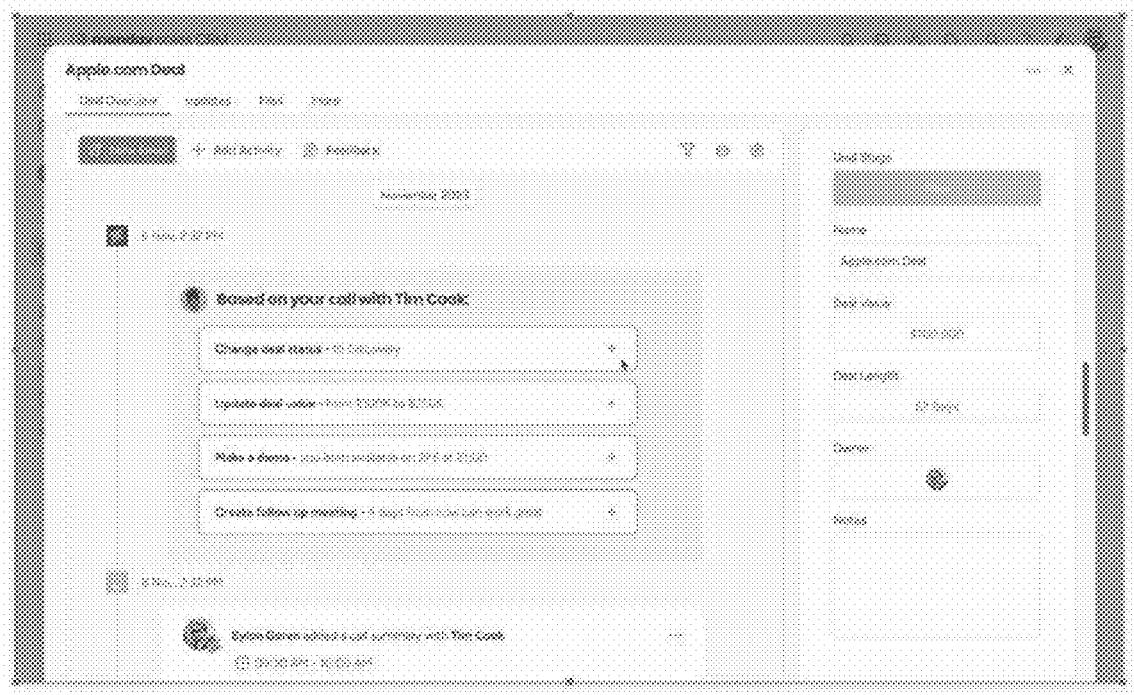

When the generative AI agent has access to meeting audio (either during the call or afterwards), it can analyze the transcript to create a comprehensive meeting summary and present it to the user, for instance as depicted in FIG. 2B. The summary for user review may be incorporated into an item managed by the platform 100 Furthermore, the platform 100 includes a deal interaction log component, which records and stores all interactions associated with a specific deal or project. This deal interaction log is directly accessible from the item itself, allowing users to easily review the history of interactions, including meeting summaries, without navigating away from the current context. The generative AI agent can leverage this deal interaction log to provide more contextually relevant summaries and insights, taking into account the full history of interactions related to the deal. The summary as an input in an item may represent a task to perform or an outcome of an allocated task. The generative AI agent may analyze meeting transcripts and provide users with suggestions for updates to be made in the relevant one or more items based on the meeting discussion. For example, as depicted in FIG. 2C, if a deadline extension is agreed upon, the generative AI agent can suggest updating the corresponding date cell. The generative AI agent may propose changes to status, value, or other relevant item fields based on the meeting content. The meeting summary and its distinct portions remain available for future inquiries by users directly through the item itself, allowing them to revisit discussions or individual contributions as needed.

These meeting records, suggestions, and official client communications are presented in a dedicated interface, as shown in FIGS. 2B and 2C. This interface may serve as a centralized component for displaying meeting summaries, AI-generated suggestions, and tracking any official communication with the client. This interface may not only present the AI's analysis and suggestions but also a chronological record of interactions related to the deal. By consolidating meeting records, AI insights, and client communications, the Deal Interaction Hub provides a holistic view of the deal's progress and history, enabling users to make informed decisions and maintain a clear audit trail of all deal-related activities. In some embodiments, the generative AI agent includes a calendar management module configured to assist users with scheduling and deadline decisions. This module may analyze multiple data sources including:

User-specific information and application data
    The user's current data profile
    Context of the scheduling decision
    Account policies
    Data from external connected applications The calendar management module utilizes machine learning algorithms to process this data and provide data-driven scheduling suggestions to users. For example, when a user opens a calendar interface to set a project deadline, the generative AI agent may automatically activate to analyze factors such as:

Historical completion times for similar tasks
    The user's current workload
    Events already scheduled in the user's calendar
    Calendar information and workload of other team members
    Project dependencies and SLAs associated with the user's account Based on this analysis, the generative AI agent can suggest an optimal due date for the task. The calendar interface may allow users to interact with the generative AI agent through natural language inputs, which are translated into actionable dates reflected on the calendar. The generative AI agent can also provide explanations for its suggested timelines.

The generative AI agent's calendar management capabilities may be initiated in several ways:

1. User-initiated—The user may provide a natural language input requesting scheduling assistance or click a designated button to activate the generative AI agent or generative AI model analysis.
2. Automatic activation—The generative AI agent or generative AI model activates automatically when a user access calendar-related component.
3. Trigger-based—The generative AI agent or generative AI model activates based on predefined triggers or backend configurations.

In some cases, the agent environment 200 tracks utilization rates of these calendar AI features. When usage of a specific calendar-related AI capability exceeds a threshold, the agent environment 200 may adapt to automatically activate that capability whenever calendar usage occurs or is predicted based on user patterns.

As illustrated in FIG. 2B, the generative AI agent may create update suggestions within the deal overview UI, presenting a summary of the client call and offering options to modify or post the summary as an update. FIG. 2C demonstrates how the generative AI agent provides amended update suggestions after the initial summary is added. These suggestions include various actions determined by the generative AI agent based on the call transcript, such as changing the deal status or updating the deal value.

To address privacy concerns and limit the generative AI agent's exposure to sensitive information, the agent environment 200 provides mechanisms for controlled information sharing. In general, the generative AI agent's exposure to a specific account information is limited to SaaS platform elements/components to which a user has provided access to. For example, users can assign a generative AI agent to a specific item in a table, granting access only to that item's data without exposing other items in the same table. Optionally, the generative AI agent may be represented by an avatar similar to user avatars but with distinguishing features (e.g., rectangular shape) to differentiate it from human users. When items are interconnected, the agent environment 200 may request additional user permission for the generative AI agent to access related information. Alternatively, the generative AI agent can be associated with a GUI element displaying a list of accessible items. Users can add or remove items from this list to grant or revoke permissions. Users can mark elements in a specific mode to add them to the generative AI agent's accessible items list.

Consistent with some embodiments of the present disclosure the generative AI agent enhanced with personal assistant functionalities, further extending its role as an intelligent user within the SaaS platform. These functionalities are designed to assist users in managing tasks, time, and communications more effectively. The generative AI agent may identify tasks assigned to the user and determine necessary information for task fulfillment, analyze and request access to resources needed for responding to queries or completing assignments and/or track items assigned to users and provide reminders, similar to a project manager.

Optionally, the generative AI agent send reminders through the platform or other enabled communication channels (e.g., Slack, WhatsApp), provide item information with reminders and perform actions like summarization, assist users in modifying item details and/or analyze justifications for task delays and suggest corresponding actions, considering cascading effects on dependent and interconnected items.

Optionally, the generative AI agent may analyze and arrange user tasks in order of importance, assign estimated completion times to tasks, considering various constraints (deadlines, urgency, teamwork, dependencies, holidays, capacity, churn rate, etc.), populate a calendar with time blocks for tasks, creating daily itineraries, provide users with information on the next task requiring attention, offer custom task suggestions based on user-provided constraints (e.g., tasks that can be completed alone in under 45 minutes), and/or adjust subsequent time blocks based on early or late task completion.

The generative AI agent may act as a communication gateway, receiving communications on behalf of or in addition to the user, analyze communications to determine if sufficient information is available for response, track and summarize resolved communications for user review and/or reach out to third parties (with permission) to obtain missing information for proper responses.

Figures 2D, 2E:
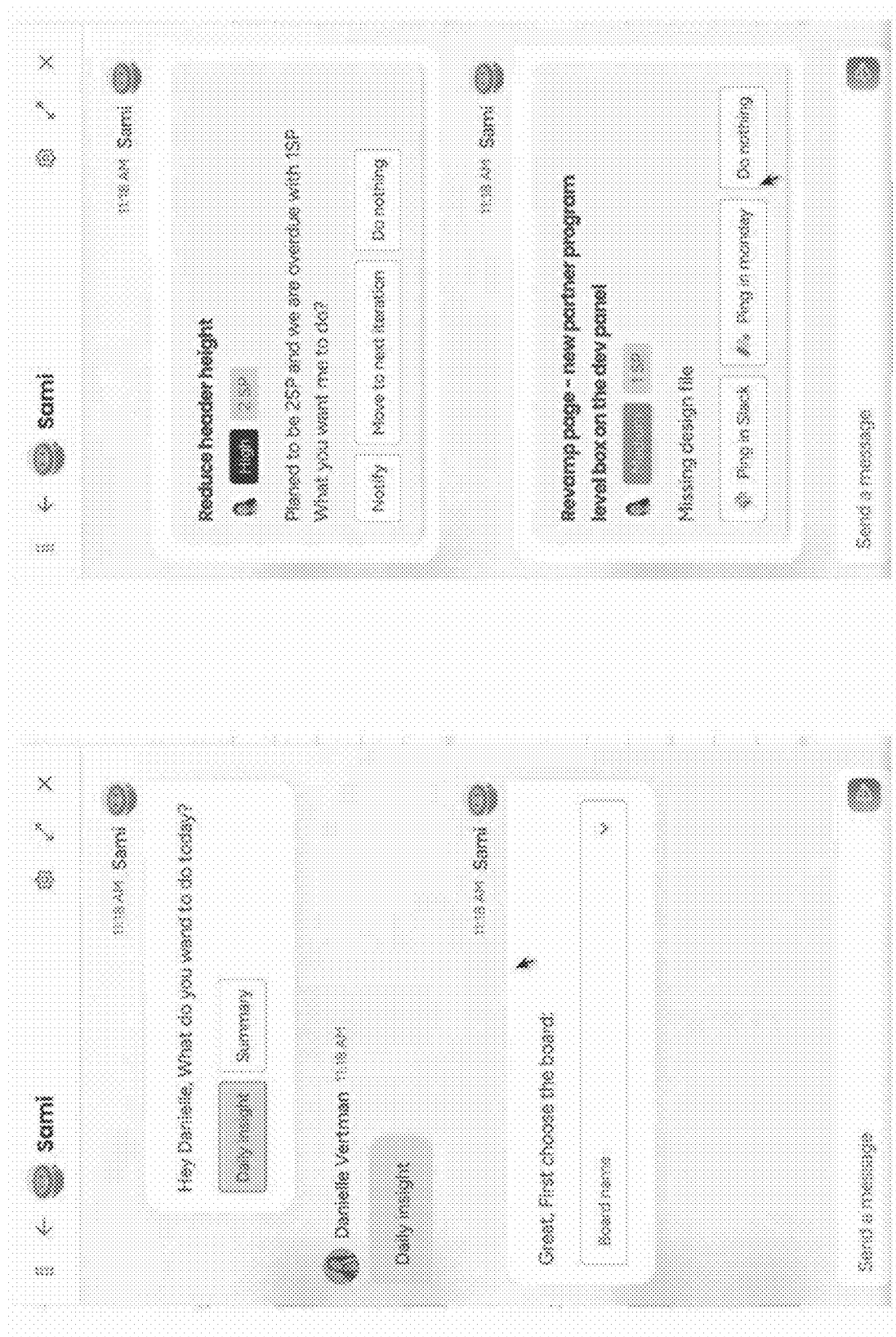
Figure 2F:
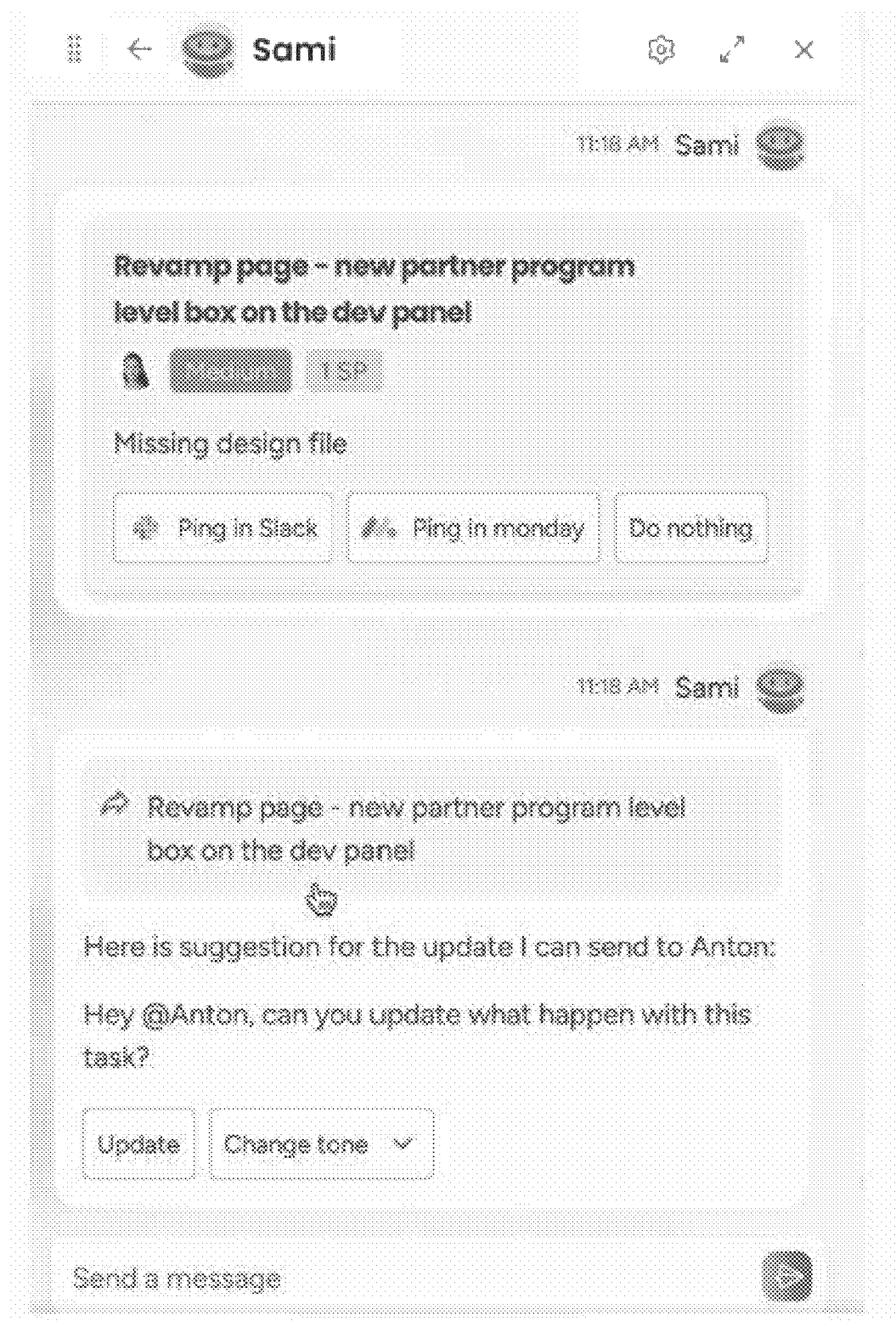

In some implementations, the generative AI agent may present as a single entity with a unified avatar and 'personality', while actually comprising multiple AI agents centrally managed to perform different tasks. As illustrated in FIG. 2D, the generative AI agent can provide daily insights upon user request. It may ask for specifics, such as which board/table to focus on for insights. FIG. 2E demonstrates how the generative AI agent can provide multiple insights about elements/items/projects in a selected board, along with suitable options for each insight. FIG. 2F shows the generative AI agent's ability to draft notifications based on user selection, accumulating relevant data and determining appropriate wording.

Users may modify the tone or approve the notification for sending. The generative AI agent may recognize patterns in user requests and suggest automating recurring tasks, such as setting up daily notifications for insights that are frequently requested.

Consistent with some embodiments of the present disclosure the generative AI agent is assigned with a profile defining its role in a team assigned to a project documented in one or more table structures. The role allows a permission manager such as 114, to assign permissions to the agents based on his position in the team and/or role, for instance as a team support member, an accountant specialist, a programmer, a legal advisor and/or the like. The role may be automatically deduced by prompting an AI model with information about one or more team members, for instance from user accounts assigned to the table structures, and/or automatically deduced from the table structures themselves, for instance by prompting a generative AI model with information about the team members and/or the table structures themselves.

As described in detail above, the process depicted in FIG. 2A, implemented by the agent environment 200's processors (201), represents a significant advancement in the integration of AI capabilities within SaaS platforms, enhancing user productivity, data analysis, and decision-making processes in a structured and objective-oriented manner.

The flow depicted in FIG. 2A may describe, for example, a use case where in a software development project, a generative AI agent is added to a sprint planning board. It analyzes past sprint performances, team velocity, and current backlog items to suggest optimal task distributions and sprint goals. The generative AI agent updates the board with these suggestions, allowing the project manager to make informed decisions quickly.

In some embodiments, the agent environment 200 includes a user behavior monitoring module configured to continuously monitor and record actions performed by users within the SaaS platform, identify and analyze user work patterns, defined as sequences of interactions with system components to perform tasks and advance processes, recognize opportunities for more efficient work patterns, and suggest improvements to user workflows. The user behavior monitoring module utilizes machine learning algorithms to process interaction data and identify patterns. Specifically, it may implement event logging to capture detailed user interactions with platform components, use sequence mining algorithms to detect recurring patterns in user workflows, maintain a knowledge base of optimal work patterns for various tasks, employ similarity measures to compare observed patterns against known efficient patterns and utilize natural language processing to analyze content relationships between components accessed in sequence. When a potentially inefficient work pattern is detected, the agent environment 200 analyzes: components involved in the current workflow, available automations or AI-powered features that could optimize the process, user permissions and enabled features and/or content relationships between sequentially accessed components.

Based on this analysis, the agent environment 200 may generate suggestions for workflow improvements. For example, if a user is observed repeatedly switching between two components to manually summarize text, the agent environment 200 may detect the repetitive pattern of alternating component access, analyze text content in both components to infer a summarization task, identify an available AI-powered summarization feature and/or generate a suggestion to implement the generative AI agent or generative AI model summarization to automate the workflow. The agent environment 200 presents these suggestions via a non-intrusive interface, providing details on the detected inefficiency, proposed optimization using available platform features, estimated time/effort savings, and/or step-by-step guidance for implementing the suggested changes. This intelligent workflow optimization capability continually adapts to evolving user behavior and newly available platform features to drive ongoing efficiency improvements.

Figure 3:
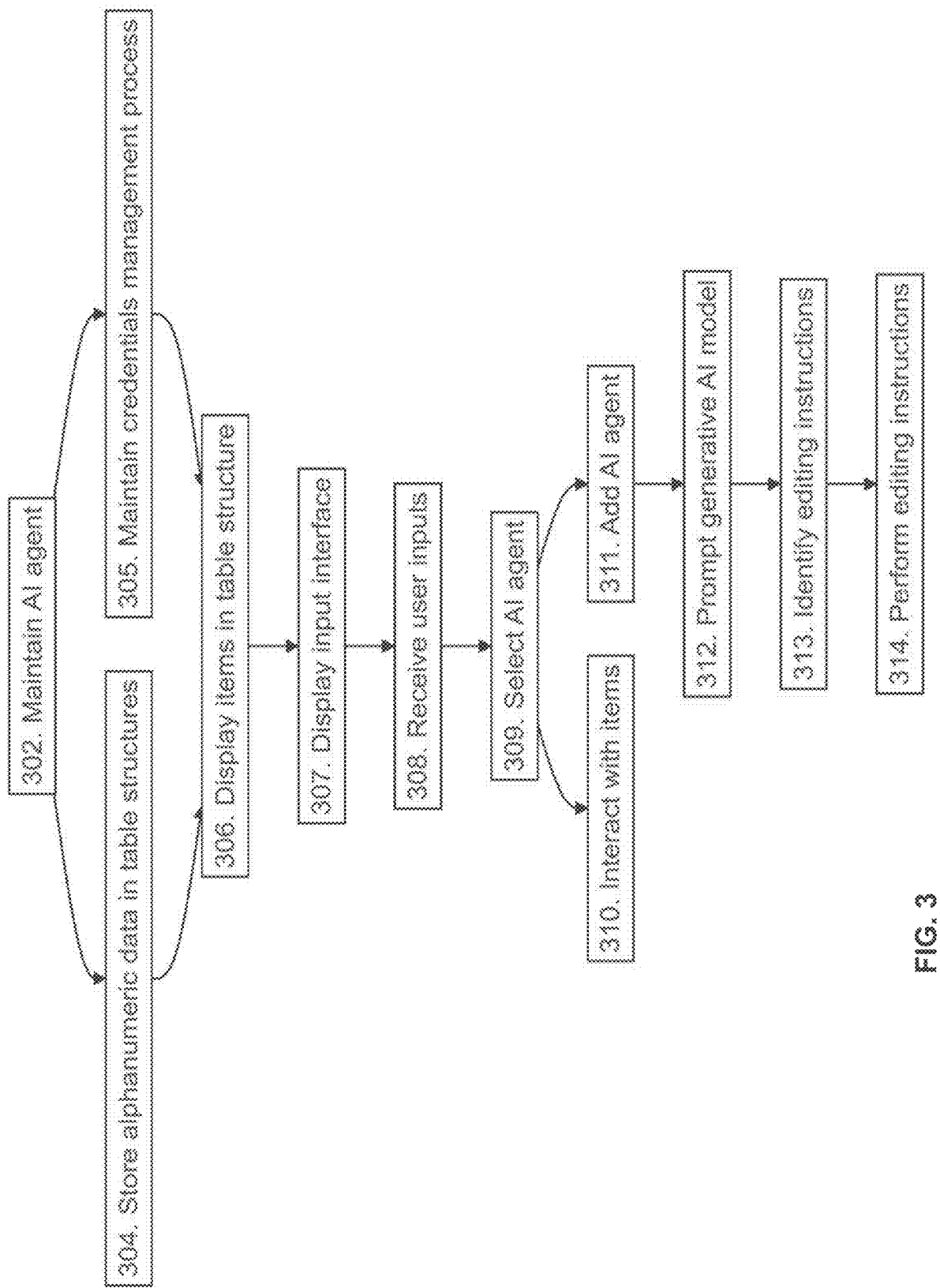
FIG. 3 is a flowchart depicting actions performed by the described system, consistent with some embodiments of the present disclosure.

While FIG. 2A focused on one process, we now delve into other actions performed by the agent environment 200. Reference is now also made to FIG. 3 which is a flowchart depicting actions performed by the described system, consistent with some embodiments of the present disclosure. The flowchart is implemented using a SaaS platform, such as the agent environment 200 depicted in FIG. 1A, consistent with some embodiments of the present disclosure, for instance using the agent environment Before discussing this flowchart, it's should be noted that alphanumeric data within the SaaS platform may be found in various locations, including but not limited to project boards, task lists, user profiles, communication logs, and document repositories. In these embodiments, there is described a system for using generative artificial intelligence for intent-based interaction within a SaaS platform having one or more processors configured to maintain a generative AI agent, as shown at 302. This AI agent is designed to interact with sets of alphanumeric data stored in one or more table structures within the SaaS platform, see for example 304. Each table structure contains a plurality of items comprising the alphanumeric data, such as task descriptions, due dates, assigned team members, and status indicators.

The generative AI agent is associated with a profile that defines its role within a team assigned to a specific project. A profile in this context refers to a set of parameters that determine the AI agent's capabilities, access permissions, and behavioral characteristics. For example, a profile might specify that the AI agent has read-write access to certain project boards, can analyze meeting transcripts, and is authorized to suggest task reassignments.

The concept of a team in this platform refers to a group of users, both human and AI, who collaborate on a specific project or set of tasks. The platform includes a team management interface where teams may be created, modified, and assigned to projects. This interface allows for the seamless integration of AI agents as team members alongside human users.

For example, a marketing team working on a product launch might include human team members such as a project manager, content writers, and designers, as well as an AI agent profiled to assist with task scheduling and resource allocation. The AI agent's role within this team would be defined by its profile, which could include permissions to access marketing campaign data, analyze team performance metrics, and suggest optimizations to the project timeline.

As shown at 302 and 305, the agent environment 200 also maintains a credentials management process such as the permission manager 114 that defines and controls access rights for a plurality of users, determining their ability to interact with the alphanumeric data. This ensures proper data security and granular access control within the platform.

As shown at 306, the processors are configured to cause a display of the plurality of items in a table structure, along with at least one input interface, as shown at 307. As shown at 308 and 309, this interface is designed to receive user inputs for two primary purposes: interacting with the plurality of items (310) and adding the generative AI agent to interact with the alphanumeric data (311). The interaction of the generative AI agent with the data is controlled by the credentials management process, ensuring that it operates within the defined access parameters. The process of adding the generative AI agent to interact with the alphanumeric data can be accomplished through one or more methods within the platform. For example, one way to add the AI agent is through the user column in the table structure. In this method, users can assign the AI agent to specific items or tasks by selecting the AI agent's avatar or identifier from a dropdown menu in the user column, similar to how human team members are assigned. This allows the AI agent to be directly associated with and granted access to the data related to that specific item or task. For example, when a user wishes to assign a generative AI agent to a task, the cell of the people column in a desired row can be selected by a user. Then, a list of all the available entities that can be assigned to the task, including generative AI agents, is shown, either textually or graphically (e.g., via a graphical representation of each entity). Upon selection of one or more entities, their representations are introduced into that cell, and the SaaS platform updates the database to associate the entities with that Item. In case where one of the entities is the generative AI agent, permissions to access data, and log history associated with the assigned task will be provided thereto automatically.

Additionally or alternatively, the board users' interface may be used. In this interface, administrators or users with appropriate permissions can add the AI agent as a "user" of the board. This grants the AI agent broader access to the entire board's data, allowing it to interact with multiple items and perform board-wide analyses and actions. Additionally or alternatively, users can also assign the AI agent to specific tasks or processes within a board. This can be done through a dedicated button or option within each task's detailed view, allowing for granular control over which tasks the AI agent can interact with. Additionally or alternatively, the AI agent can be added to interact with data based on predefined roles. For example, a "Data Analyst AI" role could be created and then assigned to relevant boards or projects, automatically granting the AI agent the necessary permissions to interact with data typically accessed by a data analyst. Additionally or alternatively, the platform may offer an API that allows programmatic integration of the AI agent. This method enables developers or system administrators to automate the process of adding the AI agent to multiple boards or projects based on predefined criteria or triggers. In all these methods, the credentials management process ensures that the AI agent's interactions are limited to the scope defined by its assignment and role, maintaining data security and access control. This process checks the AI agent's permissions against the access requirements of the data it attempts to interact with, allowing or denying operations based on these defined parameters.

When activated, as shown at 312, the agent environment 200 prompts a generative AI model with the generative AI agent's profile and one or more indications of the plurality of items or the table structure. As shown at 313, this prompting enables the AI model to identify editing instructions that the generative AI agent should execute on one or more of the plurality of items. As shown at 314, the agent environment 200 then performs these editing instructions using the user credentials, ensuring that all actions are authorized and traceable.

The generative AI agent's functionality is dynamic and changes based on its assigned role within the team. For instance, a generative AI agent with a compliance-focused role would scan inputs for policy violations, while one assigned a language-teaching role would track grammar and vocabulary issues. Similarly, a generative AI agent with a visionary role might suggest additions to align with company goals. This role-based approach allows the generative AI agent to adapt its behavior and actions according to its assigned profile within the team, enhancing its effectiveness in supporting the project documented in the table structures.

The agent environment 200's design allows for seamless integration of AI capabilities into the workflow, enabling users to leverage advanced AI functionalities without requiring deep technical knowledge. By analyzing data and context, the generative AI agent can understand user intent and suggest or perform actions accordingly. This might include updating items, generating reports, or providing insights based on the data available in the table structures and the alphanumeric data contained therein.

These embodiments allow organizations to incorporate AI-driven assistance into their project management and collaborative workflows, enhancing productivity and decision-making processes within the SaaS platform without man guidance.

Figure 4A:
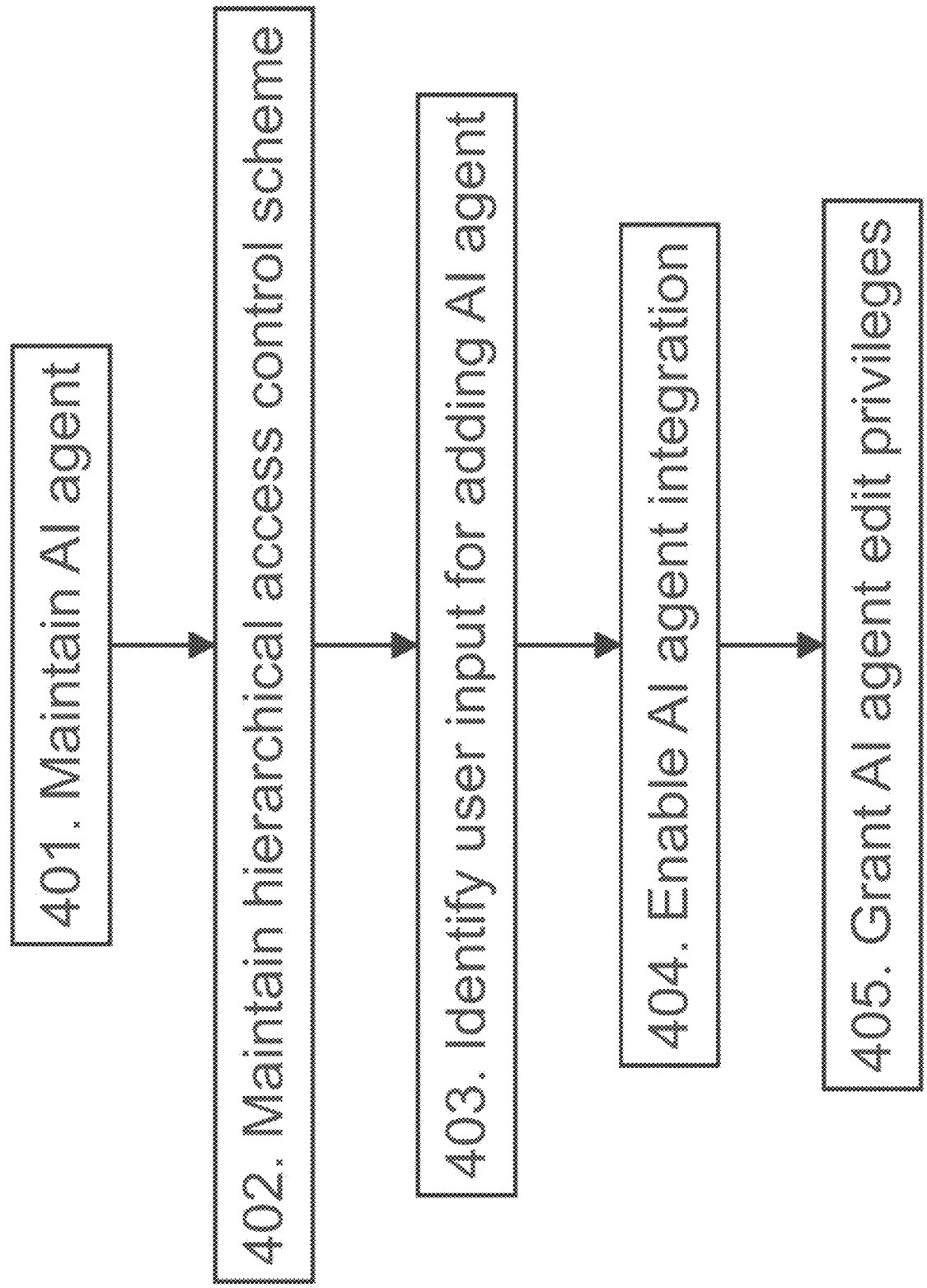
FIG. 4A is a flowchart of a computerized method for using generative artificial intelligence for intent-based interaction within a SaaS platform, consistent with some embodiments of the present disclosure.

Having explored the above workflows, we now turn our attention to the hierarchical access control scheme. Reference is now also made to FIG. 4A which is a flowchart of a computerized method for using generative artificial intelligence for intent-based interaction within a SaaS platform, consistent with some embodiments of the present disclosure. The flowchart is implemented using a SaaS platform, such as the agent environment 200 depicted in FIG. 1A, consistent with some embodiments of the present disclosure, for instance using the agent environment. This method, implemented by one or more processors, provides a solution for integrating AI agents into a hierarchical SaaS environment with controlled access privileges.

The process begins with maintaining a generative AI agent (step 401) configured to interact with alphanumeric data stored in table structures within the SaaS platform. In this case, these table structures are associated with different departments within an account. Concurrently to 401, the process maintains a hierarchical access control scheme (step 402) that maps the table structures to privilege classes, defining inheritable edit privileges. This scheme forms the basis for the generative AI agent's access rights within the agent environment 200. The method then identifies a user input (step 403) indicating the addition of the generative AI agent as a user to one or more table structures associated with a specific department. This step enables the integration of the generative AI agent into the desired area of the SaaS platform (404).

Finally, the method grants the generative AI agent edit privileges (step 405) inherited based on the hierarchical access control scheme of the department to which it's added. This ensures that the generative AI agent's capabilities are appropriately scoped to its assigned area.

Figure 5:
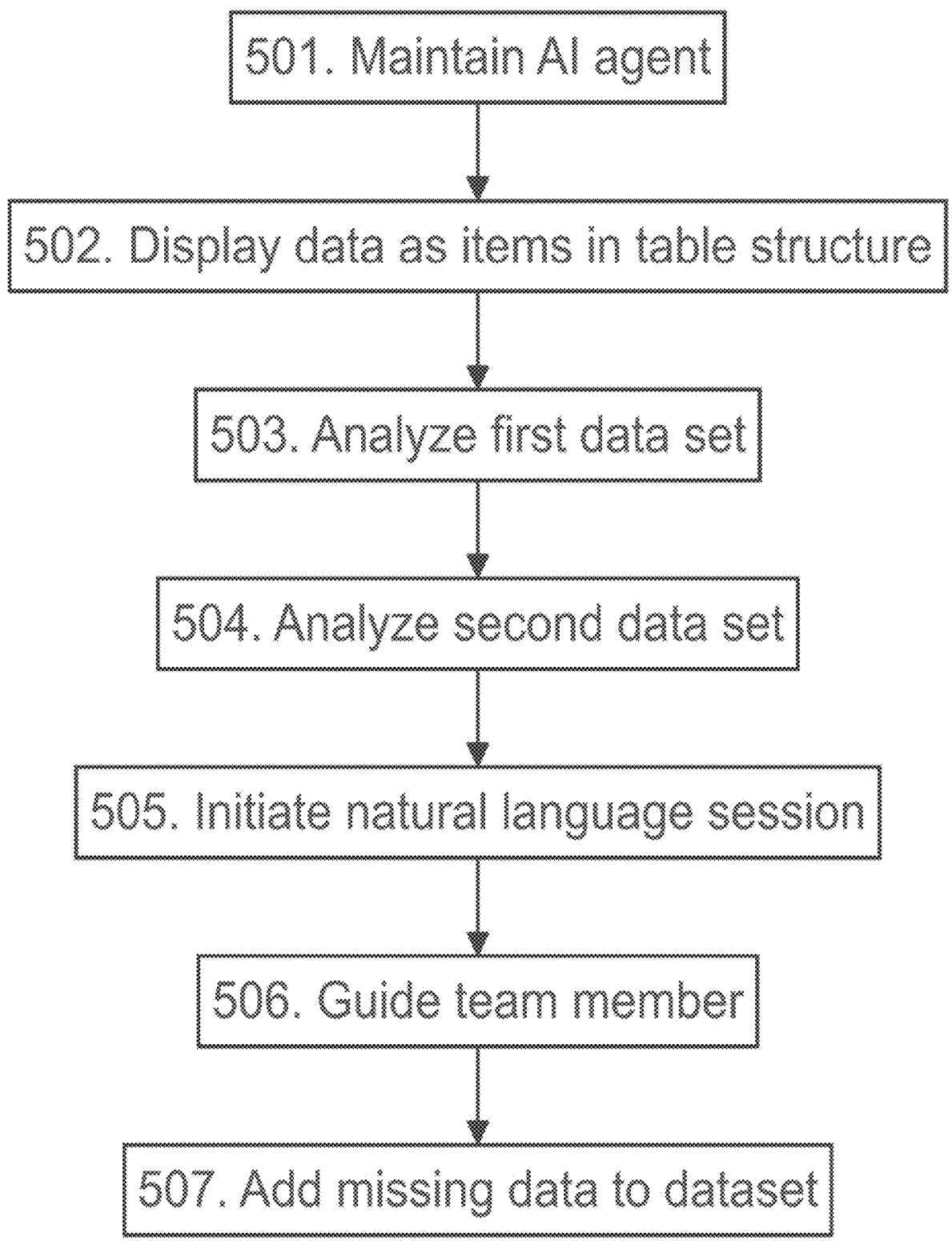
FIG. 5 is a flowchart depicting a process for automatically identifying missing data or actions in a data structure and AI-driven task assignment, consistent with some embodiments of the present disclosure.

The hierarchical access control scheme described here may complement the proactive information gathering process outlined in FIG. 5. By combining these features, the generative AI agent may autonomously collect information while respecting the access privileges defined by its position in the organizational hierarchy.

The process can be extended with additional features as described in the subsequent description. These include an onboarding process for the generative AI agent, the ability to add multiple instances of the generative AI agent with different privileges, and mechanisms for adapting the generative AI agent's output based on user roles and context.

Furthermore, the process allows for maintaining multiple AI agents with different profiles, training the AI model on diverse datasets, and personalizing the generative AI agent based on task context.

This method provides a flexible and powerful approach to integrating AI capabilities into a SaaS platform, with built-in safeguards for data access and customization options to suit various organizational needs.

For example, in an exemplary use case of a multi-level Marketing Campaign Management a global marketing team is using the described SaaS platform. A generative AI agent at the global level has access to overall brand guidelines and campaign performance data. Regional AI agents, inheriting some privileges from the global agent, access and analyze region-specific data to tailor campaigns, while country-level AI agents have the most granular access to local market data for hyper-local campaign optimization.

In this hierarchical structure, the flow of information and insights is designed to move both upwards and downwards. Country-level AI agents, which are assigned to tables associated with a single country, provide summaries of their analyses and local campaign performance to the Regional AI agents. These Regional AI agents, while not directly associated with the country-level boards, have access to regional boards that aggregate data from multiple countries.

The Regional AI agents, in turn, synthesize the information from various country-level reports, identifying regional trends, best practices, and areas for improvement. They then provide consolidated regional summaries to the global AI agent. This global agent, with its overarching view of all regions and countries, can identify global trends, ensure brand consistency across all markets, and disseminate high-level strategies back down through the regional and country-level agents.

This multi-tiered AI agent structure allows for efficient information flow and decision-making at all levels of the organization that may focus on a hyper-local optimization and provides granular insights, aggregate country data and ensure overall brand consistency. Each level of AI agent may operate within a defined scope, with carefully managed access permissions that allow for necessary data sharing while maintaining appropriate data segregation and security. This structure enables the organization to balance global consistency with local relevance in their marketing campaigns, leveraging AI at each level to enhance decision-making and campaign effectiveness.

In some embodiments, the agent environment 200 includes an organizational development module configured to analyze utilization data, component usage patterns, and account information to provide data-driven insights for account managers, administrators, and other roles. This module processes information to identify work management processes involving one or more components of the software application.

The organizational development module monitors inputs and behaviors across all account users to establish standard timings and behaviors for various workflows. It then compares current processes against these deduced standards to identify gaps or abnormalities. By analyzing the components involved in these discrepancies, the module can infer high-level conclusions about organizational management, such as resource allocation issues, component misuse, or process inefficiencies.

Optionally, the organizational development module manages agents with different domains of expertise and/or permission level. For example, some agents, referred to as task-level agents, are assigned to specific types of tasks or projects within a department to monitor and analyze the time taken for completion, common bottlenecks, and typical user behaviors associated with these specific tasks. For example, a "software development task" AI agent might focus on coding, testing, and deployment workflows. In parallel other agents may aggregate data from multiple task-level agents within a single department. They identify department-specific patterns and establish benchmarks for different types of workflows within that department. For instance, an AI agent would analyze and compare various marketing campaign workflows, content creation processes, and analytics tasks. Additionally or alternatively some agents are granted with permissions to access data across multiple departments. They focus on identifying interdependencies between different departmental workflows and how they impact overall organizational efficiency. For example, they might analyze how delays in the product development department affect marketing campaign timelines. Additionally or alternatively some agents have access to aggregated data from all departments. They provide high-level insights on organizational efficiency, identify macro-level trends, and suggest strategic improvements to workflows across the entire organization. Such a hierarchical structure of AI agents allows for nuanced analysis at various levels of the organization. Each AI agent operates within its domain of expertise and permission level, recognizing the unique characteristics and requirements of different tasks and departments. This approach ensures that workflow analysis and optimization are context-aware and relevant to each specific area of the organization, while still allowing for broader, organization-wide insights and improvements.

The module may incorporate knowledge of common industry practices, comparing current processes or established standards against relevant market norms to generate additional insights. These insights can address current situations or predict future performance issues. For example, the module may calculate typical task completion rates and compare them against available resources to forecast potential bottlenecks.

Insights generated by the organizational development module can be directed to predetermined roles within the account, such as administrators. Alternatively, the module may determine which users would benefit most from specific insights and target delivery accordingly. This intelligent routing ensures that insights reach the most appropriate decision-makers, even in cases where the subject of an insight might not be the ideal recipient.

When a user initiates a new process, the organizational development module can be configured to provide contextually relevant information. Once it has gathered sufficient data to infer the process type, the module queries its database for relevant information, drawing from previous implementations, established standards, or a combination of available external information and known application component usage patterns.

The module can also analyze provided or inferred roadmaps to identify missing resources or components necessary for timely completion. For instance, it may deduce required staffing levels based on projected work hours and compare this against current staffing, notifying HR or roadmap designers of potential shortfalls.

Additionally, the organizational development module can generate suggested plans to achieve specified company goals. By analyzing past work management processes and current resources, the module identifies gaps in resources, processes, or methodologies. It then constructs a roadmap to address these gaps, potentially including risk assessments and mitigation strategies based on the relevant work management field.

The module is also capable of identifying dependencies between software application components, such as task interdependencies within project lists. It can automatically define these dependencies within the agent environment 200 and optionally notify relevant users of their existence.

This comprehensive organizational development capability enables data-driven decision-making and proactive resource management, continually adapting to evolving business needs and available platform features to drive ongoing efficiency improvements and strategic alignment.

The generative AI agent may be built on a generative AI model, for instance using a transformer-based architecture such as GPT (Generative Pre-trained Transformer). This model is trained on a diverse dataset of interactions with alphanumeric data stored in various table structures across the SaaS platform and optionally other platforms. The training process involves supervised learning techniques, where the model learns to generate appropriate responses and actions based on input queries and context.

The generative AI agent may be designed with a modular architecture, allowing it to interface with different components of the SaaS platform such as:
  a) Data Access Module: Interfaces with the SaaS platform's database to read and write alphanumeric data in table structures.
  b) NLP Module: Processes user queries and generates human-like responses.
  c) Task Execution Module: Translates high-level instructions into specific database operations or API calls within the SaaS platform.
  d) Context Management Module: Maintains and updates the generative AI agent's understanding of its current context within the SaaS platform's hierarchical structure.

Optionally, the generative AI agent is capable of performing editing instructions without requiring specific step-by-step guidance from team members, leveraging its training and context understanding to infer the appropriate actions.

Optionally, the hierarchical access control system is implemented using a tree-like data structure, where each node represents a level in the organizational hierarchy and may contains one or more of the following:
  a unique identifier for the hierarchical level;
  a list of associated table structures; and
  a set of privilege classes defining edit permissions.

The agent environment 200 can be configured to use an inheritance mechanism, where child nodes inherit privileges from their parent nodes and may have additional privileges. This may be implemented using a recursive function that traverses the tree structure to compile the complete set of privileges for any given node. Multiple instances of the generative AI agent may be added to different levels of this hierarchical structure. Each instance is associated with a node in the tree and inherits the privileges of that node. The agent environment 200 maintains a mapping between AI agent instances and their corresponding nodes in the hierarchy. For example, a first AI agent at a higher level might have a base set of edit privileges, while a second AI agent at a lower level inherits these privileges and gains additional, more specific edit rights.

Figure 4B:
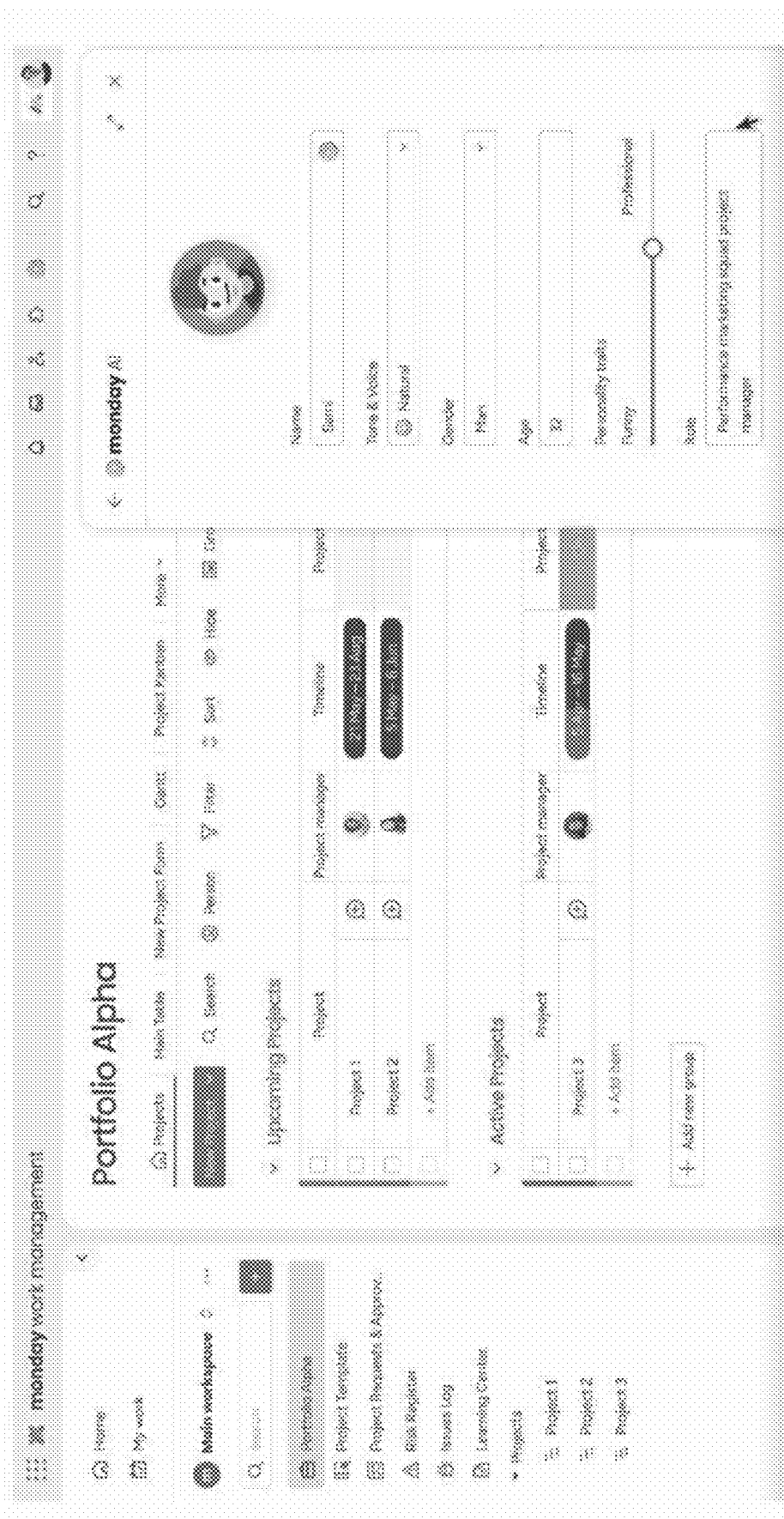
FIG. 4B is an exemplary user interface allowing a user to interact with a generative AI agent, consistent with some embodiments of the present disclosure.

Optionally, the onboarding process for the generative AI agent involves a role assignment where the generative AI agent is assigned a specific role within the team or project. In this case, the agent environment 200 collects relevant information about the project, team structure, and specific tasks. For example, FIG. 4B depicts a window 450 allowing a user to define a role of an added AI agent, a definition which may be converted into prompt(s) provided as an input to the generative AI agent.

Based on the role and context, the agent environment 200 sets appropriate access permissions for the generative AI agent. A tailored knowledge base is created for the generative AI agent, containing context-specific information and know-how related to its role. The personalization of the generative AI agent may be achieved through one or more of the following (separately or a combination thereof):
  a) Fine-tuning: The base AI model is fine-tuned on the context-specific data gathered during onboarding.
  b) Prompt Engineering: A set of role-specific and context-specific prompts are created to guide the generative AI agent's behavior in different situations.
  c) Dynamic Context Updating: The generative AI agent continuously updates its understanding of the context based on interactions and changes in the SaaS platform.

The generative AI agent may employ a context-aware response generation system that considers:
  a) User Role: The agent environment 200 maintains a database of user roles and their associated permissions and responsibilities. b) Interaction Location: The generative AI agent tracks its current location within the SaaS platform's structure. c) Query Context: NLP techniques are used to understand the context and intent of user queries.

In some embodiments, the agent environment 200 includes a persona-specific knowledge base module configured to artificially limit the information accessible to the generative AI agent and tailor its outputs accordingly. This module can be instructed to restrict its knowledge to information contained within a designated database or to the information familiar to a specific user, as deduced from analyzing that user's log records and interactions within the agent environment 200.

The persona-specific knowledge base module is capable of adapting the style, phrasing, and editing of its outputs to mimic a particular user's communication patterns. It achieves this by analyzing the manner in which the target user has historically styled, phrased, and edited their inputs to the application. This stylistic mimicry can be combined with the knowledge limitation feature to create an AI persona that closely approximates a specific user's knowledge and communication style.

This functionality proves particularly useful in scenarios where a query needs to be directed to a user who is absent, unavailable, or no longer associated with the account. Other users can interact with this AI persona to access information known to the absent user, maintaining continuity of knowledge within the organization.

For instance, when an employee leaves the company, instead of deleting their account, an administrator can instruct the generative AI agent or generative AI model to create an AI persona for that account. This persona's knowledge of the application is limited to the information the departing user was exposed to during their tenure. The module studies the style in which the user interacted with the application and any connected third-party applications to accurately mimic their communication style. This approach allows other users to benefit from the knowledge accumulated by the departing user, preserving valuable institutional memory that might otherwise be lost.

The persona-specific knowledge base module employs sophisticated natural language processing and machine learning algorithms to analyze and replicate user communication patterns. It maintains separate knowledge graphs for each user persona, ensuring that information access is appropriately limited. When generating responses, the module first queries the restricted knowledge base, then applies the learned stylistic patterns to format the output.

This capability not only preserves knowledge but also maintains the familiar interaction patterns that team members have come to expect from their colleagues. It can smooth transitions during personnel changes and ensure that critical information remains accessible even after key team members have departed.

Based on these factors, the generative AI agent dynamically adjusts its output using:
 a) Response Templates: Pre-defined templates for different types of responses, customized for different roles and contexts.
 b) Content Filtering: A filtering mechanism that ensures the generative AI agent only provides information appropriate to the user's role and permissions.
 c) Tone Adjustment: NLP techniques to modify the tone and complexity of responses based on the user's role and the query context.

Figure 4C:
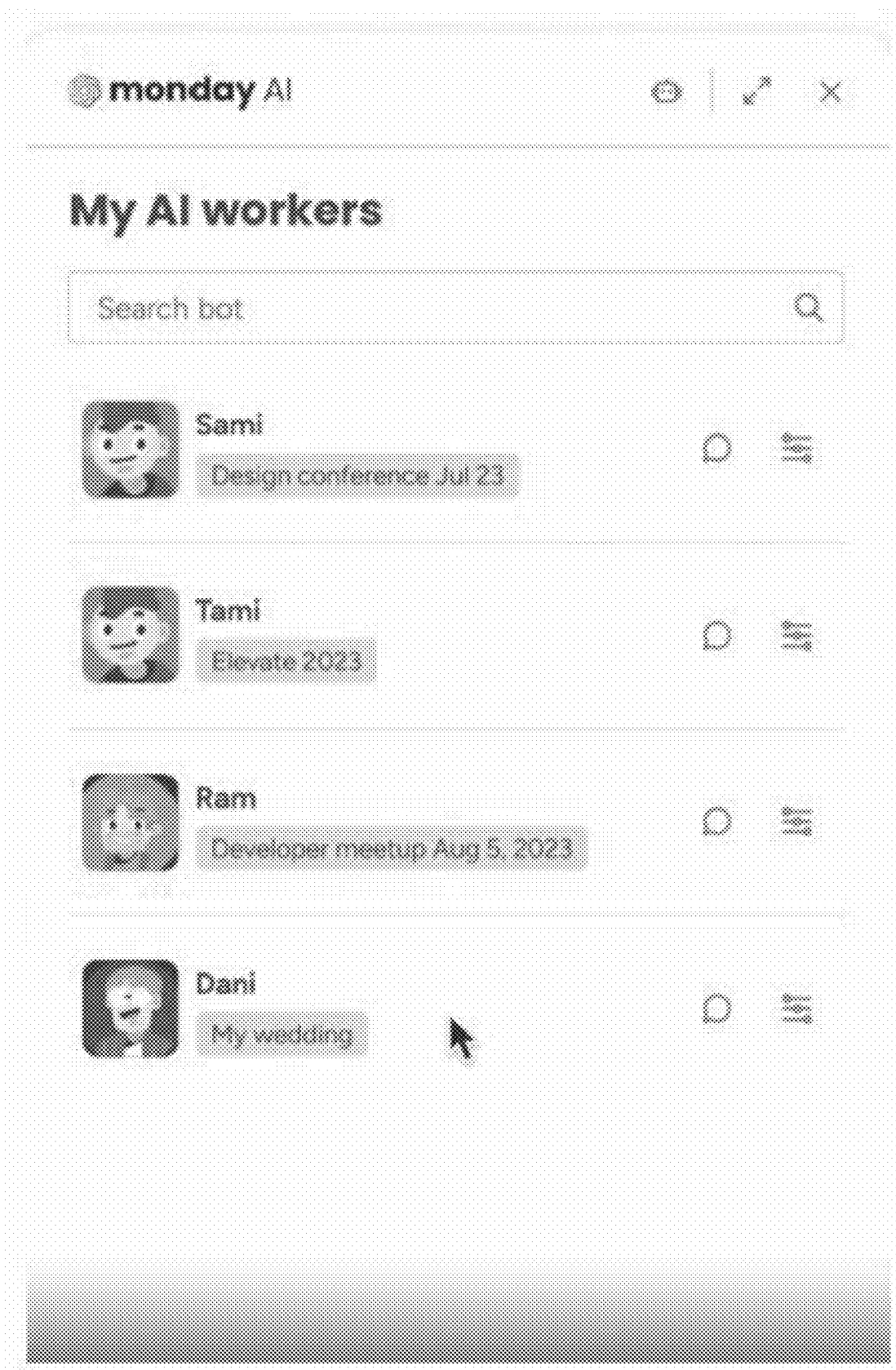
FIG. 4C is an exemplary user interface including a list of multiple AI agent assigned to a user account, for instance purchased or other used by a user of the user account, consistent with some embodiments of the present disclosure.

Multiple AI agents with different profiles can be maintained, each with its own set of response templates and content filters tailored to its specific role. For example, FIG. 4C depicts a list of multiple AI agent assigned to a user account, for instance purchased or other used by a user of the user account. Each one of the generative AI agents may differ from one another in credentials, privileges, cost, training datasets, used models, identifiers and/or availability, for example as described herein with reference to any of the cited references. The generative AI agent may work separately and/or communicate with one another either via the system platform user interfaces and/or via different channels, optionally based on textual inputs.

Optionally, the generative AI agent can be embodied as an avatar, implemented as a graphical user interface (GUI) element within the SaaS platform. This avatar serves as a visual representation of the generative AI agent and provides a point of interaction for users. When introduced to a task, the avatar may trigger one or more of the following:
 a) Access Grant: The agent environment 200 automatically grants the generative AI agent permission to access relevant log history and context items.
 b) Context Loading: The generative AI agent loads the task-specific context into its working memory.
 c) Interface Update: The avatar's appearance or behavior may change to reflect its current task context and permissions.

This technical specification provides a comprehensive overview of the agent environment 200's architecture and functionality, covering both the main method and its various extensions as described in the dependent claims. The actual implementation would involve detailed coding of each component, database design for storing hierarchical structures and permissions, and integration with the existing SaaS platform infrastructure.

Optionally, the data in the SaaS platform 100 is organized with privacy settings that control visibility and access within an account:
 a) Shared Tables: These tables contain data that is visible and accessible to all users within the account. They typically store common, non-sensitive information that is relevant to all team members.
 b) Dedicated Tables: These tables have restricted visibility and are only accessible to a selected portion of users within the account. Access to these tables can be controlled based on various factors such as:
 User groups or teams
 Job titles or roles
 Specific permissions assigned to individual users
 Project assignments
 Departments or divisions within the organization This structure allows for fine-grained control over data access, ensuring that sensitive or specialized information is only visible to those who need it, while still maintaining a collaborative environment where common data is shared across the account.

Optionally, the training process includes data preprocessing and anonymization, token embedding generation, multi-head attention mechanism training and output layer fine-tuning for task-specific performance. Optionally, the NLP is used for processing user queries and generating responses includes:
 a) Tokenization: Using sub word tokenization techniques like Byte-Pair Encoding (BPE) or Sentence Piece.
 b) Intent Classification: A separate neural network model (e.g., BERT-based) to classify user intents.
 c) Named Entity Recognition (NER): To identify and extract key entities from user queries.
 d) Semantic Parsing: To understand the logical structure of complex queries.

e) Coreference Resolution: To handle queries that reference previous context.

f) Response Generation: Using the core LLM with beam search decoding for generating multiple candidate responses.

g) Response Ranking: A separate model to rank and select the most appropriate response based on relevance and context.

Optionally, the edit privilege inheritance is implemented using a directed acyclic graph (DAG) data structure, allowing for multiple inheritance paths. Each node in the DAG represents a privilege class and contains:

Unique identifier

Set of allowed operations (CRUD-Create, Read, Update, Delete)

List of table structures the privileges apply to

Pointers to parent privilege classes

Optionally, the agent environment 200 for adapting AI output based on context uses a multi-layer perceptron (MLP) neural network that takes as input:

Embeddings of the user's role

Embeddings of the current location in the SaaS platform

Embeddings of the query context.

The raw output from the core LLM

Optionally, a multi-agent system is implemented using a microservices architecture, with each AI agent instance running as a separate service. Inter-agent communication may be handled through a message queue system (e.g., RabbitMQ or Apache Kafka) to ensure asynchronous, reliable communication. The agent environment 200 includes: a centralized service that maintains metadata about all active AI agents, their roles, and their current assignments and a load balancer that distributes incoming queries to appropriate AI agents based on context and availability. A service that dynamically updates and enforces access privileges for each AI agent may be used. Records all actions taken by AI agents for accountability and debugging purposes.

Optionally, the avatar system is implemented as a web-based front-end using technologies such as React or Vue.js. It may include:

a) WebSocket Connection: For real-time communication between the avatar interface and the generative AI agent backend.

b) State Management: Using libraries like Redux to manage the avatar's state, including its current task, permissions, and interaction history.

c) Animation System: Implements subtle animations to make the avatar more engaging, using CSS animations or a library like GreenSock.

d) Accessibility Features: Ensures the avatar interface is usable with screen readers and keyboard navigation.

When the avatar is introduced to a task:

1. A secure token is generated and sent to the backend to authorize access to task-specific data.

2. The backend loads relevant log history and context items into a cache (e.g., Redis) for quick access.

3. The avatar's appearance is updated using a theme system that reflects its current permissions and task context.

Optionally, to ensure the generative AI agent stays up-to-date with the latest data patterns without compromising data privacy, a federated learning approach can be implemented. Each instance of the generative AI agent maintains a local copy of the model that is updated based on interactions within its specific context. Periodically (e.g., weekly), a secure aggregation protocol may be initiated:

Local model updates are encrypted using homomorphic encryption.

A central server aggregates these encrypted updates.

The aggregated update is decrypted and applied to the global model.

As indicated above, the agent environment 200 described in FIG. 1A is used for providing AI interactions within a project management/SaaS platform. It allows executing processes that enhance team collaboration and workflow efficiency. These processes are implemented through the agent environment 200's processors and the maintained AI agent.

Reference is now also made to FIG. 5 which is a flowchart depicting a process that allows automatically identifying missing data or actions in a data structure such as a board, reducing manual oversight and minimizes project delays. The process also allows AI-driven task assignment that ensures that a suitable team member may be engaged, optimizing resource allocation. The flowchart is implemented using a SaaS platform, such as the system depicted in FIG. 1A, consistent with some embodiments of the present disclosure, for instance using the agent environment.

This process begins with the maintenance of a generative AI agent (step 501) configured to interact with data associated with tasks assigned to a team sharing a common objective. The data is stored in the system's table structures, which may include one or more databases or data structures optimized for quick access and manipulation. As indicated above, the generative AI agent may be executed using an AI engine built on a transformer-based architecture, such as a fine-tuned BERT model or GPT-3. This engine is responsible for NLP and generation, enabling intelligent interactions with team members. TensorFlow is employed for developing and running machine learning models that analyze user behavior and predict task assignments.

In step 502, a display of the data as items in a table structure is presented. This table structure is designed to represent the workflow for each item, providing a visual representation of the project's progress and individual task statuses. The process then proceeds to perform two critical analyses. First, in step 503 a first data set is analyzed to identify any missing data or actions in the workflow. This analysis may involve scanning through the items in the table structure, checking for incomplete fields, or identifying steps in the workflow that have not been initiated or completed.

Following this, in step 504, the agent environment 200 analyzes a second data set. This set comprises interactions with the data and metadata of previous items in the table. The purpose of this analysis is to identify at least one team member associated with performing the missing action or providing the missing data. This step leverages the agent environment 200's understanding of team members' roles, past contributions, and areas of expertise.

In one example, the first data set, analyzed in step 503, primarily focuses on the current state of the project or workflow as represented in the table structure. It may include task descriptions and their current status, due dates and timelines, assigned team members, priority levels, dependencies between tasks, completion percentages, and/or custom fields specific to the project such as budget allocations or resource requirements. This data set represents the "static" or current snapshot of the project. The analysis of this set aims to identify gaps, such as tasks with missing due dates, unassigned tasks, tasks stuck in a particular status for an unusually long time, missing dependencies, or incomplete information in critical fields.

In contrast, the second data set, analyzed in step 504, focuses on historical interactions and metadata which may be related to the project and/or team members or to similar projects and/or team members. It includes logs of changes made to tasks (e.g. detailing who made the changes and when), communication history related to specific tasks (e.g. including comments and discussions), past performance metrics of team members on similar tasks, frequency and patterns of interactions with specific types of tasks by different team members, time spent on various stages of similar tasks in the past, and/or historical data on who typically resolves certain types of issues or provides specific types of information. This data set is more "dynamic" and historical in nature. The analysis of this set may be used to identify patterns and make informed predictions about who might be best suited to address the missing actions or data identified in the first analysis.

In the above example, in terms of time frame, the first data set represents the current state, while the second data set covers historical information and patterns over time. The first data set is used to identify what is missing or incomplete in the current project state, while the second data set is used to determine who might be best suited to address these gaps based on past behavior and expertise. The first data set may be focused on the specific project or workflow at hand, whereas the second data set may draw from a broader range of projects and team interactions to inform its analysis. The nature of the data in each set is distinct as well. The first data set is more structured and directly related to task attributes, while the second data set includes more unstructured data like communication logs and interaction patterns.

Finally, the analysis approach for each data set may differ. The first data set analysis may more straightforward, often involving direct comparisons and checks against predefined criteria. In contrast, the second data set analysis may involve more complex pattern recognition and predictive modeling. By analyzing both sets, the system may not only identify what needs to be done but also make intelligent suggestions about who might be best suited to do it, based on a comprehensive understanding of both the current project state and historical team performance. This dual analysis approach enables a more nuanced and effective project management strategy, leveraging both immediate project needs and long-term team dynamics.

In another example, the first and second data sets analyzed in steps 503 and 504 encompass a broader range of information sources. The first data set, analyzed in step 503, includes both the current state of the project or workflow as represented in the table structure within the SaaS platform, as well as historical interactions and metadata from within the same SaaS platform. This might encompass the current task lists, deadlines, assigned team members, and progress status, along with past changes to tasks, previous project timelines, communication logs related to the project, and patterns of task completion or delay. The second data set, analyzed in step 504, can include data associated with the project itself, which may be stored either within the SaaS platform or in connected third-party applications. This allows for a more comprehensive analysis by incorporating specialized tools and data sources specific to the project's nature. For example, in a software development project, the first data set might include a task in the SaaS platform about generating a new application feature. This task would have associated metadata such as the person assigned, the due date, any related discussions, and its current status. The second data set could include the actual code repository in GitHub (a third-party application) where the application is being developed. This would provide detailed information about code commits, pull requests, code reviews, and the actual progress of the feature development at a technical level.

By analyzing both sets of data, the system can provide a more holistic view of the project's progress. It can correlate the high-level task management data from the SaaS platform with the granular development activity data from GitHub. This might reveal insights such as discrepancies between reported task progress and actual code development, identification of bottlenecks or challenges not reflected in the task management system, more accurate predictions of completion times based on both project management data and actual development pace, and improved resource allocation suggestions by understanding both the assigned tasks and the actual work being done. See also co filed application titled AI-Driven Integration System for Enhanced SaaS Platform Management and Cross-Platform Synchronization (PCT/IL24/50821) which is incorporated herein by reference. This dual-data set approach allows the system to bridge the gap between project management oversight and the actual work being performed, leading to more accurate insights and better-informed decision-making. It combines the structured, high-level view of project management with the detailed, technical progress data, providing a comprehensive understanding of the project's true status and potential issues or opportunities. Optionally, data sets are acquired using an API Layer. Communication between the client and server is facilitated through one or, more of RESTful APIs built using FastAPI, and a GraphQL interface. This dual approach allows for efficient handling of both simple data transfers and complex, nested queries. The agent environment 200 may implement OAuth 2.0 for secure authentication with external services. A plugin architecture allows for easy addition of new integrations, enabling the agent environment 200 to interface with a wide range of third-party applications.

Finally, in step 505, the method initiates a natural language session between the generative AI agent and the identified team member. The process of identifying missing information and reaching out to team members, as described in steps 503-505, can be enhanced by the interactive analysis capabilities detailed in FIG. 8. This combination allows for more transparent and user-friendly interactions when the generative AI agent seeks to fill information gaps As shown at 506 and 507, during this session, the generative AI agent may notify the team member about the missing data or actions and/or guide it through the process of performing the missing action or adding the missing data to the dataset.

Reference is now also made to a description of additional optional modules and capabilities of the agent environment 200.

In some embodiments, the agent environment 200 includes an AI-driven dashboard module configured to enhance visibility of work patterns derived from user-utilized components. This module leverages the generative AI agent's knowledge of usage patterns, component understanding, and user data context to deduce relevant data points or key metrics from components associated with the user and processes relevant to their specific field of work or operational goals. If unable to deduce such data points, the agent environment 200 may query the user with possible relevant data points for confirmation or correction.

The AI-driven dashboard module analyzes these data points to determine the most beneficial graphical representations for presenting the information in an easily digestible manner. It utilizes a repository of data visualization graphical elements, such as graphs or widgets, each suited for presenting different data types. The module can associate these graphical elements with data points based on known best practices, usage history of other users in similar fields, or direct associations with system components.

Once associations are established, the module generates a visual component, such as a dashboard, presenting the selected data visualization graphical elements in a context suitable for the user's field of work or operational goals. Users may also initiate dashboard creation by providing specific data points they wish to visualize.

The agent environment 200 also includes a context-aware chatbot activation module that allows the generative AI agent to receive permission to access previously restricted information through user invitations. This can be achieved through a mentioning function, where users can notify the generative AI agent about information stored in a component, granting it access. This functionality extends to third-party applications, where the generative AI agent can listen for mentions through connected apps.

Furthermore, the agent environment 200 incorporates a communication overlay module that enables the generative AI agent to introduce secondary components onto primary components, adjusting its output based on the primary component's data and context. For example, it can overlay a chat interface onto a graph component, allowing users to discuss specific data points directly on the visualization.

This module employs context-based deduction to determine logical methods for introducing secondary components, considering the functionalities of both components involved. It can analyze associated data to deduce reasons or conclusions explaining changes in visualized data, not limited to displayed data but incorporating relevant information from across the agent environment 200.

The communication overlay module initiates a structured reason discovery process when significant changes are detected in components, employing both syntactic and semantic search mechanisms to provide explanations. This process can utilize pre-existing data that contains explanations not directly associated with the displayed component.

For instance, users can initiate discussions about specific data points on a graph by clicking interest points, with the agent environment 200 instructing the SaaS platform to add a discussion component in response. These discussions can be associated with the graph generally, specific locations on the graph, or the data source, while maintaining context for AI utilization. The discussions are stored in a repository for use by other users in the account.

The agent environment 200 can also display snapshots of current states near relevant discussion points on graphs, providing users with clearer understanding of data fluctuations relevant to the time of discussion. This comprehensive approach to data visualization and interaction significantly enhances user understanding and engagement with complex data sets and work processes.

In an exemplary customer support scenario, the generative AI agent reviews incoming support tickets. It identifies a complex issue requiring input from multiple departments. The generative AI agent autonomously reaches out to the relevant team members from product, engineering, and account management, gathering the necessary information to compile a comprehensive solution for the customer, significantly reducing resolution time.

In another example, consider a software development project with multiple team members, including developers, designers, and quality assurance specialists. The project is managed using the AI-enhanced platform described herein.

In this exemplary scenario a critical bug has been reported, but the necessary fix requires information from multiple team members and coordination across different stages of the development process. The generative AI agent analyzes the project data and identifies that a critical bug report has been added to the SaaS platform, but no action has been taken yet. Based on the nature of the bug and historical data, the generative AI agent determines that John, a back-end developer, is the most suitable person to initially address this issue. The generative AI agent autonomously initiates a natural language session with John through the platform's chat interface. AI: "Hello John, I've noticed a critical bug report (ID: BUG-2024) has been added to the agent environment 200. Based on your expertise, you're best suited to start addressing this issue. Would you like me to guide you through the process?" John agrees, and the generative AI agent provides relevant context. AI: "The bug appears to be related to the user authentication module you worked on last week. It's causing login failures for approximately 15% of users." The generative AI agent guides John through the initial investigation process. AI: "Let's start by examining the error logs. Can you please navigate to the 'Logs' section in the dashboard and filter for authentication errors from the past 24 hours?" John follows the instruction and confirms completion. AI: "Great. Now, let's analyze the pattern. Do you notice any commonalities among the affected users?" John identifies that the issue seems to affect users who recently changed their passwords. AI: "Excellent observation. This narrows down our focus. We should involve Sarah from the database team to check if there are any issues with password updates in the user table. Would you like me to bring her into this conversation?". With John's agreement, the generative AI agent or generative AI model initiates a group chat, adding Sarah to the conversation. It provides a summary of the issue and John's findings to Sarah. Based on the discussion, the generative AI agent or generative AI model suggests creating subtasks and assigns them to relevant team members. AI: "I've created the following subtasks in our project management board:
 1. Investigate password update process (Assigned to Sarah)
 2. Review authentication code for recent changes (Assigned to John)
 3. Prepare database patch if needed (Assigned to Sarah)
 4. Implement and test fix (Assigned to John)
 5. Conduct QA on the fix (Assigned to Alex from QA team)
 I've also updated the bug ticket status to 'In Progress' and linked these subtasks to it. Does this plan look appropriate to both of you?"

As John and Sarah confirm the plan, the generative AI agent updates the project board in real-time. Other team members, including the project manager, receive notifications about the updated bug status and new subtasks. The generative AI agent or generative AI model continues to monitor the progress of these subtasks, providing reminders, answering questions, and offering assistance as needed. For instance: AI: "John, I noticed you've been working on the authentication code review for over two hours. Do you need any additional resources or assistance? I can provide access to the recent code merge logs if that would be helpful.". Throughout this process, the generative AI agent or generative AI model learns from the interactions, improving its ability to handle similar situations in the future. It may, for example, learn to associate certain types of authentication bugs with password change processes, allowing for faster diagnosis in future occurrences. This example demonstrates how the generative AI agent guides team members through a complex problem-solving process, facilitating collaboration, providing relevant information, and managing the workflow in real-time in the platform, assign users and inset data when needed as a user.

The agent environment 200 is capable of executing several additional methods that enhance its functionality. The agent environment 200 can select team members based on affiliation determinations, allowing for more accurate assignment of tasks and responsibilities where it can interface with third-party applications, expanding the scope of data it can analyze and interact with. Optionally, a graph database, such as Neo4j, models team relationships and project structures. PageRank-like algorithms determine the most relevant team member for a given task based on expertise, availability, and past performance. Alternatively, team members may be identified using a trained AI model, for instance a model trained on historical logs documenting behavior and communication of other teams.

Optionally, the agent environment 200 supports autonomous initiation of natural language sessions, enabling proactive problem-solving without human intervention. Optionally, it can analyze log records and context information to determine ownership of different workflow steps, improving task allocation accuracy. Optionally, the generative AI agent can be configured to proactively seek out missing data or actions, initiating communication with relevant team members as needed. Optionally, during guidance sessions, the agent environment 200 can provide step-by-step instructions tailored to the specific workflow context. The agent environment 200 updates workflows in real-time as actions are performed or data is added, ensuring all team members have access to the most current project status. Through machine learning capabilities, the generative AI agent may continuously improve its ability to identify responsible parties for specific tasks based on past interactions. The agent environment 200 may integrate with external communication platforms, facilitating seamless interaction across various team collaboration tools.

During natural language sessions, the generative AI agent may provide relevant contextual information from the project data, (including links to the one or more data sets in which the data is found), assisting team members in resolving identified issues more effectively. When necessary, the generative AI agent may request permission to access relevant user accounts to resolve problems, ensuring data privacy and security protocols are maintained.

Figure 6:
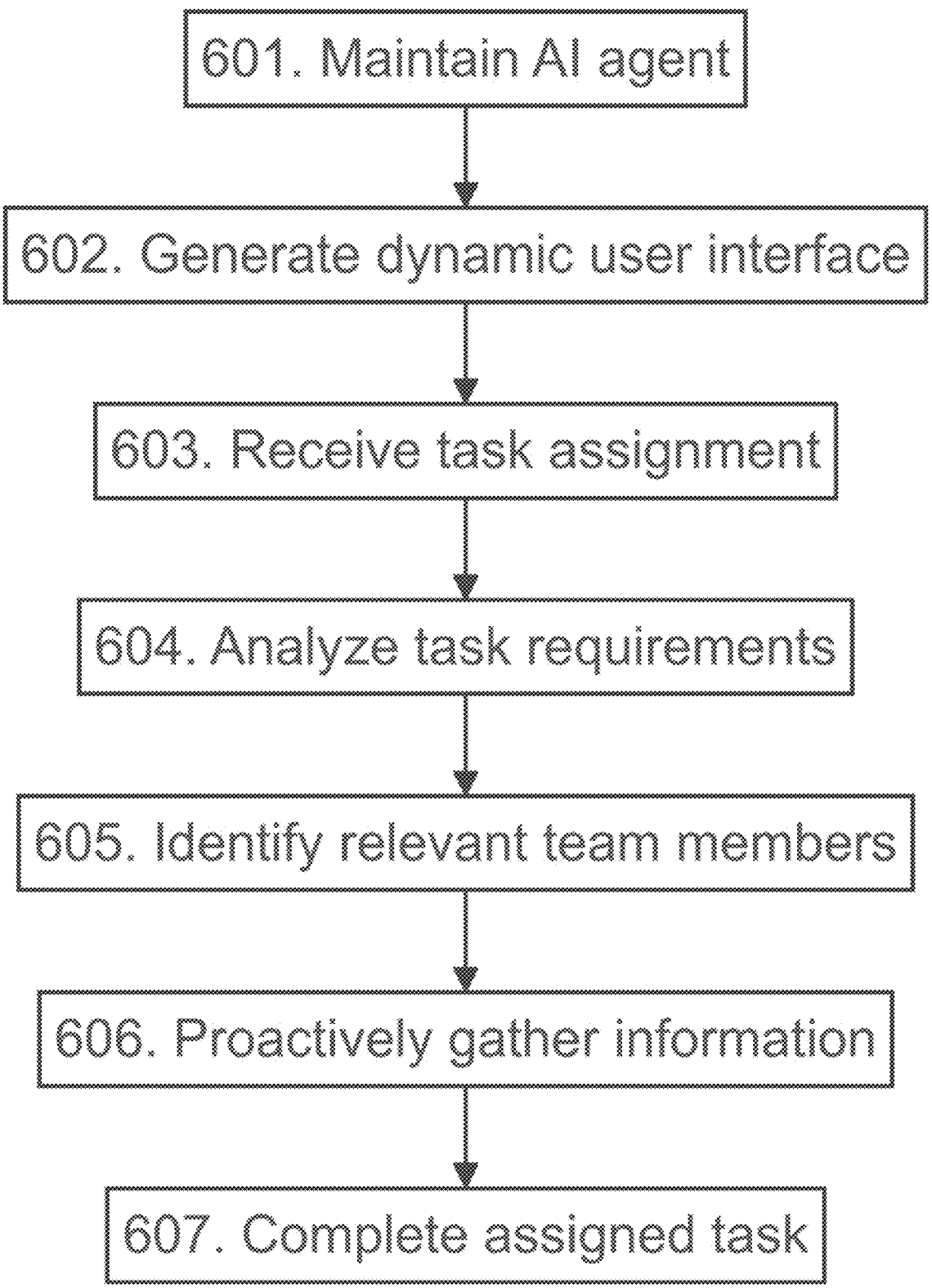
FIG. 6 is a flowchart of a method of proactive information gathering, consistent with some embodiments of the present disclosure.

Building upon the concept of AI-driven task management, we now examine the process of proactive information gathering. Reference is now also made to FIG. 6, which is a flowchart of a method of proactive information gathering, consistent with some embodiments of the present disclosure. The flowchart is implemented using a SaaS platform, such as the agent environment 200 depicted in FIG. 1A, consistent with some embodiments of the present disclosure, for instance using the agent environment.

As shown at 601, the agent environment 200 maintains a generative AI agent capable of interacting with alphanumeric data stored in the table structure for example as described above. This may involve updates to the AI model using federated learning techniques to improve performance without compromising data privacy, continuous monitoring of the generative AI agent's performance metrics, with automatic alerts for any deviations from expected behavior and/or periodic retraining of the AI model using anonymized project data to enhance its understanding of project contexts and team dynamics.

Now, the agent environment 200 generates a dynamic user interface that displays the table structure and provides input mechanisms for task assignment. This may involve implementing a responsive design using React.js for seamless display across various devices and screen sizes and utilizing WebSocket connections for real-time updates to the displayed data. Now, as shown at 603 and 604, upon receiving a task assignment, the generative AI agent analyzes the task requirements and assesses the available information. This process includes NLP techniques to interpret task descriptions and requirements and/or semantic analysis of the table structure data (combining the item name with titles of the data characteristics for that item and the data type in which the data characteristics are stored in the table), to identify relevant information and/or implementation of a custom-built knowledge graph to map relationships between different data points and identify information gaps. As shown at 605, the agent environment 200 can now autonomously identify relevant team members based on context. This may be performed as described above and/or by utilizing a graph database (e.g., Neo4j) that models team relationships and expertise and/or implementing collaborative filtering algorithms to predict which team members are most likely to have the required information and/or analyzing historical data using time series analysis to consider team members' past contributions and current availability.

As shown at 606 this allows proactive information gathering. The generative AI agent reaches out to identified team members to obtain missing information. Now, as shown at 607. the generative AI agent completes the assigned task using the obtained information. Optionally, a skills taxonomy using ontology-based information extraction from team member profiles and project documentation is used for identifying a suitable member. Optionally, sentiment analysis is used on past communications to tailor the tone and style of outreach messages and a machine learning model may be used to predict optimal times for reaching out to each team member.

Figure 7A:
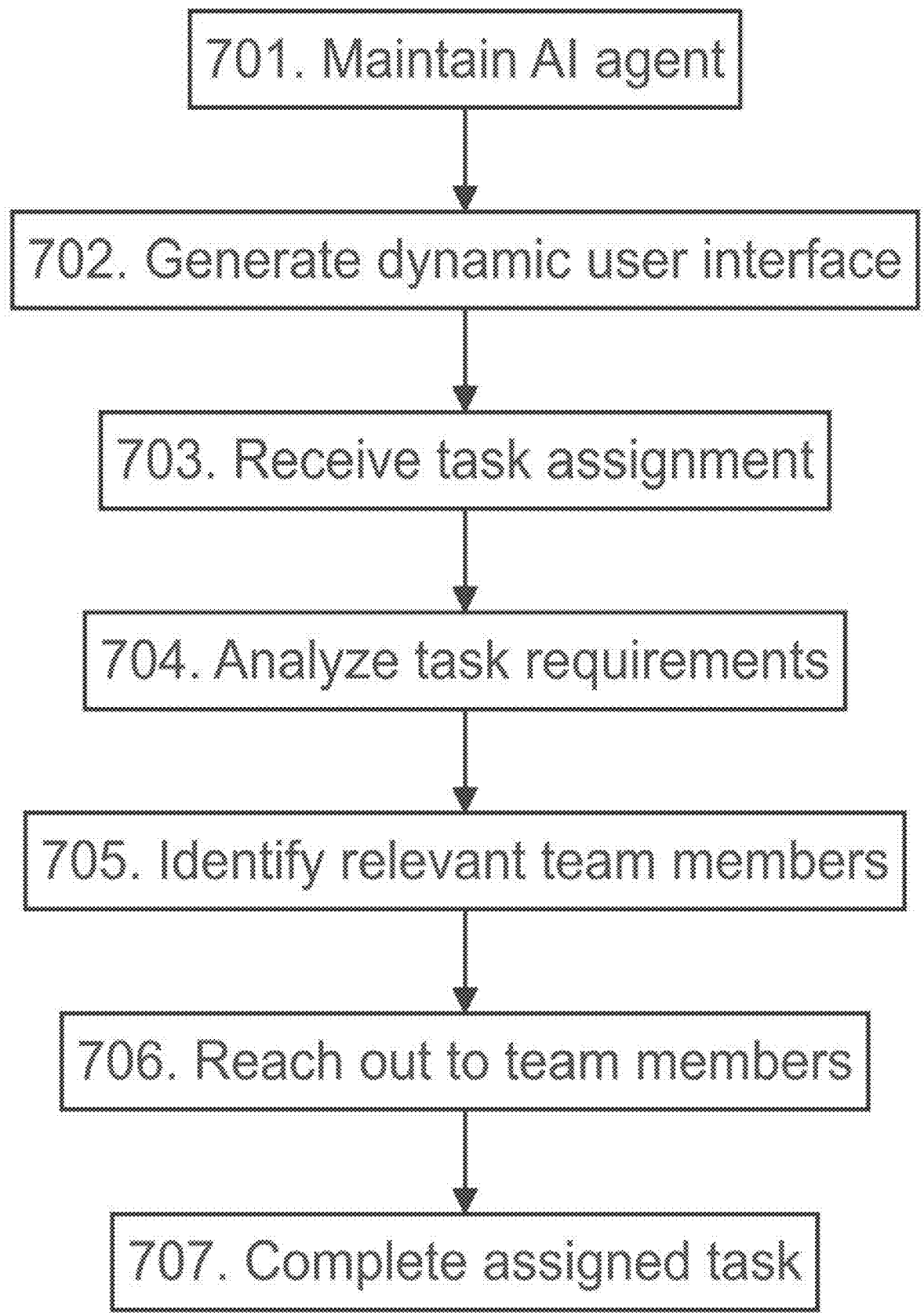
FIG. 7A is a flowchart of an exemplary process wherein the generative AI agent reaches out to identified team members to obtain information missing in a tabular structure, consistent with some embodiments of the present disclosure.

Reference is also made to FIG. 7A which is a flowchart of another exemplary process wherein the generative AI agent reaches out to identified team members to obtain information missing in a tubular structure such as a board consistent with some embodiments of the present disclosure.

The flowchart is implemented using a SaaS platform, such as the agent environment 200 depicted in FIG. 1A, consistent with some embodiments of the present disclosure, for instance using the agent environment.

As shown at 701, the agent environment 200 maintains a generative AI agent capable of interacting with alphanumeric data stored in the table structure. This involves:

Regular updates to the AI model using federated learning techniques to improve performance without compromising data privacy.

Continuous monitoring of the generative AI agent's performance metrics, with automatic alerts for any deviations from expected behavior.

Periodic retraining of the AI model using anonymized project data to enhance its understanding of project contexts and team dynamics.

As shown at 702, the agent environment 200 generates a dynamic user interface that displays the table structure and provides input mechanisms for task assignment. This involves:

Implementing a responsive design using React.js for seamless display across various devices and screen sizes.

Utilizing WebSocket connections for real-time updates to the displayed data.

Incorporating accessibility features to ensure the interface is usable by team members with diverse needs.

As shown at 703-4, upon receiving a task assignment, the generative AI agent analyzes the task requirements and assesses the available information. This process includes:

NLP techniques to interpret task descriptions and requirements.

Semantic analysis of the table structure data to identify relevant information.

Implementation of a custom-built knowledge graph to map relationships between different data points and identify information gaps.

As shown at 705, the agent environment 200 Team Member Identification (Step 205): The agent environment 200 autonomously identifies relevant team members based on context. This involves:

Utilizing a graph database (e.g., Neo4j) to model team relationships and expertise.

Implementing collaborative filtering algorithms to predict which team members are most likely to have the required information.

Analyzing historical data using time series analysis to consider team members' past contributions and current availability.

As shown at 706, the agent environment 200 The generative AI agent reaches out to identified team members to obtain missing information. This process includes:

Generating contextually appropriate messages using a fine-tuned language model.

Implementing a multi-channel communication system that integrates with email, chat applications, and the platform's internal messaging system.

Utilizing a priority queue system to manage multiple outreach attempts and follow-ups.

Figure 9A:
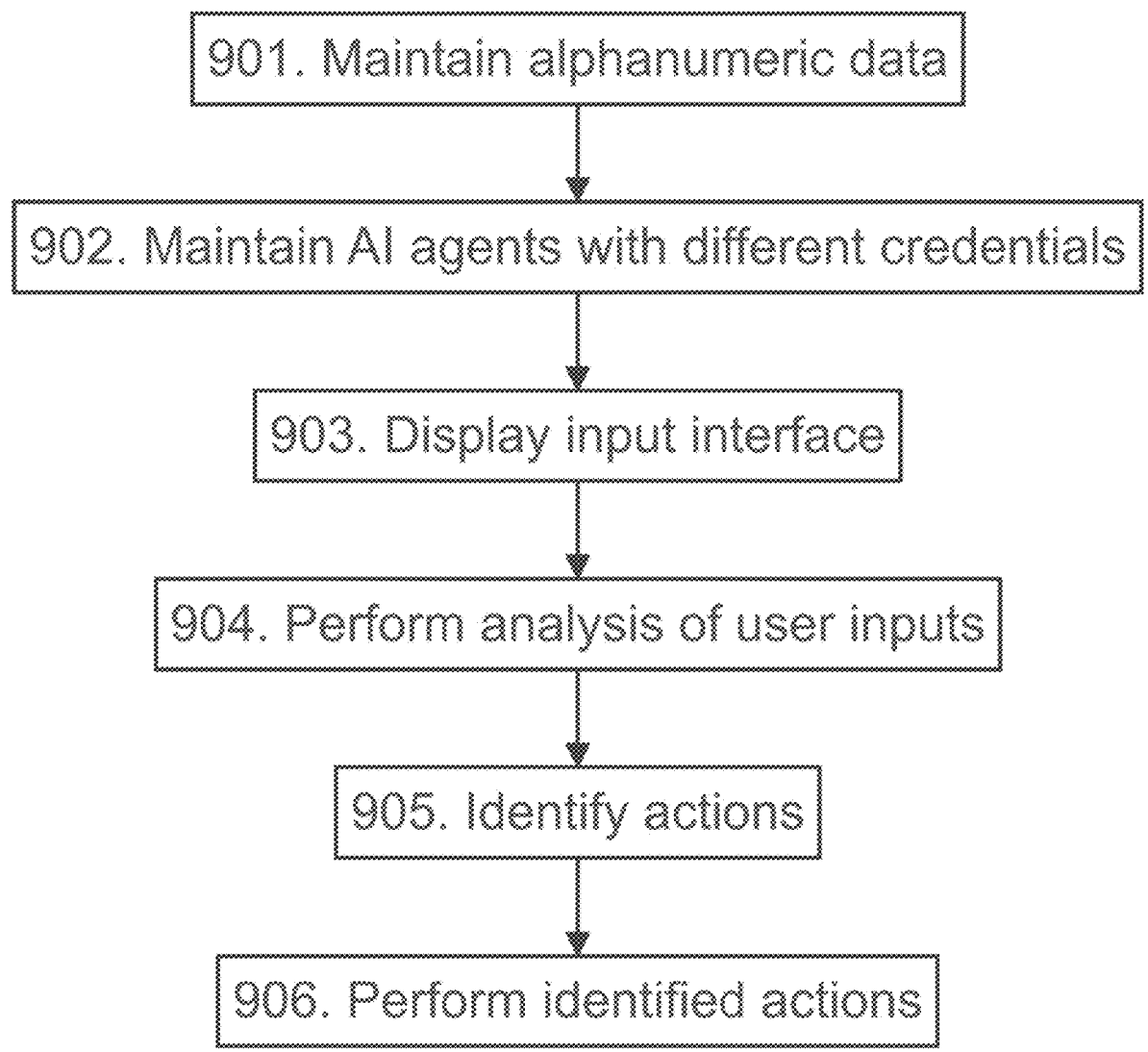
FIG. 9A is a flowchart of a process for using generative artificial intelligence for intent-based interactions within a SaaS platform, consistent with some embodiments of the present disclosure.

The process of the generative AI agent reaching out to team members, as described in step 706, may be implemented using the intent-based interaction system outlined in FIG. 9A. This integration ensures that the generative AI agent's communications are tailored to the specific credentials and context of each interaction.

As shown at 707, the agent environment 200 The generative AI agent completes the assigned task using the obtained information. This involves implementing a rule-based system combined with machine learning models to determine the appropriate actions for task completion and/or utilizing robotic process automation (RPA) techniques for tasks that involve interaction with other software systems and/or generating comprehensive reports using natural language generation (NLG) techniques to summarize the task completion process and results.

Optionally, skills taxonomy using ontology-based information extraction from team member profiles and project documentation is implanted, for example with a workload balancing algorithm that considers current task assignments and estimated completion times.

Figure 7B:
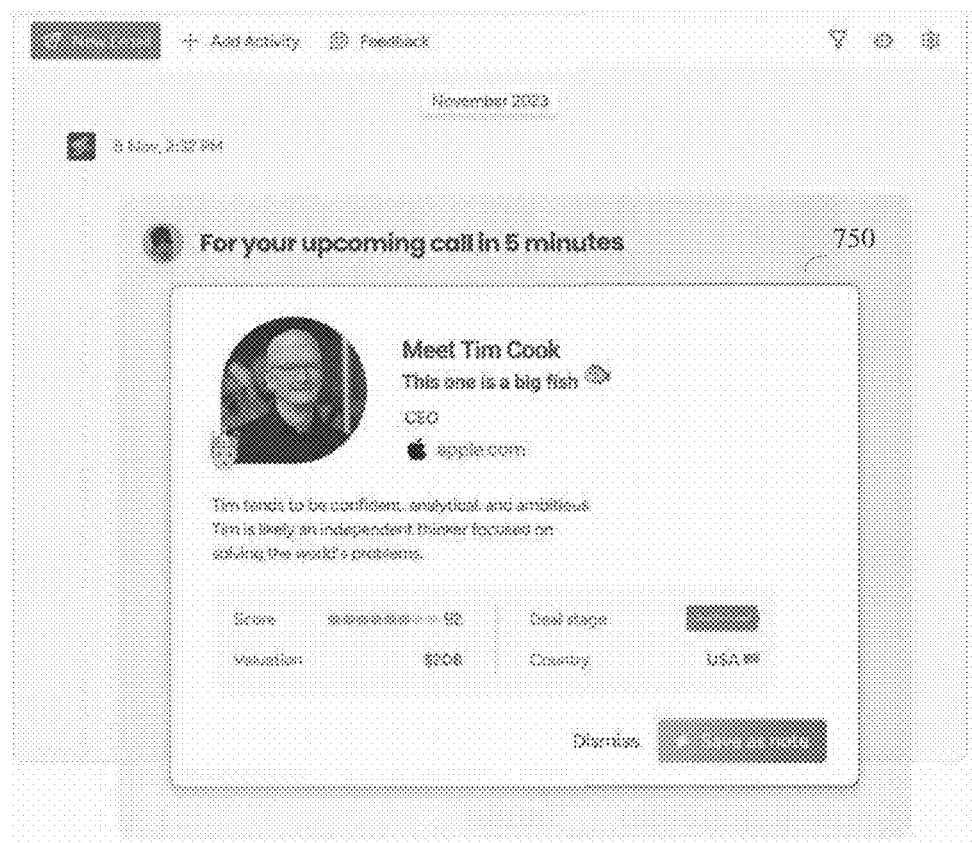
FIGS. 7B-7C are exemplary user interfaces allowing a user to receive messages and optionally to interact with a generative AI agent, consistent with some embodiments of the present disclosure.
Figure 7C:
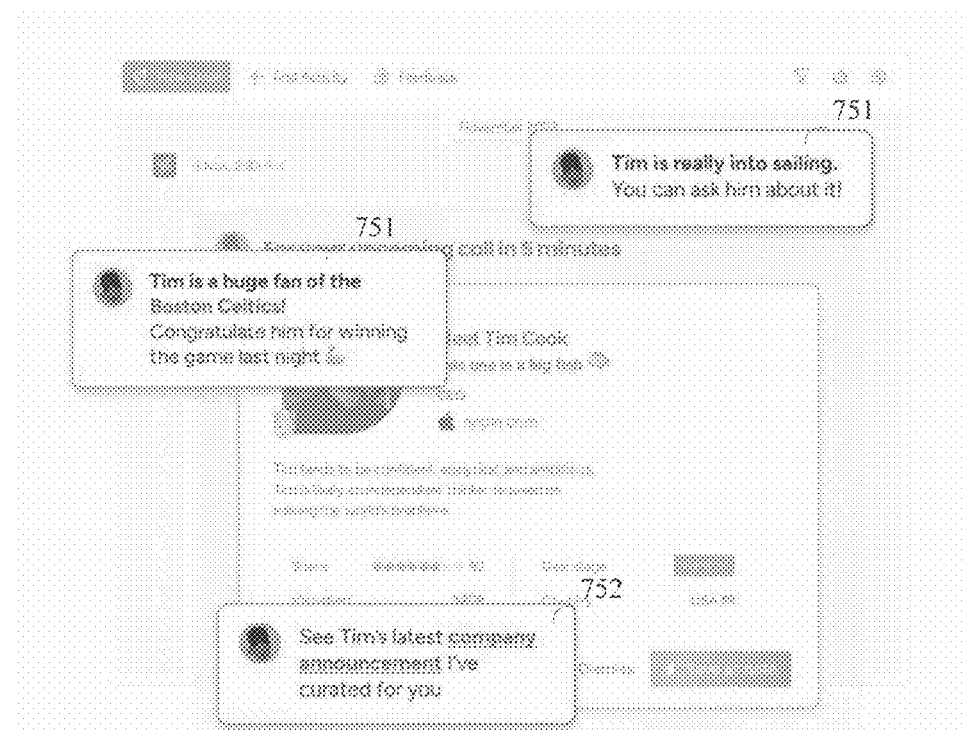

Optionally, sentiment analysis is utilized on past communications to tailor the tone and style of outreach messages and/or a machine learning model is executed to predict optimal times for reaching out to each team member. For example, FIG. 7B depicts an interactive window presenting a message sent from the generative AI agent summarizing information extracted from past communications to recommend how to approach a team member. FIG. 7C exemplify how the generative AI agent can provide details gathered about the team member to induce further discussion 751 and links to data related to the team member 752.

In an exemplary sales environment, the generative AI agent may analyze the current communications to identify a high-value opportunity lacking critical information. It automatically schedules brief check-ins with the assigned sales representative and the product specialist, collecting missing data about client needs and product fit. The generative AI agent or generative AI model then updates the CRM table structures with this information, ensuring the sales manager has a complete picture for the upcoming forecast meeting.

Figure 8:
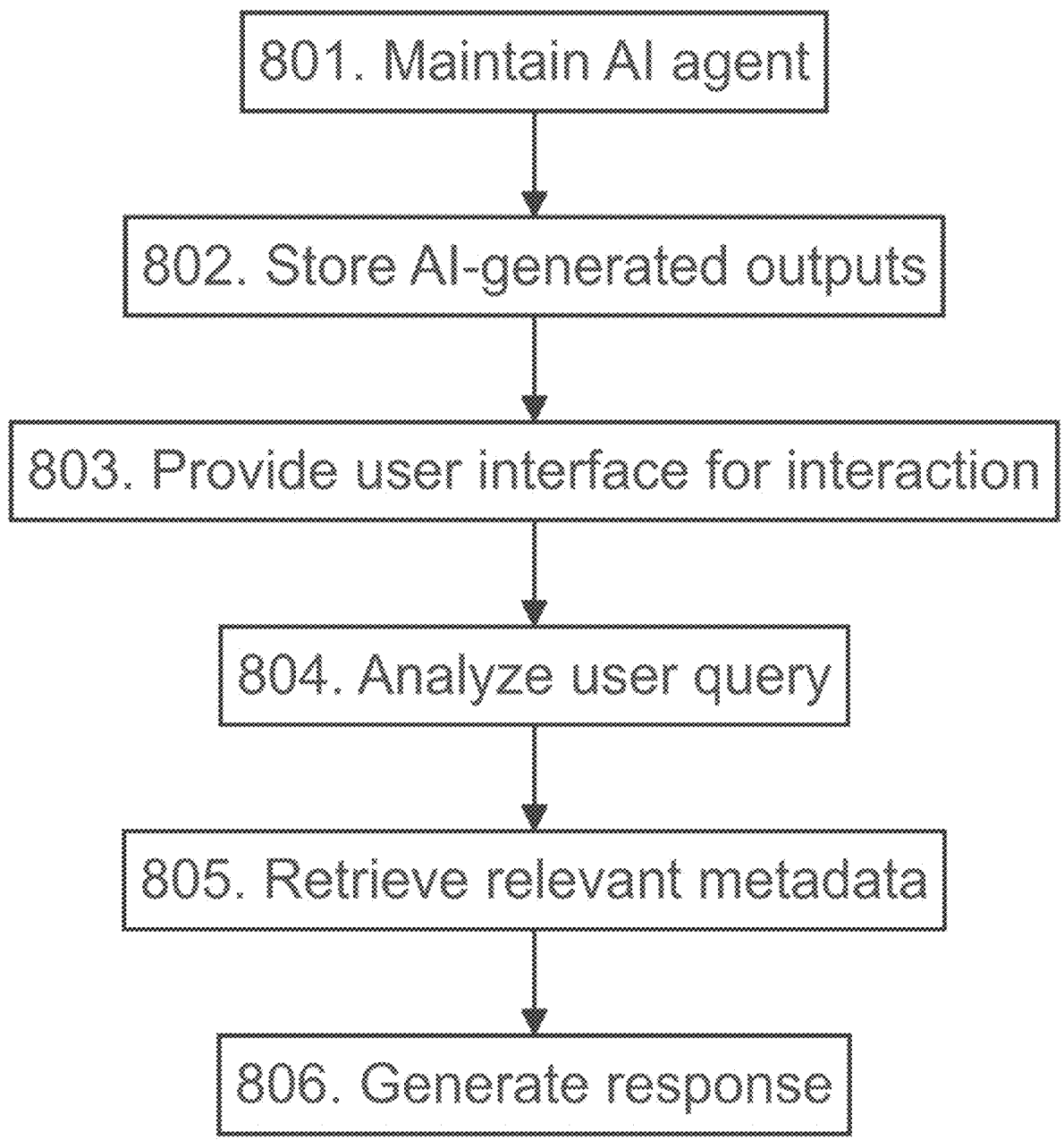
FIG. 8 is a flowchart depicting a process for interactive analysis of artificial intelligence outputs within a project management platform, consistent with some embodiments of the present disclosure.

To complement the task execution capabilities, we now also consider how the system facilitates interactive analysis of AI outputs. Reference is now also made to FIG. 8 which illustrates a flowchart depicting a process executed by a system as described above for interactive analysis of artificial intelligence outputs within a project management platform.

First, as shown at 801, a generative AI agent capable of autonomously performing project-related tasks is maintained. This AI agent may utilize a combination of rule-based systems and machine learning models, such as decision trees and neural networks, to execute tasks based on project data. A task queue system, implemented using Redis or similar technology, manages and prioritizes incoming tasks. The AI model is continuously updated using online learning techniques to improve task performance over time. Now, as shown at 802, as the generative AI agent generates outputs, the agent environment 200 stores these along with relevant metadata for instance in a NoSQL database, such as MongoDB. This approach allows for flexible storage of outputs and associated metadata. A custom metadata schema captures all relevant platform elements used in generating each output, and indexing techniques ensure fast retrieval of outputs and metadata. As shown at 803, a user interface for initiating natural language interaction sessions regarding the AI-generated outputs is provided. Now as shown at 804, upon receiving a user query about a specific AI-generated output, the agent environment 200 analyzes the query using NLP techniques, including named entity recognition and semantic parsing. This analysis helps identify the specific output being discussed. A query understanding module, utilizing machine learning, classifies the type of information the user is seeking, such as an explanation, clarification, or additional details. As shown at 805, based on the analyzed query, the agent environment 200 retrieves relevant metadata using an efficient retrieval system. This may involve technologies like Elasticsearch for fast, full-text search capabilities. A caching layer, implemented using memcached or similar technology, stores frequently accessed metadata to reduce database load. As shown at 806, a response such as a natural language response explaining the reasoning behind the output may be generated. This process utilizes a large language model, such as GPT-3 or a custom-trained model, to generate human-like explanations. A template-based system incorporates references to platform elements identified in the metadata. Named entity linking connects referenced platform elements to their definitions or additional context within the agent environment 200. The generated response is presented to the user via the interface. A message queueing system, such as RabbitMQ, manages the flow of responses, especially in high-load scenarios. Progressive loading techniques display long responses in a user-friendly manner. When relevant to the explanation, the agent environment 200 incorporates rich media elements like charts or graphs. The agent environment 200 may engage in an interactive dialogue to provide further clarification about the output and its underlying reasoning. A dialogue management system, implemented using a finite state machine, tracks the conversation state and context. Intent recognition techniques understand follow-up questions and requests for clarification. A knowledge graph of project elements and their relationships provides comprehensive, interconnected explanations. The user interface may include a feedback mechanism allowing users to rate the helpfulness of explanations. This data is used to continuously improve the agent environment 200's response quality through machine learning techniques.

In an exemplary use case, a generative AI agent has autonomously generated a risk assessment for a software development project, a project manager, curious about the assessment, initiates an interaction through the system's interface.

Project Manager: "Why has the AI classified the database migration as high risk?"

The agent environment 200 analyzes this query, identifies the specific output (risk assessment) and the element in question (database migration). It retrieves the associated metadata, which includes information about the project timeline, team expertise, and historical data from similar migrations.

System Response: "The database migration has been classified as high risk due to several factors. First, the metadata indicates that the project timeline allocates only 3 days for this task, which is 40% less than the average time taken for similar migrations in past projects. Additionally, the team assigned to this task has limited experience with the target database system, as per their skill profiles. Historical data from our knowledge base suggests that rushed migrations with inexperienced teams have a 75% chance of encountering critical issues."

Project Manager: "Can you provide more details about the potential issues?"

The agent environment 200 recognizes this as a request for clarification and delves deeper into its knowledge base.

System Response: "Certainly. Based on our analysis of similar projects, the most common issues in rushed database migrations include:

Data loss or corruption during transfer (occurred in 35% of cases)

Incompatibility issues between old and new systems (25% of cases)

Performance degradation post-migration (20% of cases)

Extended system downtime (15% of cases)

Would you like me to suggest some mitigation strategies for these potential issues?"

This interactive process continues, with the agent environment 200 providing detailed, context-aware responses and the project manager gaining a comprehensive understanding of the AI's risk assessment. The agent environment 200's ability to explain its reasoning, provide supporting data, and engage in a dialogue showcases the sophisticated nature of this interactive analysis system for AI outputs.

In another example, the generative AI agent flags a series of transactions as potentially fraudulent. When the compliance officer queries the system about this flagging, the generative AI agent or generative AI model provides a detailed explanation of the pattern it identified, references to similar past cases, and the specific regulations that might have been violated. This allows the compliance team to quickly understand the AI's reasoning and take appropriate action.

While previous sections focused on some internal processes, we now explore how the system handles intent-based interactions with users. Reference is now also made to FIG. 9A, which is a flowchart of a process for using generative artificial intelligence for intent-based interactions within a SaaS platform for instance as described above. The process comprises several steps executed by one or more processors configured to manage and utilize artificial intelligence agents with varying credentials.

As shown at 901, in a first step, the method involves maintaining alphanumeric data stored in a plurality of items representing the alphanumeric data within the SaaS platform, for instance as described in any of the embodiments above. This data may include project details, user information, task lists, and other relevant information managed within the platform. As shown at 902, a first artificial intelligence agent with a first set of credentials and a second artificial intelligence agent with a second set of credentials different from the first set are maintained. Both artificial intelligence agents are maintained in a common account of the SaaS platform. These agents may be initialized as processes of a common agent code, differing primarily in their set of credentials. As shown at 903, a display of at least one input interface configured to receive user inputs is presented. This interface allows users to interact with the plurality of items and select either the first or second AI agent to interact with the alphanumeric data. As shown at 904, the selected AI agent is performing an analysis of at least some of the user inputs, accessed using its corresponding set of credentials. This analysis is conducted to understand the user's intent and determine appropriate actions. As shown at 905, the method identifies one or more actions for interacting with the alphanumeric data according to the analysis. This identification process only uses information obtained through the corresponding set of credentials of the selected AI agent. Now, as shown at 906, one or more of the identified actions on the alphanumeric data accessible to the generative AI agent is performed using its corresponding credentials.

In some implementations, the method may include requesting permission to perform an action in another element to which the generative AI agent does not have credentials. This ensures that the generative AI agents operate within their authorized boundaries while still providing flexibility for extended operations when necessary.

The method may also involve maintaining a third AI agent with a set of credentials partially overlapping with the credentials of the first and second AI agents. This allows for more nuanced task allocation and data access within the platform.

To enhance user interaction and transparency, the method may include displaying a GUI element showing all different variations of the same AI agent and details for each of their credentials. This provides users with a clear understanding of each AI agent's capabilities and access levels.

Figure 9B:
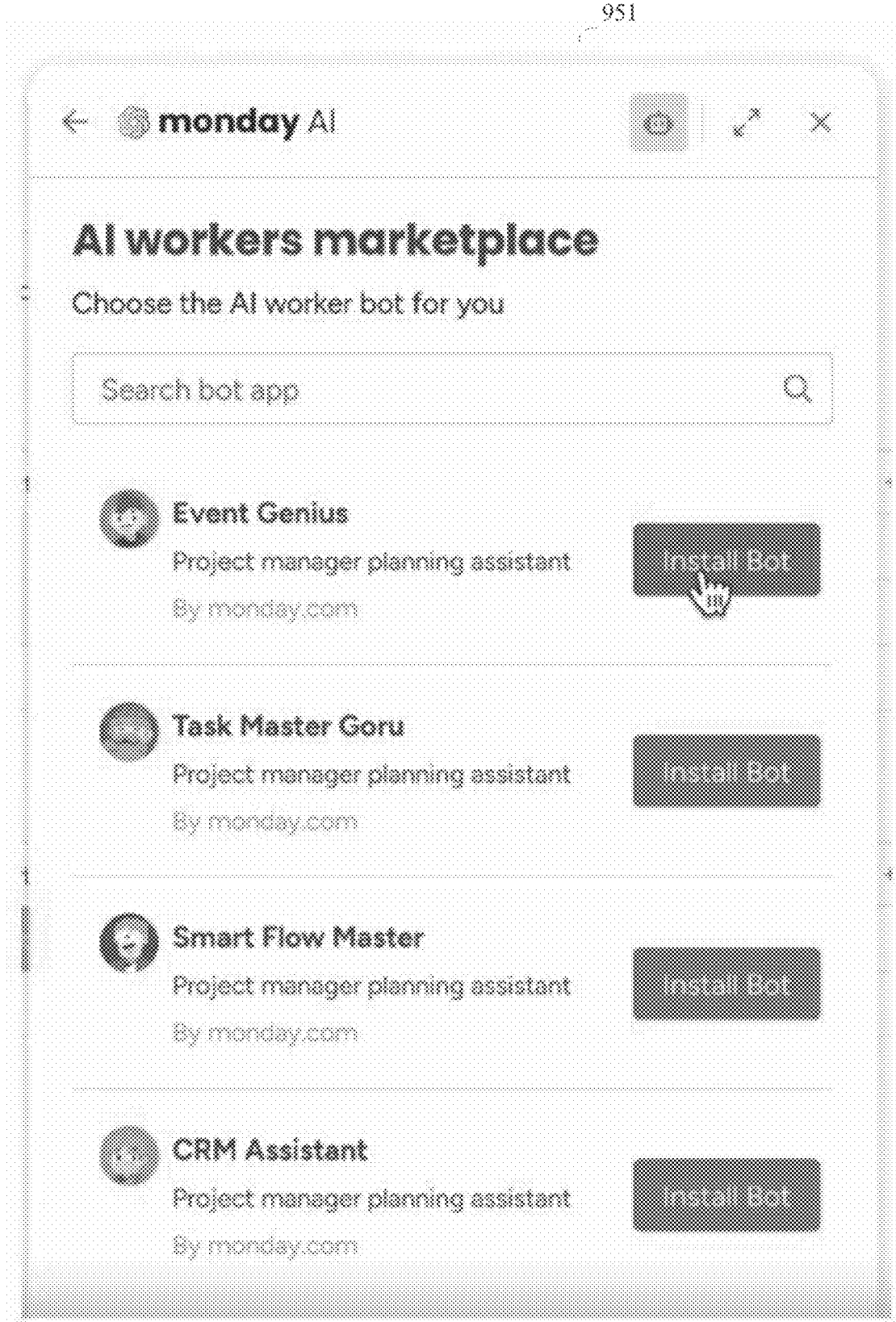
FIG. 9B is a screenshot of a window facilitating a user to select a generative AI agent from a list of optional AI agents marked as workers, consistent with some embodiments of the present disclosure.

The generative AI agents used in this method may be selected from a marketplace of agents with different credentials, allowing for customization and specialization based on specific project or organizational needs (e.g., 108). For example, FIG. 9B is a screenshot of a window 950 facilitating a user to select a generative AI agent from a list of optional AI agents marked as workers. The workers are AI agents which differ from one another in credentials, privileges, cost, training datasets, used models, identifiers and/or availability, for example as described herein with reference to any of the cited references. This selection interface may be part of a broader AI Marketplace functionality within the SaaS platform.

The AI Marketplace may serve as a central hub for users to discover, compare, and integrate various AI agents into their accounts for integration, directly or indirectly, with their workflows. It may offer features designed to enhance the user experience and facilitate informed decision-making. Generative AI agents may be meticulously categorized based on their primary functions, such as data analysis, content generation, or project management, allowing for easy browsing and selection. Each generative AI agent may boast a comprehensive profile that outlines its capabilities, pricing model, performance metrics, and user ratings, providing potential users with a clear understanding of what to expect. Customization may be provided in the marketplace, allowing a user to adapt AI agent parameters to suit specific user needs before integration. For example, while all the iterations of the AI agent may initially be provided with the same general configurations, each iteration thereof may be customized differently in accordance to the subject matter it is configured to process in the platform and to the relative location in the account in which it is assigned to.

The marketplace may support implementation by providing step-by-step guides on how to effectively integrate chosen AI agents into existing workflows and projects. Once an AI agent is integrated, users may access detailed analytics on its performance, helping them assess its value and optimize its use over time. The marketplace also manages updates and version control for the AI agents, ensuring users always have access to the latest features and improvements without the need for manual updates. A standout feature of this marketplace may be the ability for users to upload and incorporate their own specific AI agents into the SaaS platform. This functionality caters to organizations with unique needs or those who have developed proprietary AI models. The process begins with users submitting their AI agents through a dedicated portal in the marketplace. The platform then runs a series of tests to ensure the submitted AI is compatible with the SaaS platform's architecture and security protocols.

Users may be given the opportunity to specify how their AI agents should integrate with existing platform functionalities, including data access permissions and interaction points, which may be hardcoded to prevent accidental association of AI agents to non-permitted platform elements. The uploaded AI agent may undergo testing in a sandbox environment to verify its functionality and identify any potential issues. Platform administrators review the submitted AI agent for compliance with platform policies and standards before approval. Once approved, the AI agent may be made available for use within the user's account or, if desired, listed in the marketplace for other users. The platform provides robust tools for monitoring the custom AI agent's performance and offers support for troubleshooting and optimization.

This allows organizations to leverage AI agent developments within a standardized environment of the SaaS platform, combining the benefits of custom solutions with the robust infrastructure and integration capabilities of the platform. It also opens up possibilities for AI agent developers to monetize their creations by offering them to other users through the marketplace, subject to platform approval and licensing agreements. This marketplace thus serves as a dynamic ecosystem, fostering innovation and collaboration in the AI space while providing users with a wide array of tools to enhance their productivity and decision-making processes.

For auditing and security purposes, the method includes logging all actions performed by the generative AI agents. Additionally, the method may involve requesting user confirmation before executing actions that fall outside a predefined set of low-risk operations.

Optionally the above-described process for dynamically adjusting the credentials of AI agents based on usage patterns and security protocols includes a credential audit process. This process periodically reviews the actions performed by each AI agent and compares them against their current credential set. If a generative AI agent frequently requests access to data or actions outside its current credentials, the agent environment 200 may suggest an expansion of that agent's credentials, subject to administrative approval.

Conversely, if a generative AI agent rarely uses certain credentials, the agent environment 200 may suggest a reduction in that agent's access rights, thereby adhering to the principle of least privilege and enhancing overall system security.

Optionally, when a complex task requires actions across multiple credential sets, the agent environment 200 orchestrates a collaborative effort among multiple AI agents, each operating within its authorized domain. For example, if a task requires both financial analysis and marketing expertise, FinanceAI and MarketingAI may work in tandem, sharing outputs through a secure, credential-respecting interface. This collaboration is managed by a higher-level orchestration layer that ensures no unauthorized data access occurs during the collaborative process. Agent may be added as a user, for example as described above. The agent environment 200 also implements an NLP module that interprets user inputs and translates them into specific action requests for the generative AI agents. This NLP module is context-aware, understanding not just the literal content of user inputs but also the user's role, historical interaction patterns, and current project context. In addition, after a generative AI agent performs an action, it may generate a natural language summary of what it did and why, including references to the specific credentials and data sources it used. This explanation is presented to the user in an easily understandable format, promoting transparency and user trust. Based on historical usage patterns and current project status, likely user requests may be identified to pre-emptively prepare AI agents, reducing response times for common tasks. Furthermore, the invention comprises a method for handling edge cases where required actions fall in a gray area between different AI agents' credential sets. In such cases, the agent environment 200 implements a decision tree algorithm to determine the most appropriate agent for the task, potentially involving a human administrator for final approval.

Figure 9C:
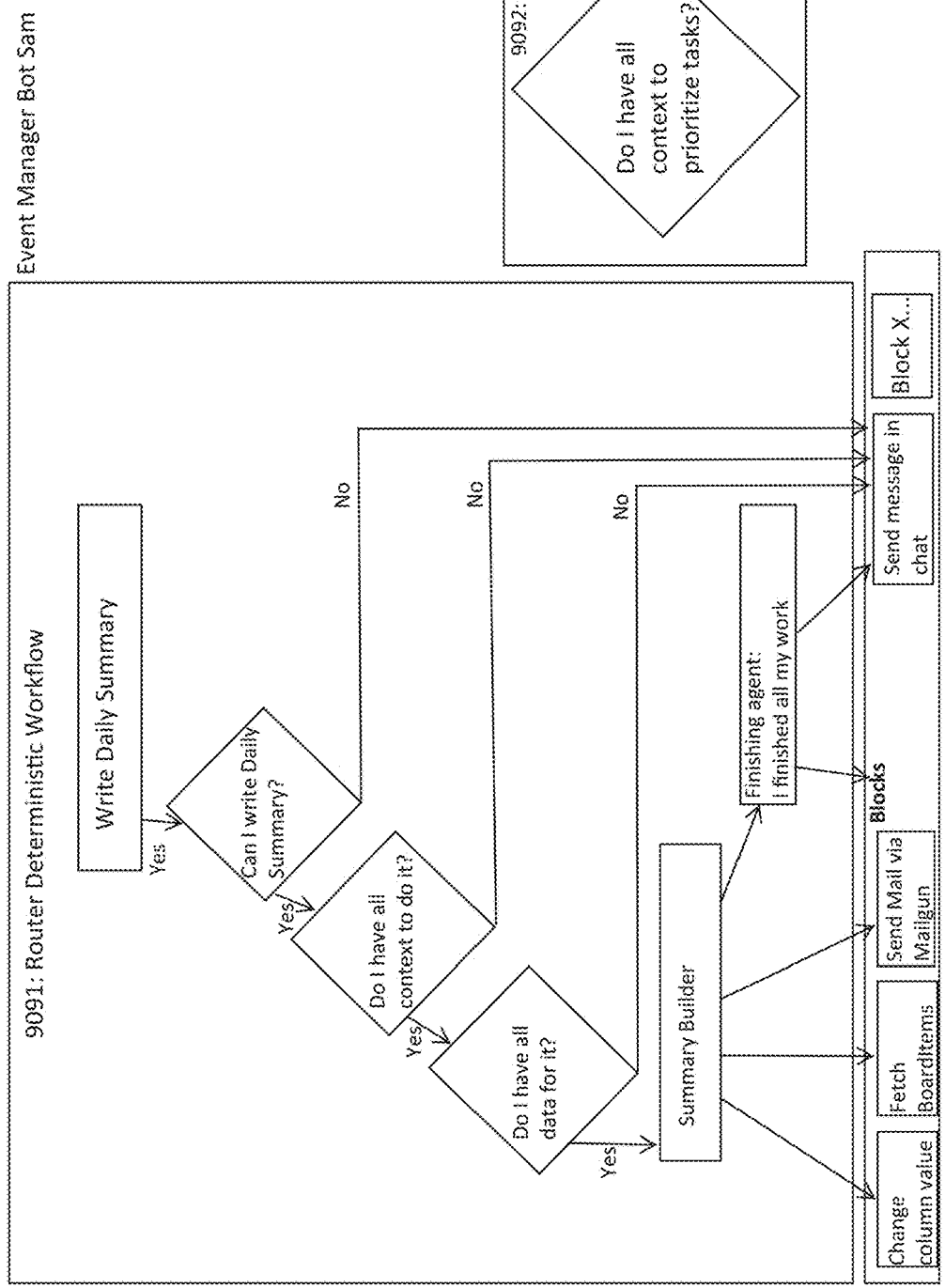
FIG. 9C is a detailed workflow for an Event Manager Bot, which operates within the SaaS platform previously described according to the process described in FIG. 9A, consistent with some embodiments of the present disclosure.

Reference is now also made to FIG. 9C which is a detailed workflow for an Event Manager Bot, which operates within the SaaS platform previously described according to the process described in FIG. 9A. This technical description will explain the components and processes shown in the diagram, relating them to the concepts discussed earlier.

The diagram depicts two main workflow types: a Deterministic Workflow (9091) and a Non-Deterministic Workflow (9092), both of which are part of the Event Manager Bot's functionality. The Deterministic Workflow (9091) is controlled by a Router, which acts as a state machine, managing the flow of operations through various agents. This aligns with the concept of AI agents with specific functionalities, as described in the earlier patent description.

The workflow begins with a "Write Daily Summary" input, which triggers the Capabilities Agent. This agent checks if it can perform the requested task, demonstrating the agent environment 200's ability to assess its own capabilities within its assigned scope and resource limits.

If capable, the process moves to the Daily Summary Context Agent, which checks for all necessary context. This step relates to the method of contextual data analysis described earlier, where the generative AI agent or generative AI model analyzes the structure and content of data to understand its context.

The Data Fetcher agent then verifies if all required data is available. This corresponds to the step of accessing and extracting data from the platform's data structures, as outlined in the flow of the process. Optionally, when all data is available, the Summary Builder agent constructs the summary and requests verification. This step likely involves the AI model performing contextual analysis of the data, as depicted in FIG. 9A. The Finishing Agent marks the completion of the task, potentially updating the status of the task in the platform, which aligns with the agent environment 200's ability to interact with and modify data in the SaaS platform. The Non-Deterministic Workflow section shows a separate process for prioritizing tasks, which includes its own context agent and additional agents (X and Y). This demonstrates the agent environment 200's capability to handle more complex, non-linear processes that may require different types of AI agents or decision-making processes. The "Blocks" section on the right represents various actions that can be taken based on the outcomes of the workflow, such as changing column values, fetching board items, sending emails, or sending chat messages. These actions correspond to the agent environment 200's ability to perform operations within the SaaS platform based on AI analysis and decisions. Throughout the workflow, there are decision points (represented by "Yes" and "No" paths) that determine the flow of the process. These decision points likely utilize the AI's contextual understanding of the data and tasks, as described in the method claims for contextual data analysis. The inclusion of tasks like "Prioritize Tasks", "Set timeline for tasks", and "Nudge people on due" in the Capabilities Agent section demonstrates the AI's ability to manage and optimize workflow processes, aligning with the described functionality of AI agents in the SaaS platform.

This flow illustrates how the previously described AI agent functionalities, contextual data analysis, and workflow management capabilities are implemented in a practical, structured process within the SaaS platform. It provides a visual representation of how different AI agents interact, make decisions, and perform tasks based on their analysis of data and context within the platform.

Reference is now made to another Use Case. Consider a large corporate environment using a SaaS platform for project management across multiple departments. The platform maintains data about various projects, including sensitive financial information, general project timelines, and public-facing marketing materials. The first AI agent, referred to herein as a "FinanceAI," has credentials that allow it to access and analyze financial data. The second AI agent, "MarketingAI," has credentials for accessing and working with marketing-related data. A user from the finance department inputs a request: "Analyze the budget allocation for our upcoming product launch and suggest optimizations."

The agent environment 200 recognizes that this request requires access to financial data and automatically selects FinanceAI to handle the task. FinanceAI analyses the budget data, compares it with historical data from similar product launches, and generates a report with suggested optimizations. Later, a marketing team member inputs: "Create a social media campaign timeline for the new product launch.", The agent environment 200 selects MarketingAI for this task. MarketingAI accesses the marketing materials and project timeline, but when it attempts to access the budget information to align the campaign with financial constraints, it requests permission as this fall outside its credential set. This example demonstrates how the process allows for efficient, secure, and context-aware use of AI agents within a complex SaaS environment, ensuring that sensitive data is only accessed by appropriately credentialed agents while still allowing for collaborative work across departments.

Figure 10:
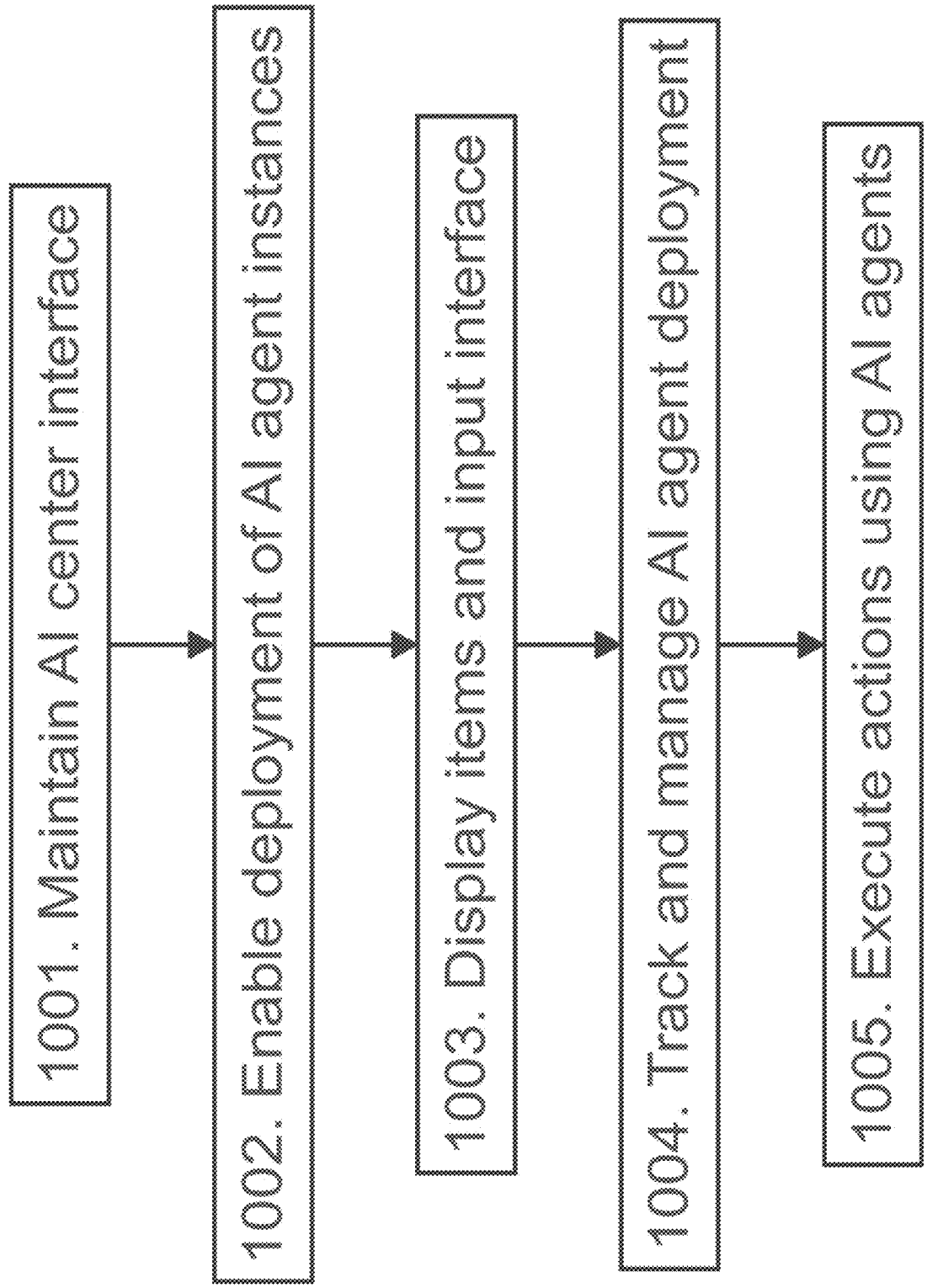
FIG. 10 is a flowchart of a process for managing artificial intelligence resources in a SaaS platform, consistent with some embodiments of the present disclosure.

The intent-based interaction system described here may be combined with the AI resource management process detailed in FIG. 10. This integration ensures that the generative AI agents' interactions are not only context-appropriate but also optimized within the available AI resource.

Having discussed various AI functionalities, we now turn to the crucial aspect of managing AI resources within the platform. Reference is now also made to FIG. 10, which is a flowchart of a process for managing artificial intelligence resources in a SaaS platform. The process comprises several steps executed by one or more processors configured to manage and utilize artificial intelligence agents as limited resources within the platform. The flowchart is implemented using a SaaS platform, such as the agent environment 200 depicted in FIG. 1A, consistent with some embodiments of the present disclosure, for instance using the agent environment.

In a first step (1001), the process involves maintaining an AI center interface displaying a plurality of AI agents for incorporation within an account of the SaaS platform. Each AI agent represents different AI functionalities and is configured to interact with alphanumeric data stored or associated with platform elements of the SaaS platform.

The second step (1002) involves enabling deployment of multiple instances of each AI agent as limited resources. This allows for scalable and controlled use of AI functionalities across the platform.

In a third step (1005), the process causes a display of a plurality of items in a table structure and at least one input interface. This interface is configured to receive user inputs for assigning AI agent instances to one or more items or platform elements.

The fourth step (1004) involves tracking and managing the deployment of AI agent instances to ensure they do not exceed their assigned resource limits. This step may include maintaining a count of assigned instances for each AI agent and comparing the count to a predefined limit for each AI agent.

In a fifth step (1005), the process executes actions using the deployed AI agent instances within their assigned scope in the SaaS platform and their resource limits. This may involve consuming multiple instances of a generative AI agent for certain actions and a single instance for other actions, depending on the complexity and resource requirements of the task.

The process further includes displaying, via a GUI element within the SaaS platform, information about all AI functionalities available in an account, with each functionality represented by a different AI agent. This GUI element also displays utilization information for each AI agent resource, providing users with a clear overview of their AI resource usage.

In some implementations, the process treats the plurality of AI agents as limited resources, with multiple instances of the same AI agent available for purchase and assignment to a limited number of items concurrently. Each AI agent instance is configured to be assigned to up to a predetermined number of items concurrently.

The process also includes notifying a user when an attempt to assign a generative AI agent instance exceeds the resource limit and providing an option to purchase additional resources. An interface for purchasing additional instances of a generative AI agent is provided to facilitate this process.

When receiving a request to assign a generative AI agent instance to an item or platform element, the process determines whether the assignment would exceed the resource limit for the generative AI agent and allows or denies the assignment based on this determination.

Example Use Case:

Consider a large marketing agency using the SaaS platform for managing multiple client campaigns. The platform offers several AI agents, including:

1. Contantia: For generating and optimizing content
2. AnalyticsAI: For analysing campaign performance
3. Audience AI: For audience segmentation and targeting The agency has purchased the following resources:
10 instances of ContentAI
5 instances of AnalyticsAI
3 instances of AudienceAI A marketing manager, Sarah, is working on a new campaign for a major client. She accesses the AI center interface, which displays all available AI agents and their current utilization.

Sarah assigns 2 instances of ContentAI to generate social media posts for the campaign. The agent environment 200 tracks this assignment, updating the ContentAI utilization to 2/10.

Next, Sarah attempts to assign 3 instances of AnalyticsAI to continuously monitor the campaign's performance across multiple channels. However, this would exceed the available resources (5 instances). The agent environment 200 notifies Sarah that this assignment exceeds the resource limit and offers the option to purchase additional AnalyticsAI instances.

Sarah decides to purchase 2 additional AnalyticsAI instances. The agent environment 200 processes the purchase and updates the available resources. Sarah can now successfully assign the 3 AnalyticsAI instances to her campaign.

Later, another team member, John, tries to assign 2 instances of AudienceAI to a different project. The agent environment 200 checks the current utilization (2/3) and allows the assignment as it's within the resource limits.

Throughout these interactions, the GUI element in the SaaS platform updates in real-time, showing the current utilization of each AI agent:
ContentAI: 2/10
AnalyticsAI: 3/7 (after the purchase)
AudienceAI: 2/3

This use case demonstrates how the method manages AI resources as limited assets, tracks their utilization, facilitates resource expansion when needed, and ensures efficient allocation across multiple projects within the SaaS platform.

Consistent with some embodiments of the present disclosure, the agent environment 200 is executing a code for estimating computational resources required for AI resource usage such as AI actions of the generative AI agents and above-described automations within the SaaS platform 100. The environment 200 implements a token-based approach for quantifying the AI resource usage where each action is assigned a specific number of AI tokens based on its estimated resource consumption. In use, the agent environment 200 tracks real-time token usage for users, teams, and/or accounts within the SaaS platform. Historical usage patterns may be analyzed to predict future token consumption and generate trend points forecasting the number of automation activations expected within a predetermined timeframe. This allows administrators to set token limits for users, teams, or entire accounts, and provide warnings when usage approaches these limits. Optionally, expected token consumption for each run is displayed when users create or modify automations, thereby informing users of the resource implications of their automation designs. Optionally, a central panel is generated to provide comprehensive visualizations of AI resource utilization across the account, offering insights into usage patterns and dynamically adjust token allocations based on usage patterns and priorities set by administrators, ensuring optimal distribution of AI resources across the platform.

The environment 200 may comprise a distributed counting mechanism, with token counts stored in a high-performance, distributed cache for real-time access. The system also includes a predictive analytics component utilizing machine learning models to generate accurate usage projections. The resource estimation algorithm may consider multiple factors, including complexity of AI model interactions, volume and type of data processed, and historical performance metrics of similar operations.

The environment 200 enables efficient utilization of AI capabilities within the SaaS platform, provides clear visibility into resource consumption, and allows for fine-grained control over AI usage. It supports scalable deployment of AI features while maintaining performance and cost-effectiveness.

The token-based approach allows for accurate quantification of AI resource usage, with different AI-powered actions consuming varying numbers of tokens based on their complexity. For instance, a simple text analysis might consume one token, while a complex multi-step automation might consume five or more tokens.

The system's predictive analytics ability may use historical data to forecast future token consumption, allowing administrators to proactively manage AI resources. This feature is particularly useful for preventing resource shortages and ensuring consistent performance of AI-powered features across the platform.

The central panel for visualizing AI resource utilization provides administrators with a comprehensive view of how AI resources are being used across the account. This dashboard can display various metrics, such as token consumption by user, team, or automation type, helping administrators identify patterns and optimize resource allocation.

The dynamic token allocation feature allows the system to adapt to changing usage patterns and priorities. For example, when certain teams or projects are identified as high-priority, the system may automatically allocate more tokens to their associated automations, ensuring critical AI-powered processes continue to function optimally.

By providing users with immediate feedback on the token consumption of their automations, the system encourages efficient design of AI-powered processes. Users can see the resource impact of their automation designs in real-time, allowing them to make informed decisions about the complexity and frequency of their AI-powered actions.

This environment 200 thus provides a comprehensive solution for deploying, monitoring, and optimizing AI capabilities within a SaaS platform, ensuring efficient use of computational resources while maintaining transparency and control for both users and administrators.

The management of AI resources as described in this process can be further enhanced by incorporating the contextual data analysis method outlined in FIG. 11A. This combination allows for more efficient allocation of AI resources based on the specific data structures and contexts within the SaaS platform.

To round out our examination of the system's capabilities, we now consider its approach to contextual data analysis. Reference is also made to FIG. 11A which is a flowchart of process for contextual data analysis in a structured environment, particularly within a SaaS platform. The process may be implemented using a system that comprises one or more processors configured to execute several steps for understanding the context of items within a data structure by assessing values within columns, the type of data these columns present, and how values change in other items of the same type. The flowchart is implemented using a SaaS platform, such as the agent environment 200 depicted in FIG. 1A, consistent with some embodiments of the present disclosure, for instance using the agent environment.

In a first step (1101), the agent environment 200 accesses a data structure containing multiple items, each item associated with a plurality of columns. This data structure may represent a workflow or process within the SaaS platform.

The second step (1102) involves analyzing each column within the data structure. For each column, the agent environment 200 performs the following sub-steps: a) Analyze the column header to determine its descriptive label. b) Determine the data type of the column (e.g., status, text, numeric, date). c) Assess the values contained within the column across multiple items.

Now (1103), the agent environment 200 focuses on a given item in the data structure and extracts values from each of its associated columns. This process involves a sophisticated data parsing mechanism that recognizes various data types and formats across different columns. For instance, it can differentiate between date formats, numerical values, text strings, and even more complex data types like JSON objects or nested arrays.

In step (1104), an AI model is utilized to perform a contextual analysis of the given item. This analysis is multi-faceted and leverages advanced machine learning techniques to derive meaningful insights. When interpreting respective values based on column context, the AI model considers not just the raw data, but also the column's metadata, such as its name, data type, and any associated tags or descriptions. For example, a value of "5" in a column labelled "Priority" would be interpreted differently than the same value in a "Version" column.

The identification of patterns or trends from previous items involves complex pattern recognition algorithms. These algorithms can detect both obvious and subtle similarities between the current item and historical data. This might include identifying cyclical patterns in time-series data, recognizing common sequences of status changes, or spotting correlations between seemingly unrelated columns.

Inferring relationships between different columns and their values may be performed using the AI model while techniques from the field of causal inference to hypothesize potential cause-and-effect relationships between different data points are utilized. For instance, it might infer that changes in a "Budget" column tend to precede changes in a "Project Scope" column, suggesting a causal link between these aspects of a project.

The interface provided in step (1105) for users to query the AI model about the contextual analysis is designed with user experience in mind. It may offer natural language processing capabilities, allowing users to ask questions in plain English rather than requiring specialized query languages. The explanations provided about how different column types influence data interpretation are generated using explainable AI techniques, ensuring that the AI's reasoning is transparent and understandable to users.

The agent environment 200's ability to understand the different uses of data in various column types is a result of extensive training on diverse datasets. This training enables the AI to recognize that a "Status" column typically contains a finite set of predefined values representing stages in a process, while a "Description" column allows for free-form text input. The AI can then apply this understanding to interpret the significance of data placement and movement between different column types.

By interpreting the structure of the data, the agent environment 200 may employ mining techniques to infer the underlying workflows or business processes represented by the table. This involves identifying common sequences of data changes, recognizing decision points, and mapping out the flow of information across different columns and items as described above.

Understanding of context allows the agent environment 200 to provide insights that go beyond the surface level of the data. It may identify inefficiencies in workflows, suggest process improvements, and even predict future states based on historical patterns and current data. This level of analysis transforms the SaaS platform from a mere data repository into an intelligent assistant that actively helps users optimize their processes and make data-driven decisions.

In an exemplary case, a contextual analysis is performed on patient records. It interprets lab results in the context of the patient's age, medical history, and current medications. For instance, it might flag a 'normal' test result as potentially concerning for a patient with a specific pre-existing condition, prompting the healthcare provider to take a closer look Reference is now made to another exemplary use case wherein a project management SaaS platform is used by a software development company. The platform contains a data structure representing ongoing projects, with each project as an item and various attributes as columns. The data structure includes the following columns:

Project Name (Text)
1. Start Date (Date)
2. Status (Status: Not Started, In Progress, Testing, Completed)
3. Priority (Numeric: 1-5)
4. Assigned Team (Text)
5. Budget (Numeric)

A project manager, Alice, wants to understand the context of a specific project named "Mobile App Redesign". She uses the system's interface to query about this project. The agent environment 200 performs its contextual analysis:
1. It recognizes "Status" as a status column and interprets "In Progress" as an active state, different from how it would interpret the same text in a regular text column.
2. It identifies that project with similar priority (4) and budget range have historically taken an average of 3 months to complete.
3. It infers a relationship between the "Assigned Team" and "Status" columns, noting that projects assigned to this particular team often move from "In Progress" to "Testing" faster than other teams.

4. It recognizes a pattern where projects with high priority (4-5) and "In Progress" status often have budget adjustments in the near future.

When Alice queries about the "Mobile App Redesign" project, the agent environment 200 provides insights such as: "The 'Mobile App Redesign' project is currently In Progress, which indicates active work. Based on historical data of similar projects (Priority 4, comparable budget), we estimate a completion time of about 3 months from the start date. The assigned team typically moves projects to the Testing phase quicker than average. Given the high priority, there's a 70% chance of a budget adjustment within the next month based on patterns observed in similar high-priority, in-progress projects." This example demonstrates how the agent environment 200 uses contextual analysis to provide rich, insightful information about items in the data structure, taking into account the specific meanings and relationships implied by different column types and their values.

In the described embodiments, the generative AI agent may interface with the data structure through a table format, where items are typically arranged in rows and their characteristics in columns. This tabular structure provides a structured framework for the generative AI agent or generative AI model to process and analyze information. The generative AI agent may be granted specific credentials that allow it to read and write data within certain items of this table structure, ensuring that its access is controlled and aligned with organizational security protocols.

Before interacting with the data, the generative AI agent may be prompted with crucial contextual information. This includes details about the data types of item characteristics and the structural relations between items in the table. For instance, the generative AI agent or generative AI model is informed about whether a particular column contains numerical data, text, dates, or categorical information. This context-setting step is critical as it enables the generative AI agent or generative AI model to interpret the data accurately and make informed decisions about how to interact with it.

The generative AI agent's interaction with the data structure is not limited to passive analysis. It may generate and execute instructions for performing actions by interacting with item characteristics. These actions are calculated to promote the common objective associated with the table structure. For example, in a customer relationship management context, the generative AI agent or generative AI model might analyze purchase history and engagement metrics to suggest personalized retention strategies for at-risk customers.

Furthermore, the generative AI agent may proactively identify missing data or necessary actions within the data structure. When it encounters incomplete information, it can autonomously reach out to relevant team members to obtain the missing data. This proactive approach ensures that the data structure remains complete and up-to-date, enhancing the overall efficiency of the SaaS platform.

The generative AI agent also may demonstrate adaptability in its interactions with the data structure. It can adjust its output and behavior based on the specific context of its engagement, including the role of the user it's interacting with and its location within the hierarchical structure of the organization. This context-aware interaction ensures that the AI's actions and recommendations are always relevant and appropriate to the specific use case.

Optionally, the generative AI agent may perform analysis for the data structure, including identifying patterns or trends from previous items, inferring relationships between different columns and their values, and even deducing the overall objective of the table based on its structure and content. This deep analytical capability allows the generative AI agent or generative AI model to provide insights and take actions that go beyond simple data manipulation, truly augmenting the decision-making processes within the organization.

It should be noted that the features and processes described in the above embodiments (FIG. 2A through FIG. 11A) are not mutually exclusive. They can be combined and integrated in various ways to create comprehensive AI solutions within SaaS platforms, tailored to specific organizational needs and use cases. For instance, the proactive information gathering capability outlined in the flowchart of FIG. 5 can be combined with the hierarchical access control scheme detailed in FIG. 4A. Similarly, the contextual data analysis method presented in FIG. 11A can be incorporated into the AI resource management process described in FIG. 10. This modularity and interoperability of features allow for flexible and customizable AI implementations tailored to specific organizational needs. For example, the intent-based interaction system from FIG. 9 could be enhanced with the interactive analysis capabilities from FIG. 8, creating a more comprehensive and user-friendly AI interface. These cross-embodiment integrations are not limited to the examples provided and can be applied across all described flowcharts and embodiments, offering a rich set of possibilities for implementing AI within SaaS platforms. This flexibility ensures that the invention can adapt to diverse use cases and evolving requirements in various business environments.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Reference is now made to a description of some embodiments of optional elements of the agent environment 200.

In some embodiments, the generative AI agent is designed to customize non-AI components of the software application to process and reflect data from other components. This module is activated when a user provides input describing a desired result for a non-AI component, particularly for programmable components that can be customized with specific logic.

The generative AI agent allows users to define logic for programmable components without directly writing code. Instead, users can provide instructions in plain language, which the generative AI agent interprets to deduce the user's intention. This capability is particularly useful for components that receive input from other AI or non-AI components and output a value based on defined logic.

Upon receiving a natural language input, the generative AI agent analyzes the text to understand the user's intention. It then searches for relevant components within the software application that align with the user's goals or may be necessary to fulfill the intended logic. Once identified, the generative AI agent or generative AI model generates appropriate code, including references to these relevant components.

The generative AI agent offers flexibility in how this generated code is utilized. Users can manually implement the code, or the generative AI agent or generative AI model can automatically integrate it into the software application, effectively programming the component as intended.

This generative AI agent is particularly valuable for creating complex calculations or data manipulations. For example, when calculating expected revenue from deals in a pipeline, users can describe the calculation process in natural language, and the generative AI agent or generative AI model will translate this into a proper formula referencing the correct columns and applying the appropriate mathematical operations.

The module's response includes the computed formula in the correct syntax for the programmable component, such as a formula column. This approach eliminates guesswork and potential syntax errors, making the process of setting up complex calculations more accessible to users without extensive coding knowledge.

Furthermore, the generative AI agent can handle follow-up questions or requests for modifications. If a user needs clarification or wants to adjust the formula, they can continue the interaction in natural language. The generative AI agent or generative AI model can explain each part of the formula, suggest optimizations, or make requested changes, all while maintaining the correct syntax and references to the appropriate components. See for example FIG. 11B which is a screenshot of a board generated by the platform 100 overlayed with a window facilitating a user to correspond with a generative AI agent that suggests a formula based on a request and also presents an explanation therefore, consistent with some embodiments of the present disclosure.

This capability extends the no-code approach to traditionally code-based components, significantly lowering the barrier to entry for users to create sophisticated, custom functionalities within the software application. It enables users to focus on their business logic and desired outcomes rather than the intricacies of coding syntax.

In some embodiments, the generative AI agent analyzes user inputs provided in response to AI component outputs, deducing the user's intention and measuring the significance of their modifications. The generative AI agent assesses the extent and nature of changes made to an output. Substantial modifications may indicate a divergence from the user's original instructions or signal a need for systemic adjustments to future outputs. Minor alterations might suggest user preferences to be incorporated in subsequent interactions. Upon detecting a significant discrepancy, the generative AI agent initiates a correction process. This involves a self-evaluation of the AI's analysis models, sentiment recognition algorithms, and other relevant components. The generative AI agent then adjusts its configurations to align future outputs with the insights gained from the user's modifications. Following self-improvement, the generative AI agent may conduct a retrospective analysis of past inputs for the affected AI components. It identifies any previous outputs that may require updates based on the newly amended configuration. The generative AI agent can then automatically revise relevant past outputs or alert users to these findings, offering the option to apply similar amendments.

For changes deemed stylistic or insignificant, the generative AI agent logs the input for future consideration. If the volume of logged inputs for a particular type of change reaches a predetermined threshold, the agent environment 200 re-evaluates its initial classification of the change as purely stylistic.

In scenarios where the generative AI agent or generative AI model cannot conclusively determine the significance of a user's input, such as when an output is completely rewritten, the agent environment 200 either logs the change for future analysis or directly queries the user about their intention behind the modification.

This self-correction capability extends to various AI functionalities within the agent environment 200. For instance, in sentiment analysis tasks, if a user corrects an AI-generated sentiment classification, the module analyzes the discrepancy, updates its sentiment analysis model, and then reviews historical classifications for similar patterns that may require revision.

Optionally, the generative AI agent is adapted to handle formula columns. This feature allows users to describe desired calculations or data manipulations in natural language, which the generative AI agent or generative AI model then translates into appropriate formulas or code. The agent environment 200 can handle complex requests, breaking them down into manageable steps and providing explanations for each part of the generated formula.

As users interact with the generated formulas, making modifications or corrections, the natural language programming assistant learns from these interactions. It refines its understanding of user intent and improves its translation of natural language requests into accurate formulas over time.

This comprehensive approach to AI self-correction and natural language formula generation significantly enhances the system's ability to adapt to user needs, improve accuracy over time, and provide more intuitive interfaces for complex data operations.

Optionally, the environment 200 is capable of engaging in text-based interactions with users within the SaaS platform by implementing a dual-mode interaction system for the AI module, comprising: a transparency mode, wherein information provided by a user to the AI module during a specific interaction is made available for use with other users in the software application, and an individual privacy mode, wherein information provided by a user to the AI module during a specific interaction is restricted from use with other users in the software application. In use, a user interface element allowing users to switch between the transparency mode and the individual privacy mode for each interaction with the generative AI agent is provided. Interaction data may be stored in a secure database, with metadata indicating the selected visibility mode for each interaction and access control mechanisms to enforce the selected visibility mode when retrieving or utilizing stored interaction data may be implemented. This enables utilizing information from transparent interactions to enhance its knowledge base and improve responses to future queries from all users and restrict the generative AI agent from utilizing information from private interactions for any purpose other than responding to the specific user who provided the information. This also may provide administrators with configurable policies to set default visibility modes for different types of interactions or user roles. Optionally, a logging system is provided to track mode switches and usage patterns of the visibility settings.

The system may further comprise a machine learning component that analyzes the content and context of interactions to suggest appropriate visibility modes to users, based on the nature of the information being discussed and historical usage patterns.

In the transparency mode, the system implements additional safeguards to prevent the sharing of sensitive or personally identifiable information, utilizing natural language processing techniques to detect and redact potentially sensitive data before making the interaction available for broader use.

The individual privacy mode may employ encryption techniques to secure the interaction data, ensuring that even system administrators cannot access the content of private interactions without explicit user permission.

The system may allow granular control of information sharing, enabling users to selectively make portions of an interaction transparent while keeping other parts private. This is achieved through a user interface that allows in-line tagging of content with visibility attributes.

In collaborative team environments, the system may provide an option for team-level transparency, where interactions can be shared within a defined group of users but remain private to the broader user base. This team-level visibility is managed through integration with the platform's existing user and group management systems. The environment 200 may include a feature for retroactive visibility changes, allowing users to modify the visibility settings of past interactions within a configurable time frame. This feature is coupled with a notification system that alerts relevant parties about significant visibility changes. To support compliance with data protection regulations, the environment 200 may implement data retention policies that automatically archive or delete interaction data based on its age and visibility settings, in accordance with configurable rules set by platform administrators.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the agent environment 200 can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The terms "comprise", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for using generative artificial intelligence in a software as a service (SaaS) platform, comprising:
    one or more processors configured to:
        cause a display of a table structure including multiple items of a project, each with multiple item characteristics, associated with a common table objective;
        cause a display of at least one input interface for receiving user inputs to interact with items in the table structure;
        add a generative AI agent as a SaaS platform user of the project alongside one or more human users and allocate the generative AI agent with credentials to read and write data in certain items of the project;
        configure the generative AI agent to autonomously perform an analysis of data type of item characteristics and/or structural relations between at least some of the multiple items;
        and accordingly to generate instructions for performing actions calculated to promote the common table objective by interacting with the multiple item characteristics without requiring specific instructions from any of the one or more human users; and
        execute the generated instructions.

2. The system of claim 1, wherein the generative AI agent is added as the SaaS platform user based on the user inputs.

3. The system of claim 2, wherein the user inputs are indicative of adding a graphical representation of the generative AI agent to at least one cell of the table structure.

4. The system of claim 1, wherein the items are arranged in rows and item characteristics in columns of the table structure.

5. The system of claim 1, wherein the one or more processors are configured to: analyze patterns in the table structure; identify missing or inconsistent data, autonomously update item characteristics based on the analysis, and generate reports summarizing changes made to the table structure.

6. The system of claim 1, wherein the prompt includes deducing the common table objective from data type and/or structural relations between item characteristics, and generating instructions based on the deduced objective.

7. The system of claim 1, wherein the action is calculated to promote the common table objective; wherein the common table objective is achieved through completing a series of activities defined by the table structure; and the action is part of this series of activities.

8. The system of claim 1, wherein the common table objective can be deduced using log history.

9. The system of claim 1, wherein actions include: generating data for an empty first cell of a first data characteristic of an item and processing this data based on a value in a second cell of a second data characteristic.

10. The system of claim 1, wherein the generative AI agent reports to its assigning user when no further actions are required for an item.

11. The system of claim 1, further configured to: notify a human user of missing data; and await receipt of missing data before proceeding with further actions.

12. The system of claim 1, wherein adding a generative AI agent is done by selecting from a reservoir of available users in a data characteristic containing user identities.

13. The system of claim 12, wherein the selecting is made via a drop-down menu with user avatars and the generative AI agent is selected by choosing its avatar.

14. The system of claim 1, wherein the generative AI agent operates continuously within the platform's user management system to: monitor the table structure for changes in item characteristics without human intervention; and automatically trigger the analysis when new items are added or existing items are modified.

15. The system of claim 1, wherein the generative AI agent autonomously: identifies relevant team members based on context derived from the table structure and past user interactions; and initiates natural language sessions with identified team members to obtain missing information.

16. The system of claim 1, wherein the generative AI agent is configured to: analyze user modifications to its outputs to deduce user intention; measure significance of the modifications; and automatically adjust its configurations to align future outputs with insights gained from user modifications.

17. The system of claim 1, wherein the generative AI agent is configured to: adapt its output based on a role of a human user interacting with the generative AI agent; and respond differently to similar queries based on the role of the human user making a query.

18. The system of claim 1, wherein the generative AI agent operates within a hierarchical access control scheme that: maps the table structure to privilege classes defining inheritable edit privileges; and grants the generative AI agent edit privileges inherited based on the hierarchical access control scheme.

19. The system of claim 1, wherein the generative AI agent is configured to: engage in interactive dialogue with human users to provide clarification about outputs and underlying reasoning; and maintain dialogue context across multiple interactions within the same project.

20. The system of claim 1, wherein the generative AI agent is configured to: assess whether sufficient information is found in the table structure for task completion; autonomously complete assigned tasks using obtained information; and operate without requiring specific step-by-step guidance from human users.

21. A system for using generative artificial intelligence in a software as a service (SaaS) platform, comprising:
one or more processors configured to:
display a table structure including multiple items, each with multiple item characteristics, associated with a common table objective; display at least one input interface for receiving user inputs to interact with items in the table structure;
add a generative AI agent as a SaaS platform user of a project alongside one or more human users and allocate the generative AI agent with credentials to read and write data certain items of the project;
configure the generative AI agent to autonomously perform an analysis of data type of item characteristics and/or structural relations between at least some of the multiple items;
and accordingly to generate instructions for performing actions calculated to promote the common table objective by interacting with the multiple item characteristics without requiring specific instructions from any of the one or more human users; and
execute the generated instructions to update one or more of the multiple items without requiring further user intervention.

22. The system of claim 21, wherein the action is calculated to promote the common table objective.

23. The system of claim 21, wherein the prompt includes deducing the common table objective from data type and/or structural relations between item characteristics, and generating instructions based on the deduced objective.

24. The system of claim 21, wherein the common table objective is achieved through completing a series of activities defined by the table structure and the action is part of this series of activities.

25. The system of claim 21, wherein the common table objective can be deduced using log history.

26. The system of claim 21, wherein actions include: generating data for an empty first cell of a first data characteristic of an item; and processing this data based on a value in a second cell of a second data characteristic.

27. The system of claim 21, wherein the generative AI agent reports to its assigning user when no further actions are required for an item.

28. The system of claim 21, further configured to: notify a human user of missing data; and await receipt of missing data before proceeding with further actions.

29. The system of claim 28, further configured to send reminders for missing data.

30. The system of claim 21, wherein adding a generative AI agent is done by selecting from a reservoir of available users in a data characteristic containing user identities.

31. The system of claim 30, wherein a selection is made via a drop-down menu with user avatars and a generative AI agent is selected by choosing its avatar.

* * * * *